US011107038B2

(12) United States Patent
Chavan

(10) Patent No.: US 11,107,038 B2
(45) Date of Patent: *Aug. 31, 2021

(54) MULTIMEDIA RESUME DISTRIBUTION SYSTEM

(71) Applicant: PEOZZLE Corporation, Plymouth, MN (US)

(72) Inventor: Edward Chavan, Plymouth, MN (US)

(73) Assignee: PEOZZLE Corporation, Plymouth, MN (US)

(*) Notice: Subject to any disclaimer, the term of this patent is extended or adjusted under 35 U.S.C. 154(b) by 431 days.

This patent is subject to a terminal disclaimer.

(21) Appl. No.: 15/013,998

(22) Filed: Feb. 2, 2016

(65) Prior Publication Data

US 2016/0224942 A1 Aug. 4, 2016

Related U.S. Application Data

(60) Provisional application No. 62/111,552, filed on Feb. 3, 2015.

(51) Int. Cl.
*G06Q 10/10* (2012.01)
*G06Q 10/06* (2012.01)
*G06Q 30/08* (2012.01)
*G06Q 30/02* (2012.01)

(52) U.S. Cl.
CPC ....... *G06Q 10/1053* (2013.01); *G06Q 10/105* (2013.01)

(58) Field of Classification Search
CPC .................. G06Q 10/105; G06Q 10/1053
USPC .................................. 705/1.1–912
See application file for complete search history.

(56) References Cited

U.S. PATENT DOCUMENTS

| 5,477,542 A | 12/1995 | Takahara et al. |
| 5,706,290 A | 1/1998 | Shaw et al. |
| 5,978,648 A | 11/1999 | George et al. |
| 6,038,439 A | 3/2000 | Rune |
| 6,064,380 A | 5/2000 | Swenson et al. |
| 6,128,148 A | 10/2000 | Platte et al. |
| 6,744,868 B2 | 6/2004 | Mani |
| 6,766,363 B1 | 7/2004 | Rothschild |
| 6,879,828 B2 | 4/2005 | Virtanen et al. |
| 6,889,383 B1 | 5/2005 | Jarman |
| 6,898,799 B1 | 10/2005 | Jarman |
| 6,957,188 B1 | 10/2005 | Dellevi et al. |

(Continued)

OTHER PUBLICATIONS

Page, Loraine, "This Site May Move Your Resume to the Top of the Virtual Stack," Information Today, Link-up@Home, pp. 1-3, Nov. 2008. (Year: 2008).*

(Continued)

*Primary Examiner* — Jonathan P Ouellette
(74) *Attorney, Agent, or Firm* — Dicke, Billig & Czaja, PLLC

(57) ABSTRACT

A multimedia resume distribution system includes staffing core appliances including processors and memory configured to store and execute staffing core applications to receive video resume content; receive audio resume content; receive graphics resume content; receive text resume content; integrate the video resume content, the audio resume content, the graphics resume content, and the text resume content into a multimedia resume; record the multimedia resume; and distribute the recorded multimedia resume.

18 Claims, 77 Drawing Sheets

(56) References Cited

U.S. PATENT DOCUMENTS

| | | | |
|---|---|---|---|
| 7,162,475 B2 | 1/2007 | Ackerman |
| 7,313,814 B2 | 12/2007 | Zhu et al. |
| 7,317,924 B2 | 1/2008 | Virtanen et al. |
| 7,330,542 B2 | 2/2008 | Kauhanen et al. |
| 7,343,316 B2 | 3/2008 | Goto et al. |
| 7,479,949 B2 | 1/2009 | Jobs et al. |
| 7,481,539 B2 | 1/2009 | Giraldo et al. |
| 7,508,450 B1 | 3/2009 | Abernethy, Jr. et al. |
| 7,526,784 B2 | 4/2009 | Jarman |
| 7,543,318 B2 | 6/2009 | Jarman |
| 7,577,970 B2 | 8/2009 | Jarman |
| 7,657,445 B1 | 2/2010 | Goux |
| 7,743,116 B2 | 6/2010 | Goldeen et al. |
| 7,813,492 B2 | 10/2010 | Kauhanen et al. |
| 7,826,714 B2 | 11/2010 | Berstis et al. |
| 7,840,415 B2 | 11/2010 | Schifone |
| 7,881,338 B2 | 2/2011 | Damola et al. |
| 7,885,201 B2 | 2/2011 | Kuo et al. |
| 7,956,849 B2 | 6/2011 | Anzures et al. |
| 7,962,358 B1 | 6/2011 | Fernandez et al. |
| 7,972,006 B2 | 7/2011 | Giraldo et al. |
| 7,984,179 B1 | 7/2011 | Huang |
| 8,010,892 B2 | 8/2011 | Audet |
| 8,060,825 B2 | 11/2011 | Chaudhri |
| 8,078,205 B2 | 12/2011 | James |
| 8,204,995 B2 | 6/2012 | Sathish |
| 8,249,995 B2 | 8/2012 | Sheperd |
| 8,260,627 B2 | 9/2012 | Davidson |
| 8,290,804 B2 | 10/2012 | Gong |
| 8,311,865 B2 | 11/2012 | Vogel et al. |
| 8,321,888 B2 | 11/2012 | Epstein et al. |
| 8,370,459 B2 | 2/2013 | Goldeen et al. |
| 8,400,417 B2 | 3/2013 | Ording et al. |
| 8,426,714 B1 | 4/2013 | Bowser et al. |
| 8,433,194 B2 | 4/2013 | Nesset et al. |
| 8,456,526 B2 | 6/2013 | Gloudemans et al. |
| 8,533,110 B2 * | 9/2013 | Kremen | G06Q 40/025 705/320 |
| 8,543,440 B2 | 9/2013 | Sundstrom |
| 8,547,355 B2 | 10/2013 | Anzures et al. |
| 8,548,821 B2 | 10/2013 | Sheperd |
| 8,560,364 B2 | 10/2013 | Vogel et al. |
| 8,572,000 B1 * | 10/2013 | Weingarten | G06Q 10/1053 705/320 |
| 8,613,620 B2 | 12/2013 | Barasch et al. |
| 8,645,817 B1 * | 2/2014 | Fisher | G06F 17/30867 715/243 |
| 8,660,545 B1 | 2/2014 | Redford et al. |
| 8,738,443 B2 | 5/2014 | Davison |
| 8,787,730 B2 | 7/2014 | Budzinski |
| 8,819,043 B2 | 8/2014 | Durante et al. |
| 8,838,696 B2 | 9/2014 | Tiwari et al. |
| 8,856,638 B2 | 10/2014 | Evans |
| 8,862,978 B2 | 10/2014 | Evans |
| 8,873,929 B1 | 10/2014 | Wood et al. |
| 8,904,271 B2 | 12/2014 | Evans |
| 8,924,999 B1 | 12/2014 | Santangelo et al. |
| 8,949,887 B2 | 2/2015 | Mehta et al. |
| 8,966,370 B2 | 2/2015 | Steiner |
| 8,966,598 B2 | 2/2015 | Brink et al. |
| 8,966,614 B2 | 2/2015 | Thorpe et al. |
| 8,990,691 B2 | 3/2015 | Matas et al. |
| 9,021,526 B1 | 4/2015 | Baron et al. |
| 9,066,131 B1 | 6/2015 | Arsenault |
| 9,070,292 B2 | 6/2015 | Kuwamoto et al. |
| 9,087,320 B2 | 7/2015 | Goldman et al. |
| 9,098,841 B2 | 8/2015 | Evans |
| 9,105,298 B2 | 8/2015 | Grim, III et al. |
| 9,117,001 B2 | 8/2015 | Zhou et al. |
| 9,119,111 B2 | 8/2015 | Payette et al. |
| 9,137,348 B2 | 9/2015 | Ponsford |
| 9,173,005 B1 | 10/2015 | Redford et al. |
| 9,176,966 B2 | 11/2015 | Silverstein et al. |
| 9,177,407 B2 | 11/2015 | Imbruce |
| 9,185,346 B2 | 11/2015 | Grondal et al. |
| 9,190,010 B2 | 11/2015 | Vik et al. |
| 9,210,381 B2 | 12/2015 | Yang et al. |
| 9,236,088 B2 | 1/2016 | Hayes |
| 9,237,416 B2 | 1/2016 | Root et al. |
| 9,282,096 B2 | 3/2016 | Goldstein |
| 9,282,360 B2 | 3/2016 | Shanson |
| 9,298,982 B2 | 3/2016 | Perronnin et al. |
| 9,306,987 B2 | 4/2016 | Olsen et al. |
| 9,313,508 B1 | 4/2016 | Mittal |
| 2010/0153288 A1 * | 6/2010 | Digiambattista | G06Q 10/1053 705/319 |
| 2011/0276507 A1 * | 11/2011 | O'Malley | G06Q 10/00 705/321 |
| 2012/0310755 A1 * | 12/2012 | Sheperd | G06Q 50/01 705/14.73 |
| 2013/0097093 A1 * | 4/2013 | Kolber | G06Q 10/1053 705/321 |
| 2013/0187926 A1 * | 7/2013 | Silverstein | G06F 16/972 345/440 |
| 2013/0191299 A1 * | 7/2013 | Hermsdorff | G06Q 10/1053 705/321 |
| 2014/0052656 A1 * | 2/2014 | Ball | G06Q 10/1053 705/319 |
| 2015/0262130 A1 * | 9/2015 | Taylor | G06F 16/24578 705/321 |
| 2015/0356488 A1 * | 12/2015 | Eden | G06Q 50/01 705/7.41 |
| 2016/0012739 A1 * | 1/2016 | Jafari | G09B 5/06 434/353 |
| 2016/0197993 A1 * | 7/2016 | Perkowski | H04L 67/02 709/203 |
| 2016/0241505 A1 * | 8/2016 | Hermsdorff | G06Q 10/1053 |
| 2017/0032327 A1 * | 2/2017 | Fisher | G06Q 10/1053 |
| 2018/0157995 A1 * | 6/2018 | O'Malley | G06Q 10/00 |

OTHER PUBLICATIONS

"Video resume—Wikipedia, the free encyclopedia" Retrieved from the Internet:https://en.wikipedia.org/wiki/Video_resume [retrieved Jun. 8, 2016] (2 pages).

"Video Resumes: Let the Applicant Beware" Retrieved from the Internet: http://www.monster.com/career-advice/article/video-resumes-let-the-applicant-beware-hot-jobs [retrieved Jun. 8, 2016] (2 Pages).

The Office Action for U.S. Appl. No. 15/014,000 dated Jul. 5, 2018 (26 pgs.).

The Final Office Action for U.S. Appl. No. 15/014,000 dated Feb. 21, 2019 (15 pgs.).

The Office Action for U.S. Appl. No. 15/014,000 dated Nov. 14, 2019 (20 pgs.).

The Final Office Action for U.S. Appl. No. 15/014,000 dated Jun. 8, 2020 (21 pgs.).

* cited by examiner

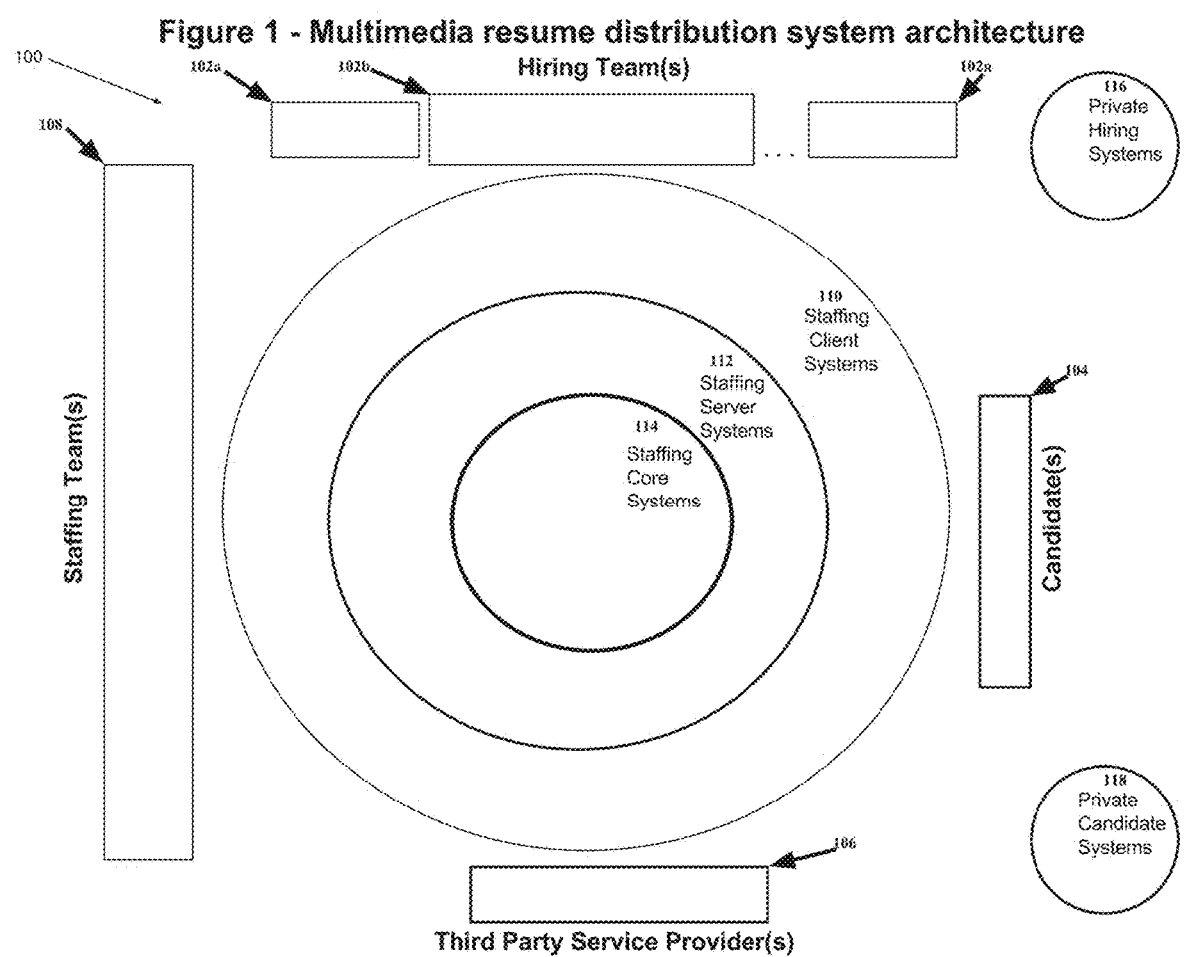

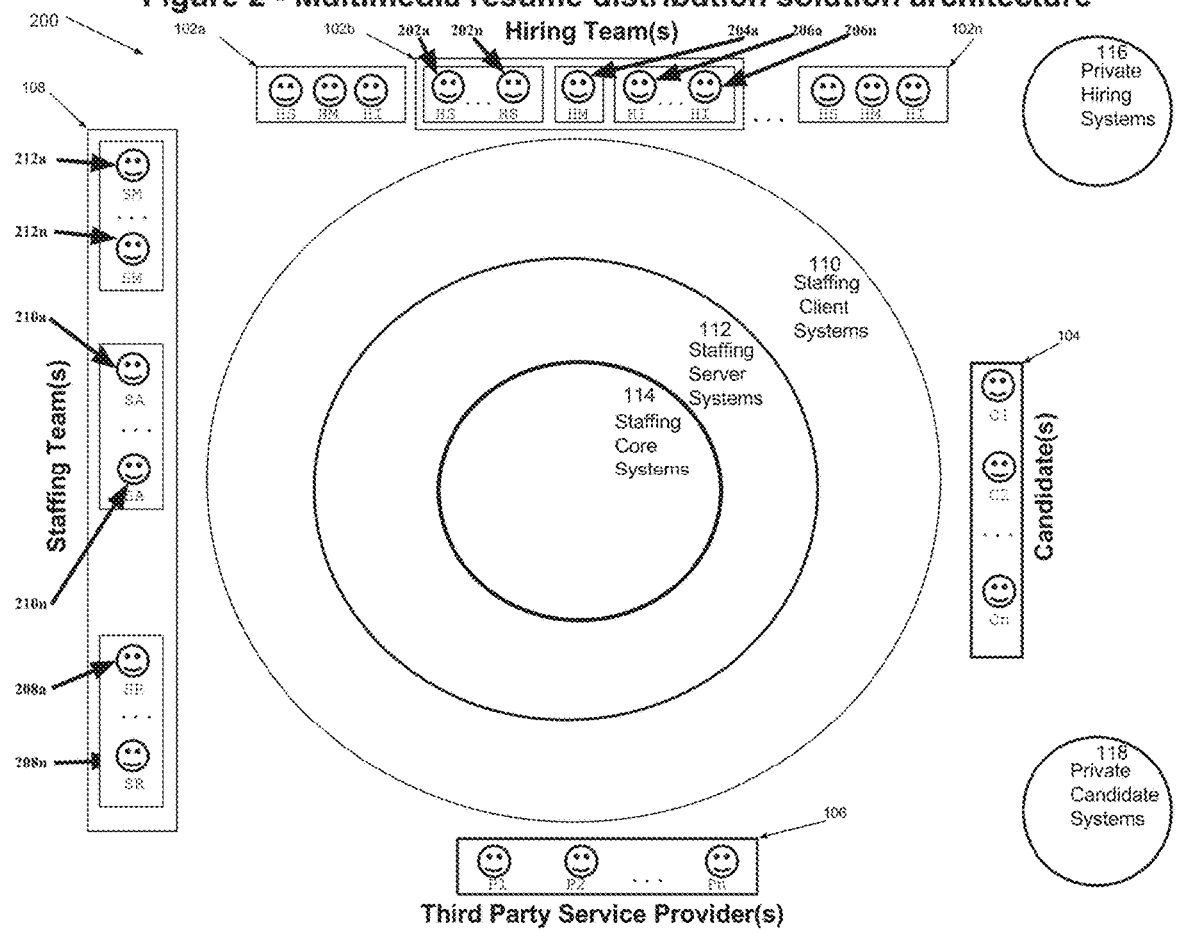

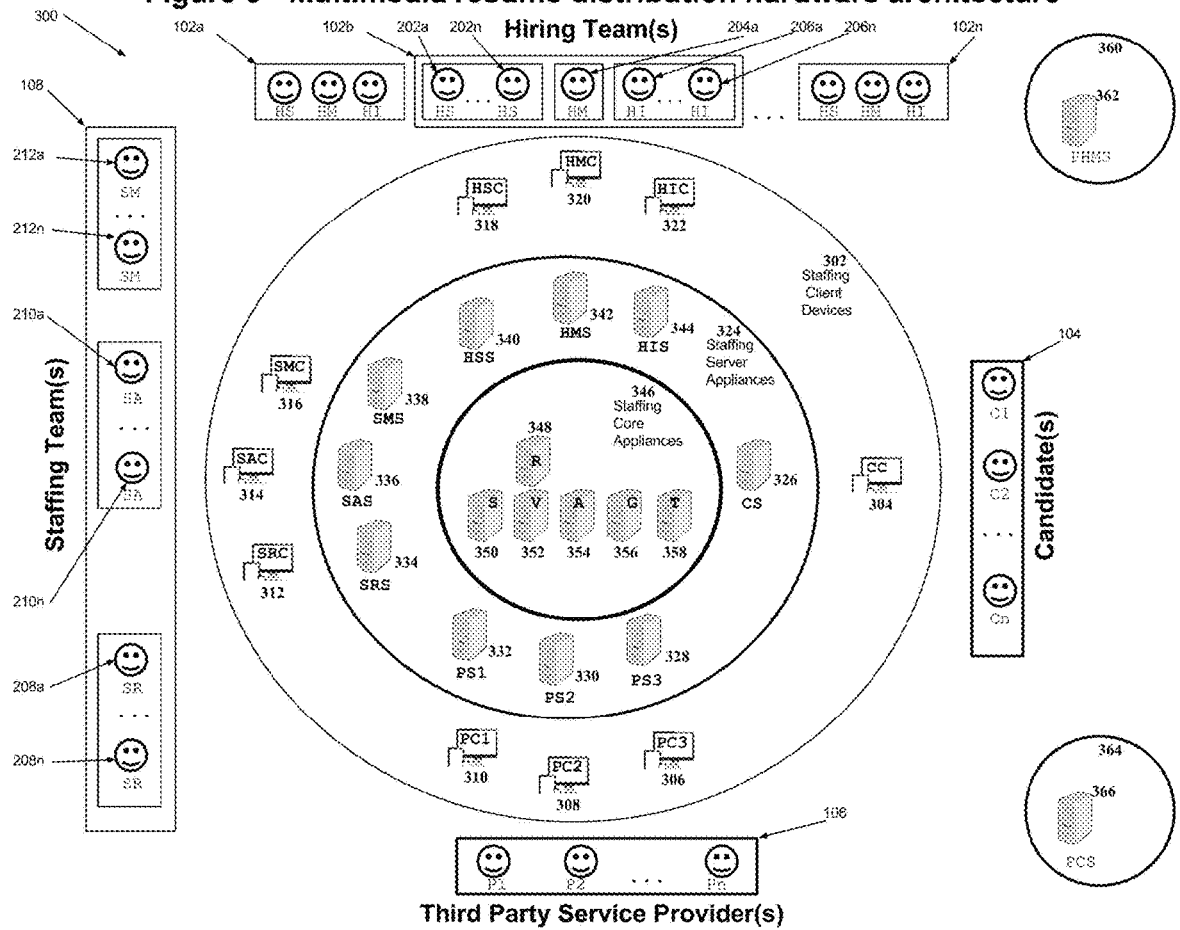
Figure 3 - Multimedia resume distribution hardware architecture

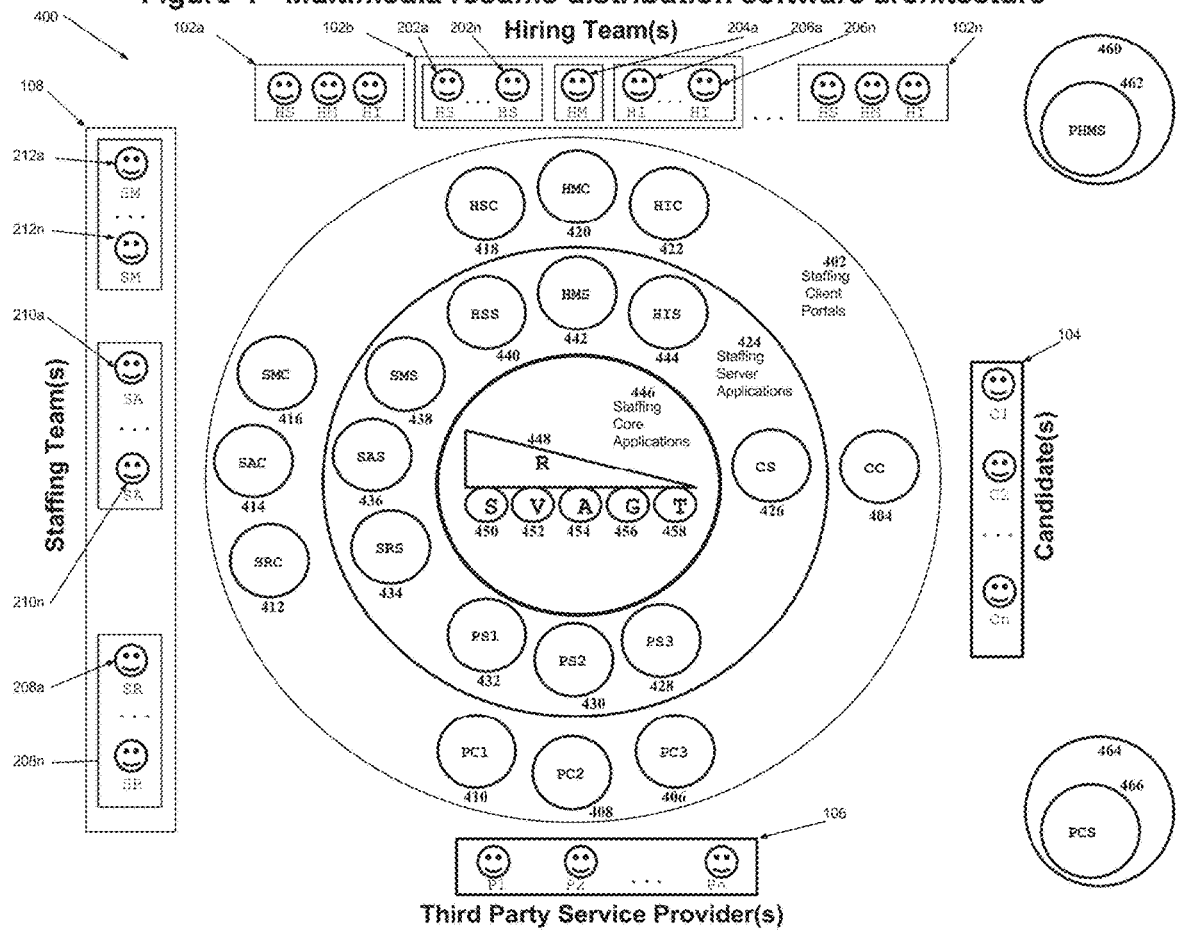
Figure 4 - Multimedia resume distribution software architecture

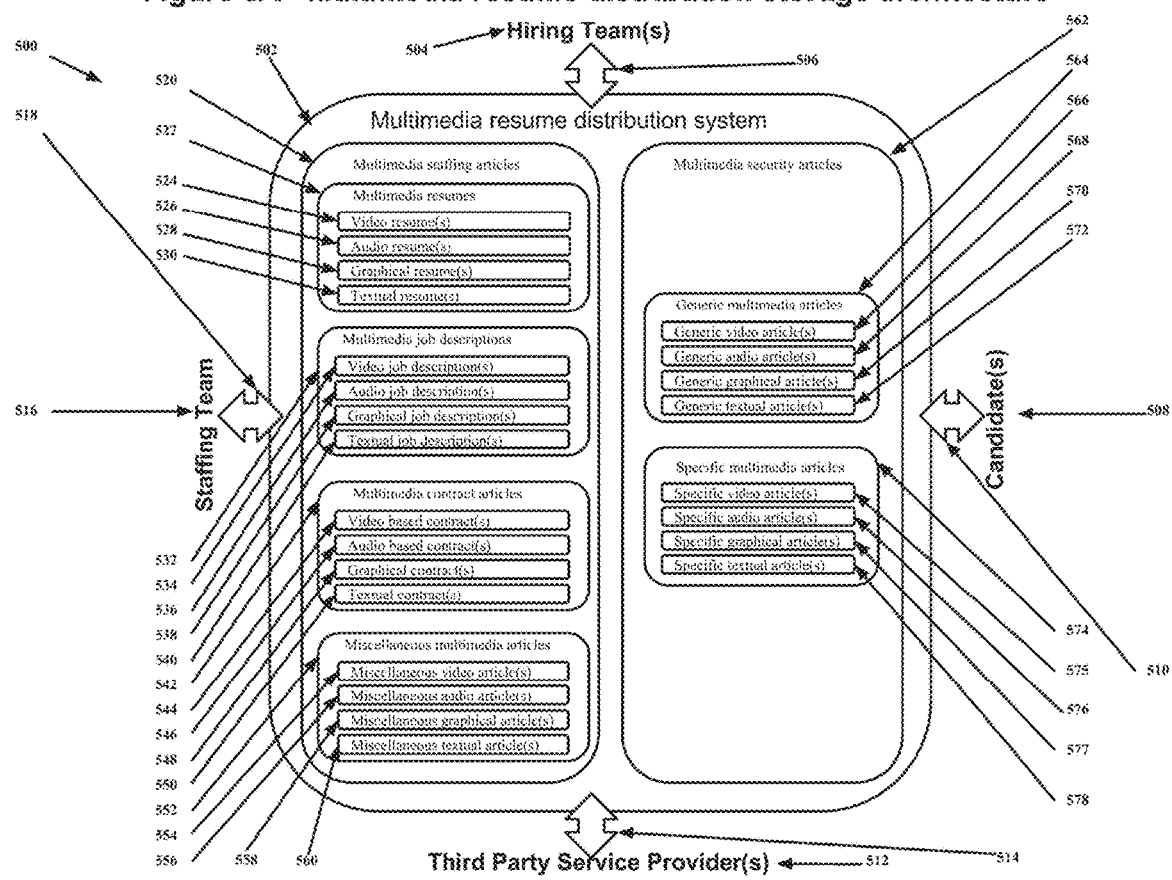

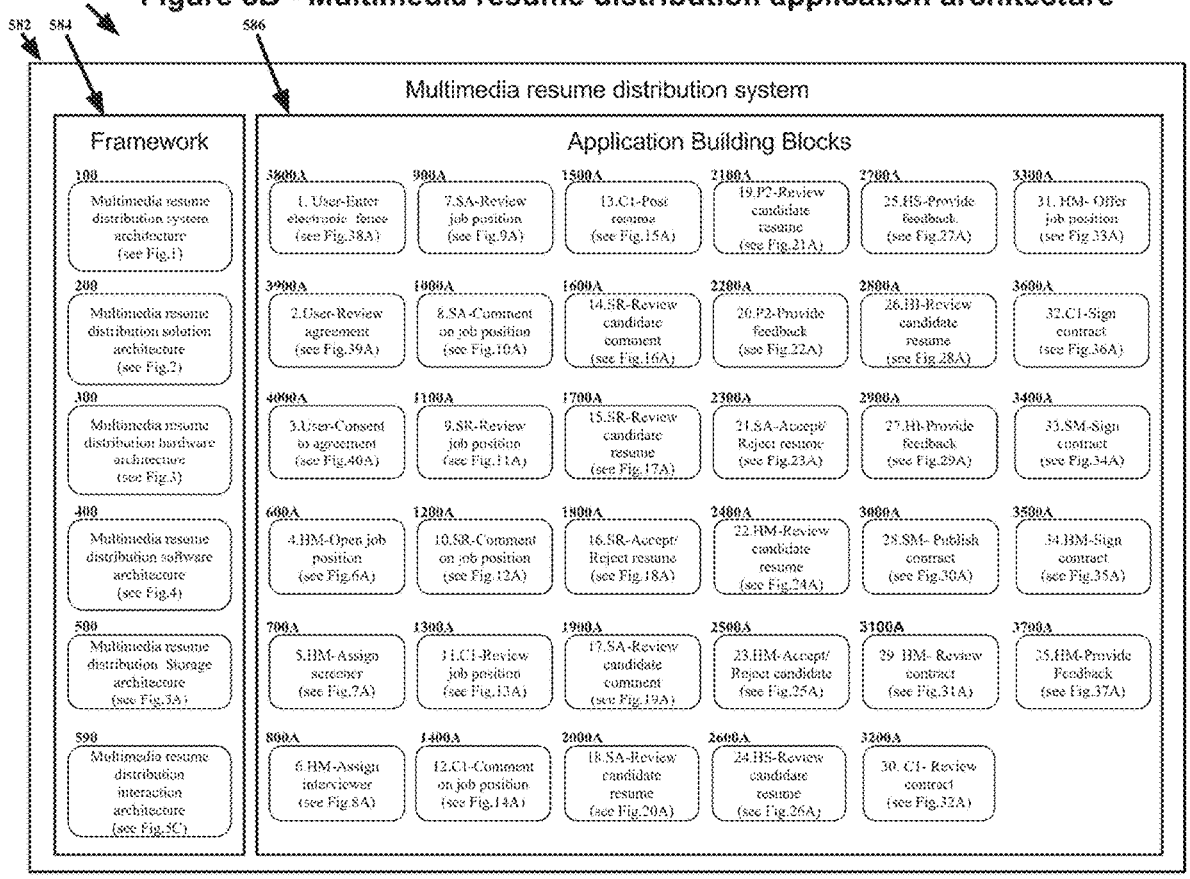

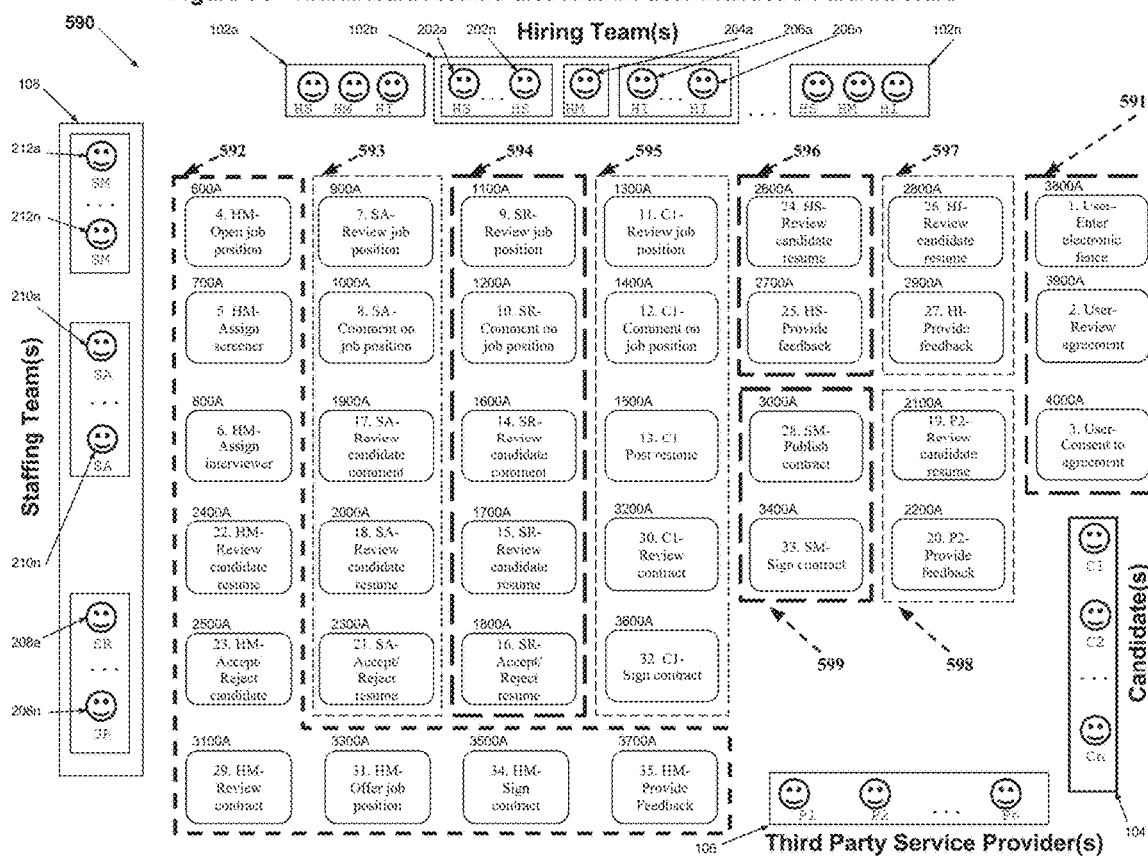
Figure 5C - Multimedia resume distribution user interaction architecture

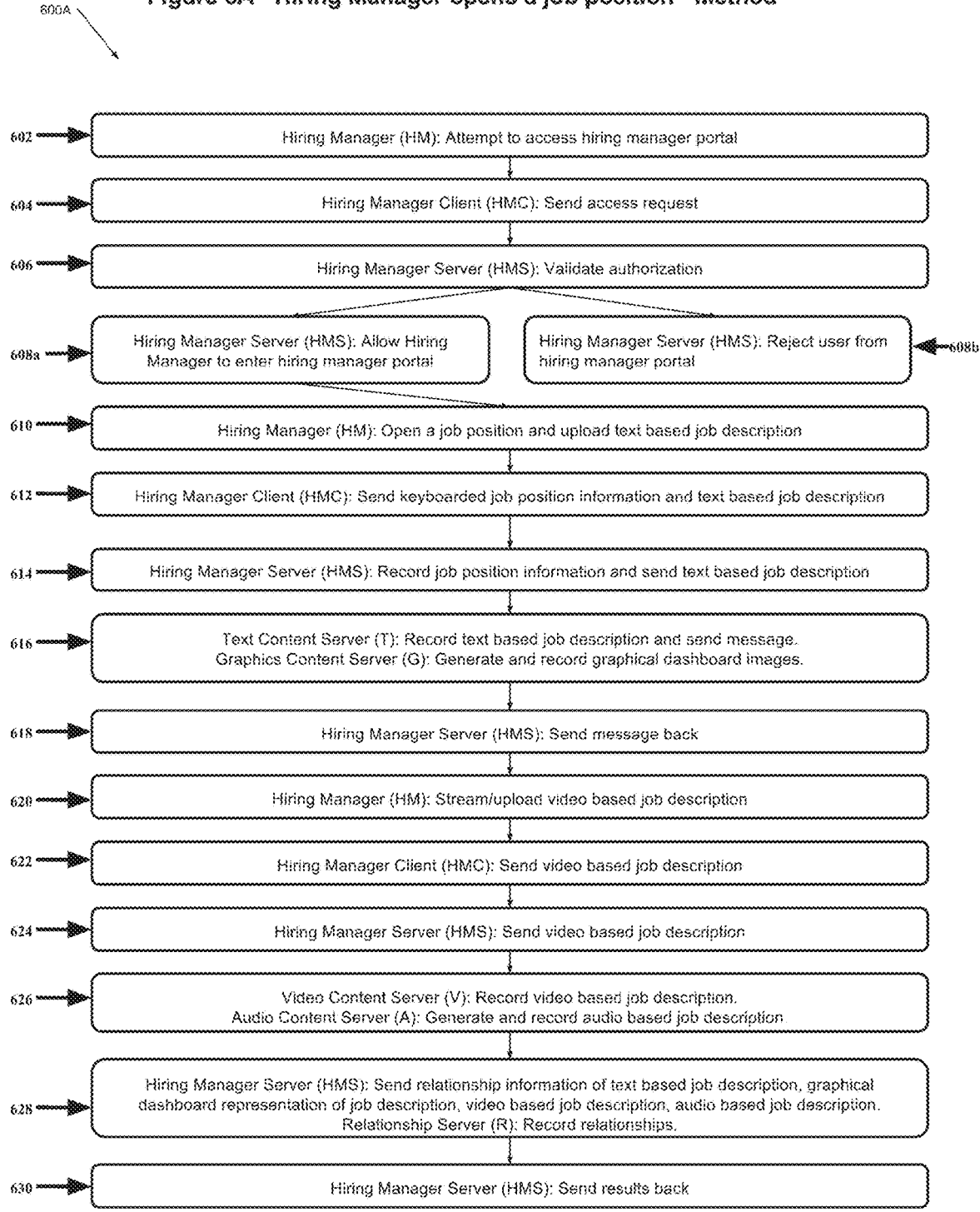

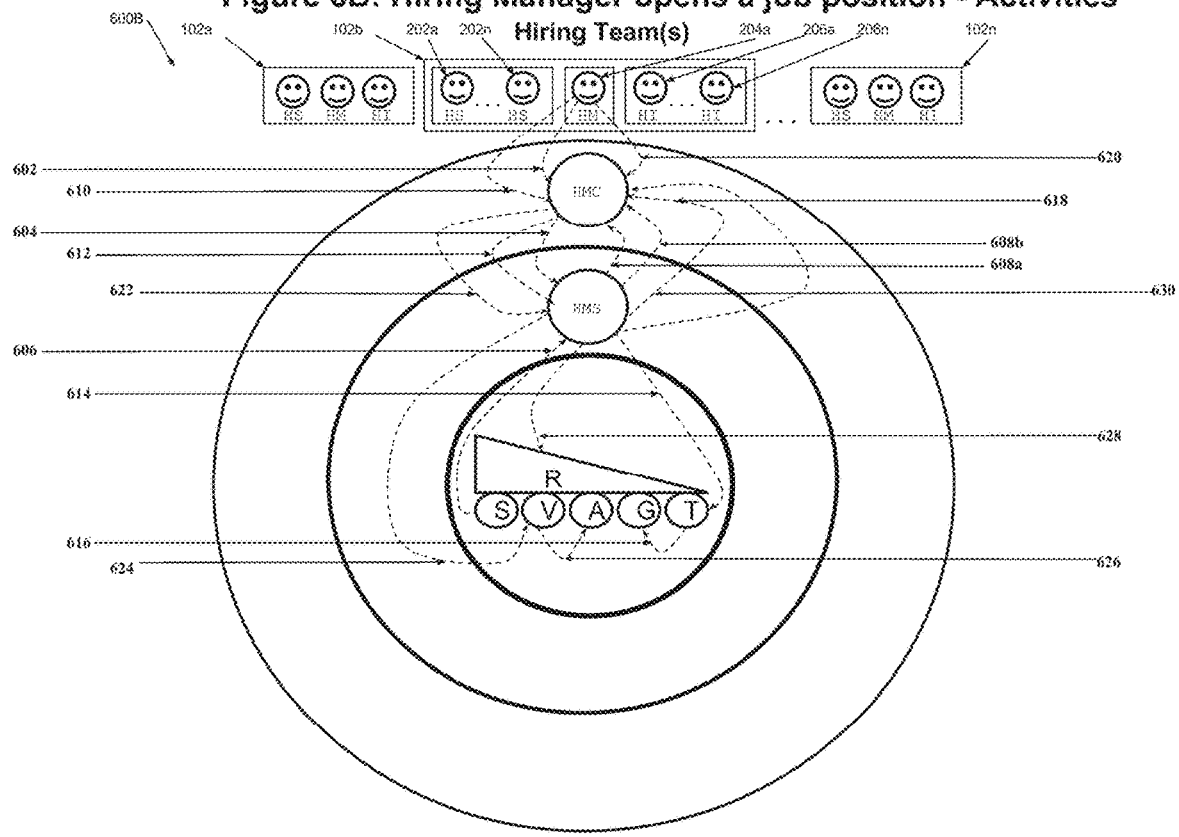

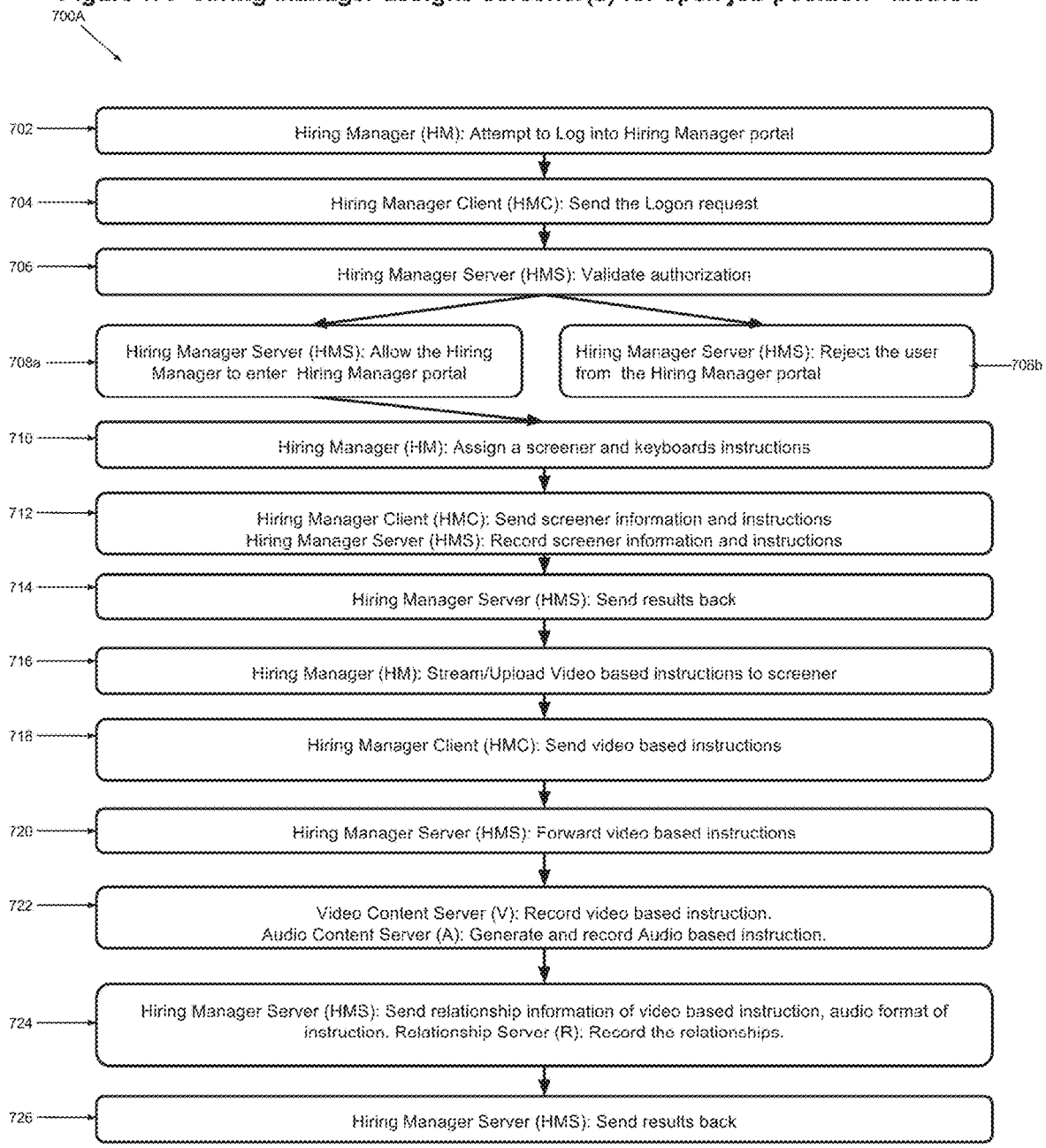

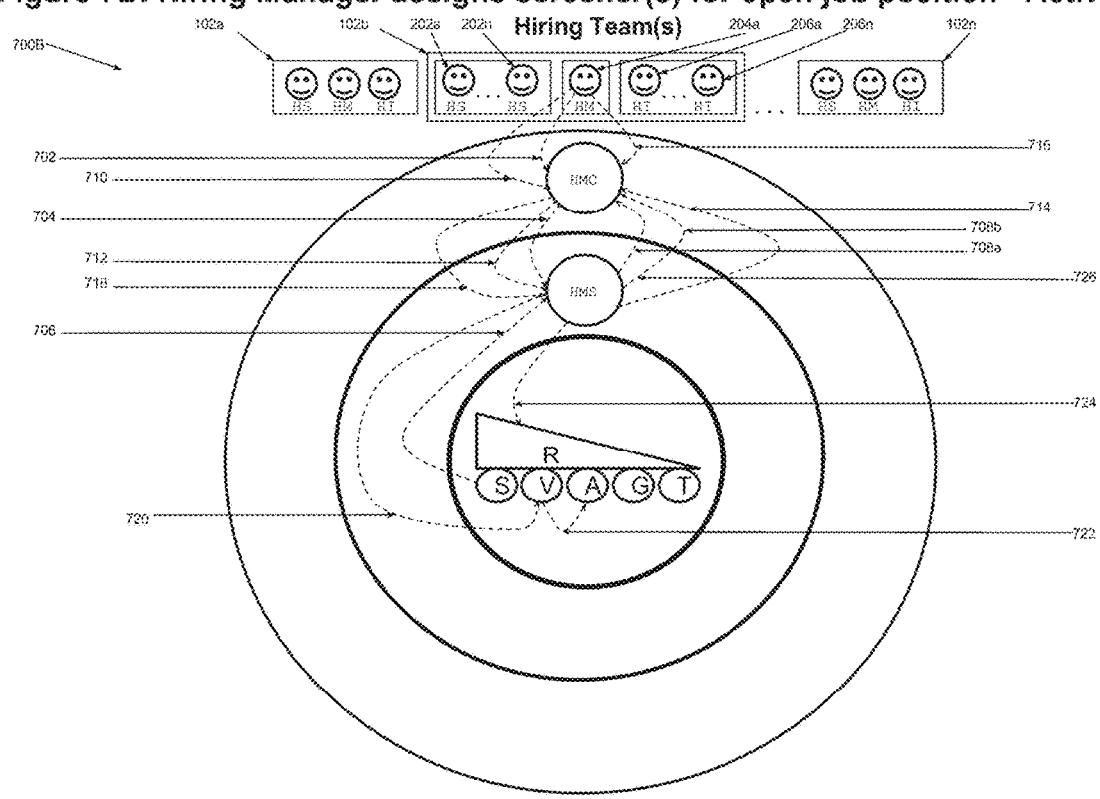
Figure 7B: Hiring Manager assigns screener(s) for open job position - Activities

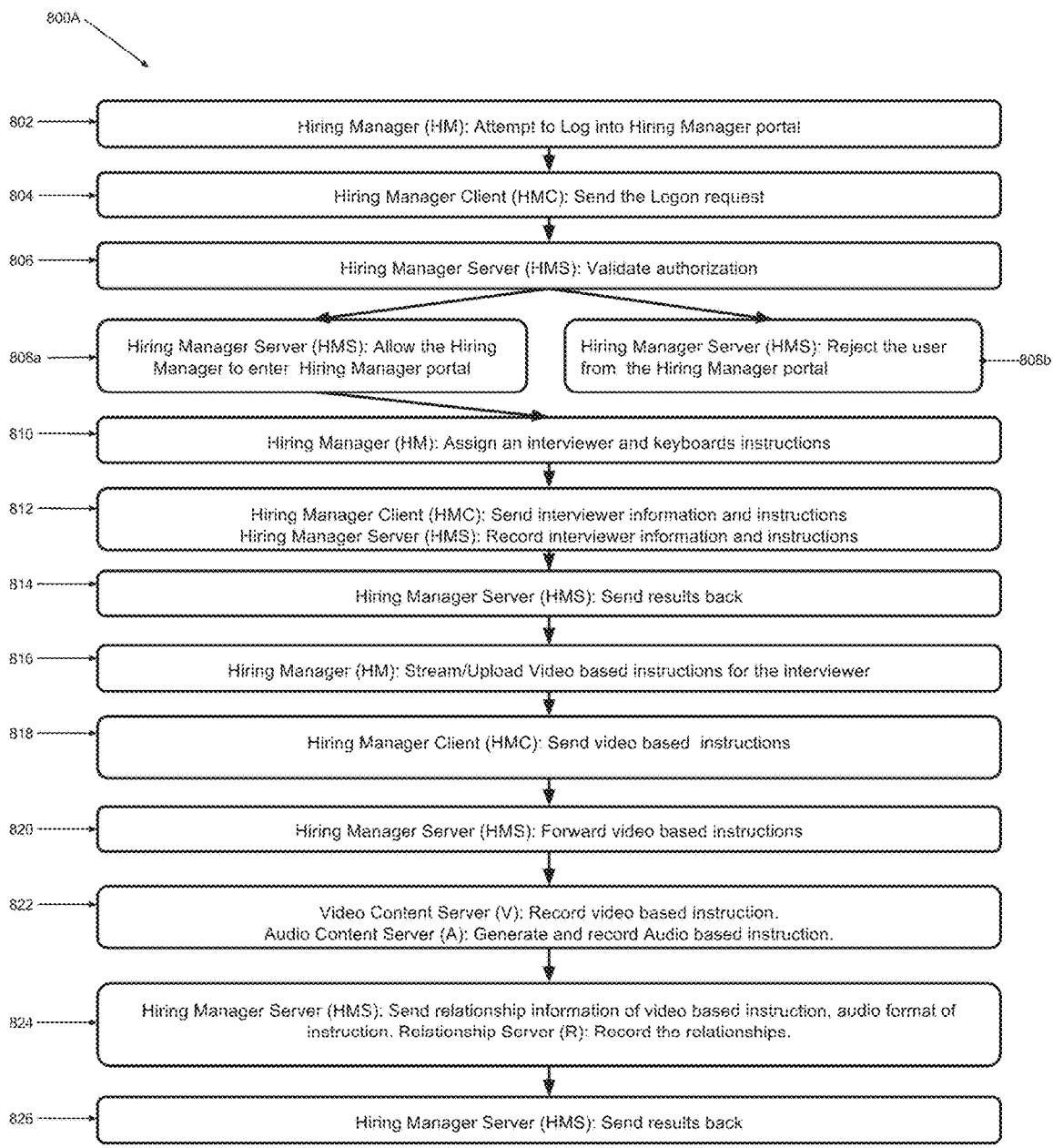

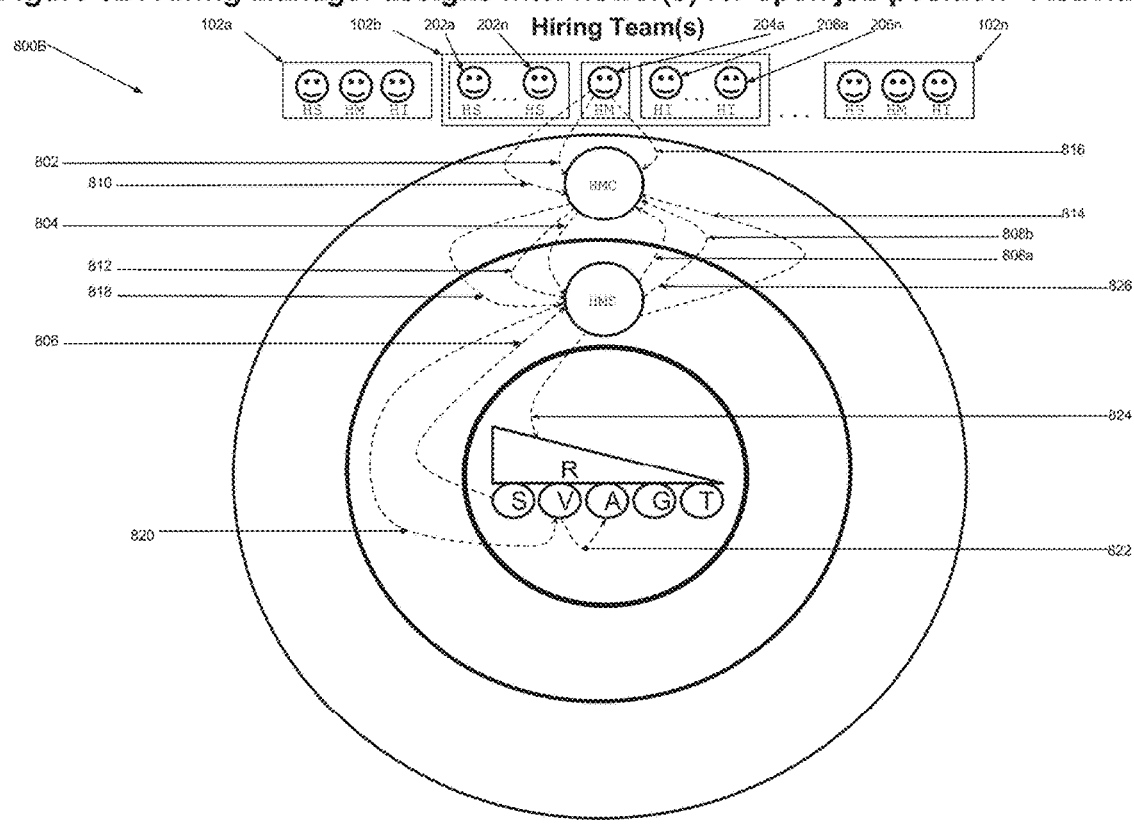
Figure 8B: Hiring Manager assigns interviewer(s) for open job position - Activities

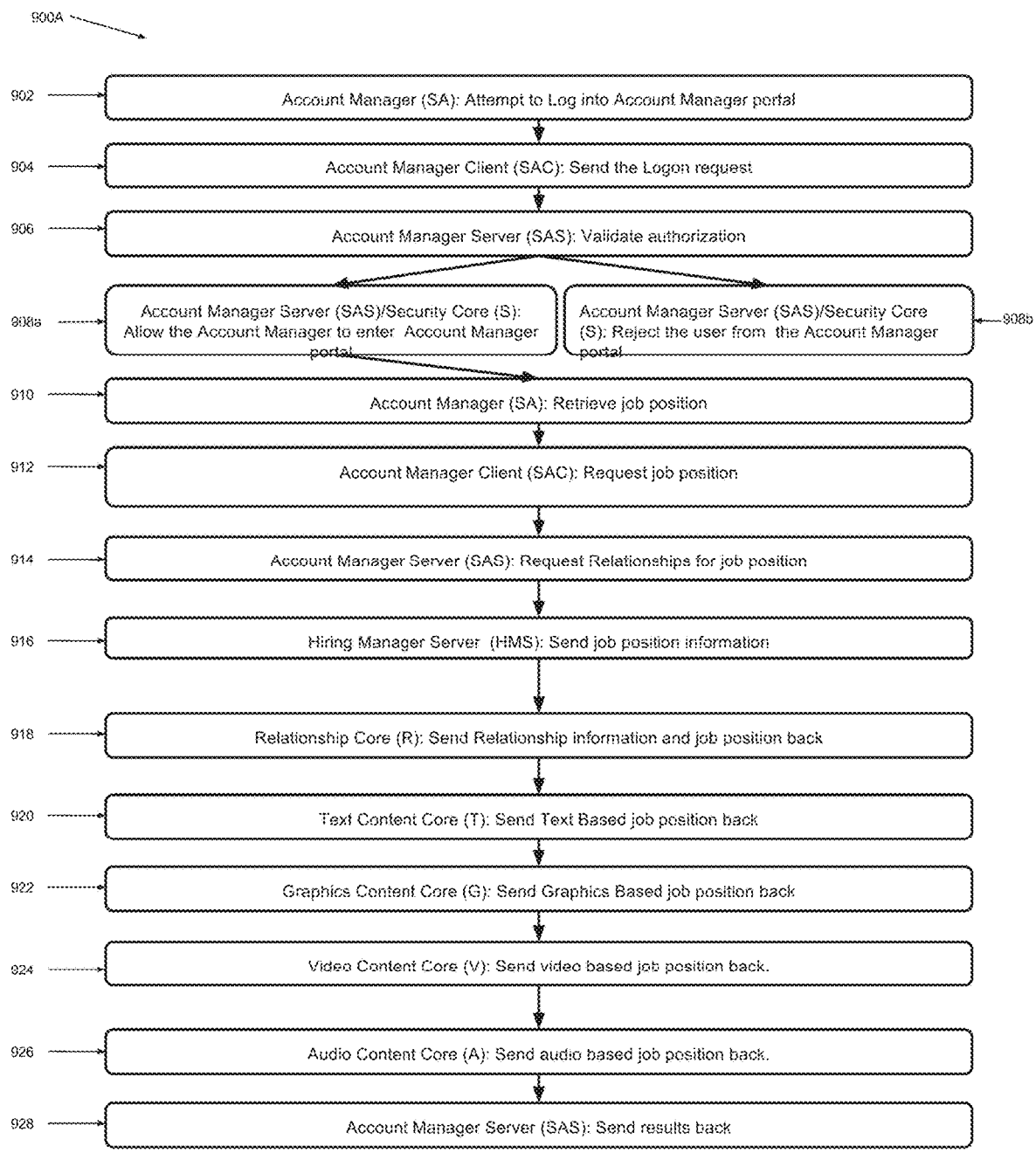

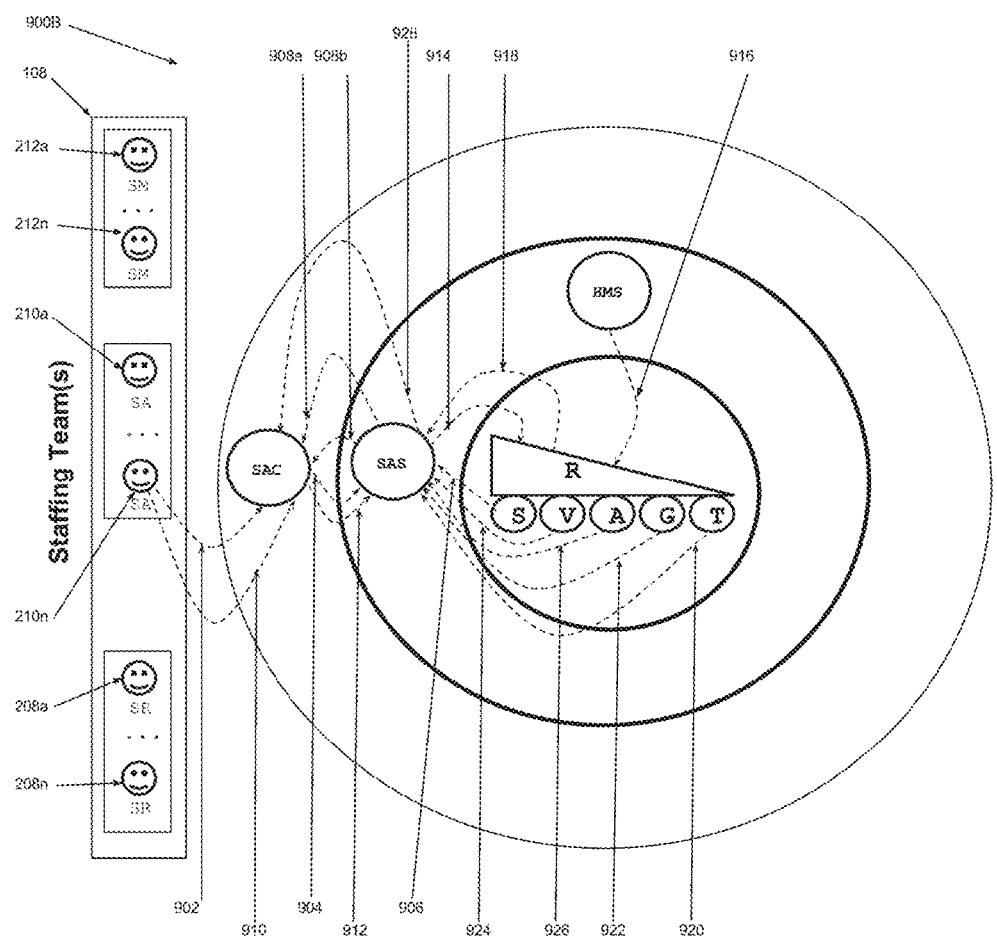
Figure 9B: Account Manager reviews open job position - Activities

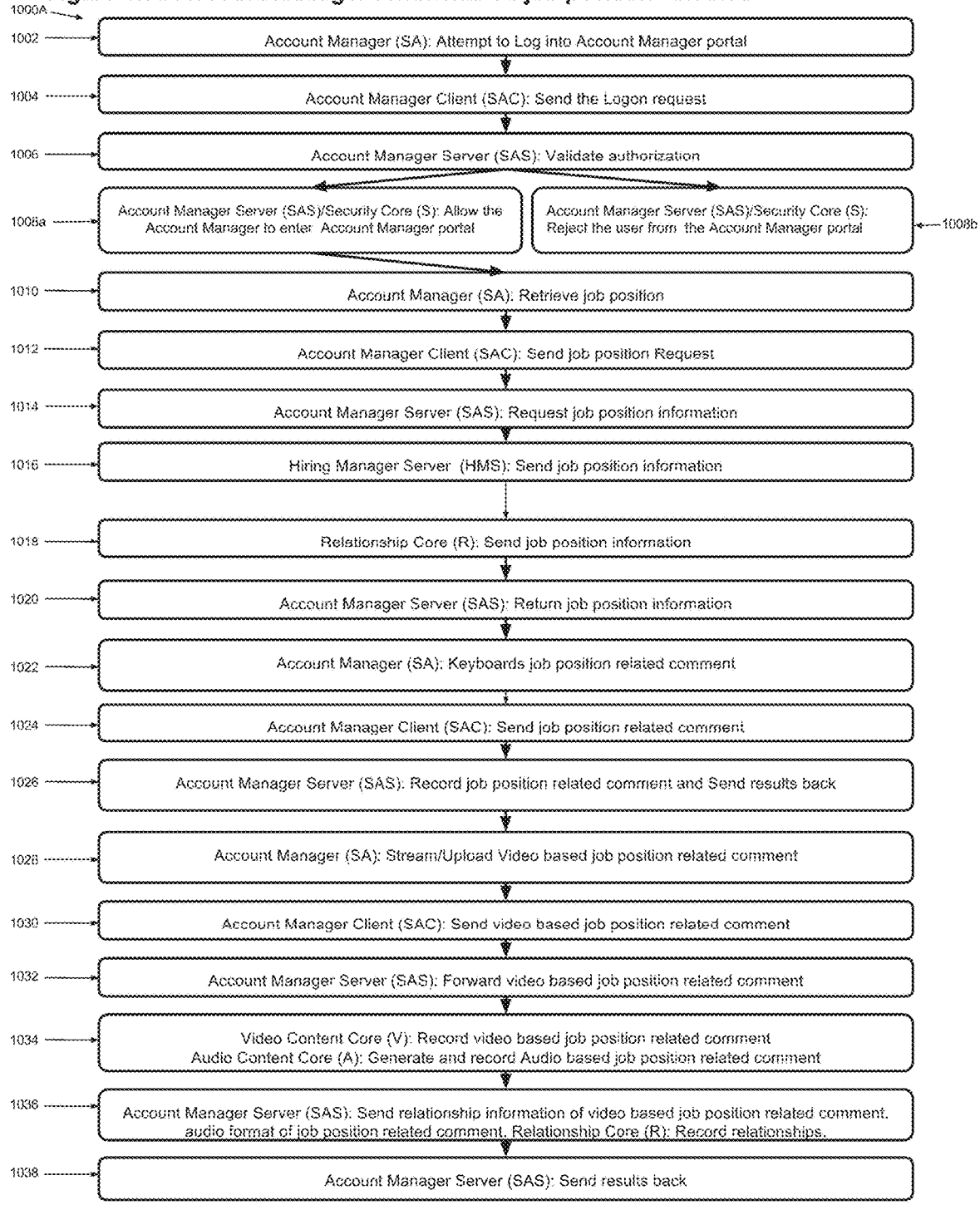

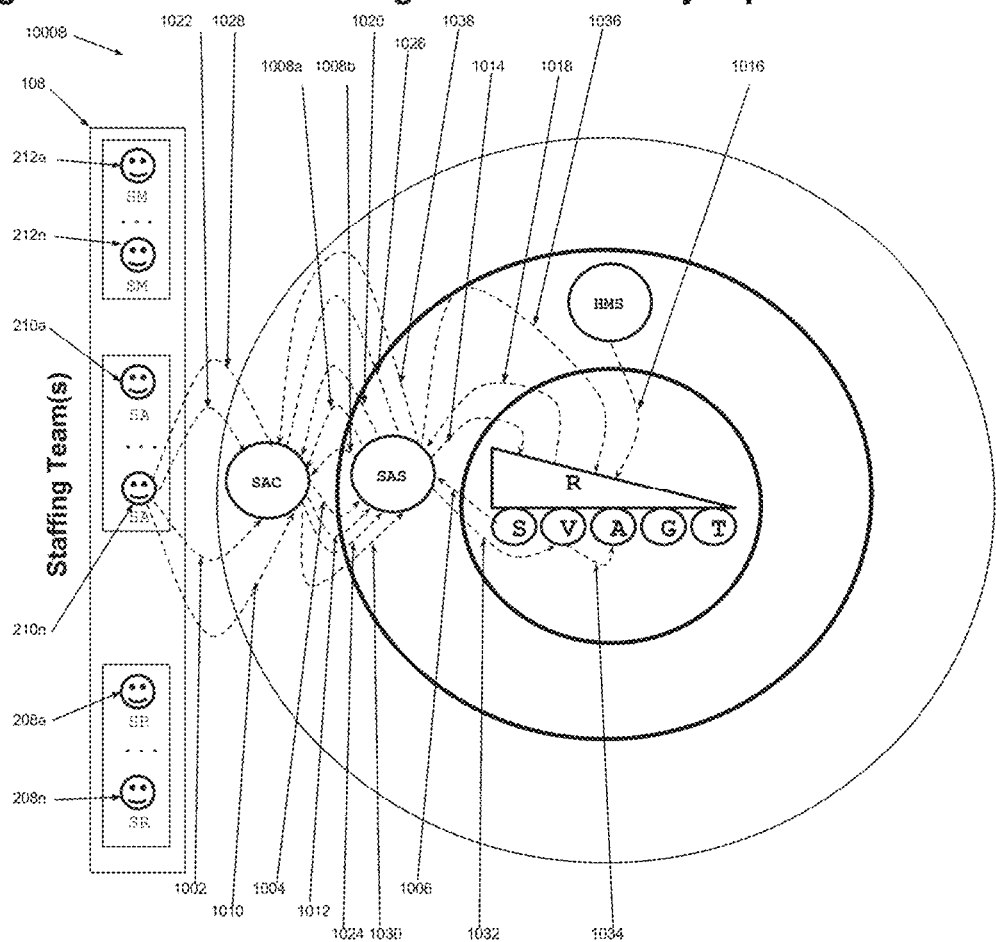
Figure 10B: Account Manager comments on job position - Activities

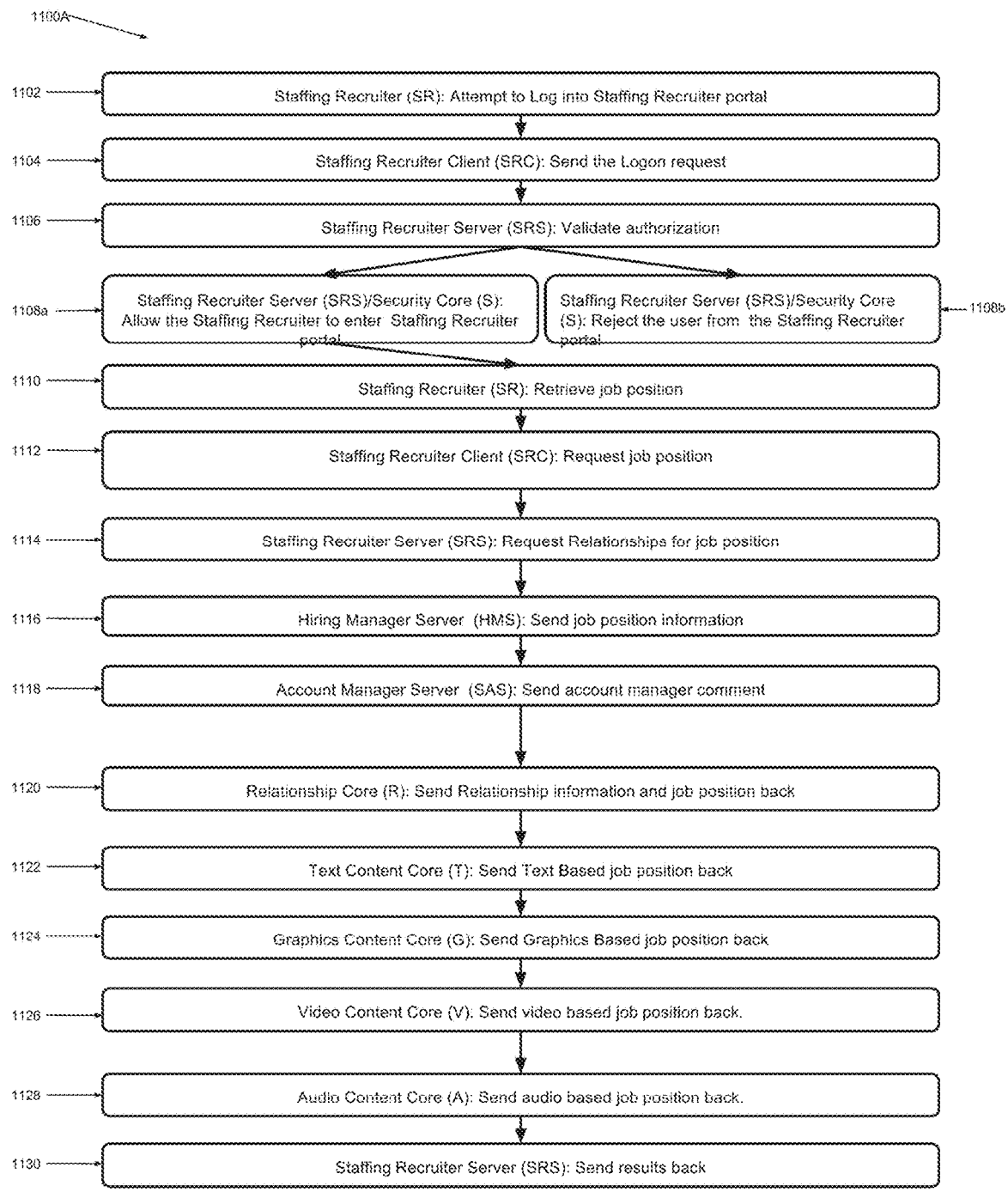

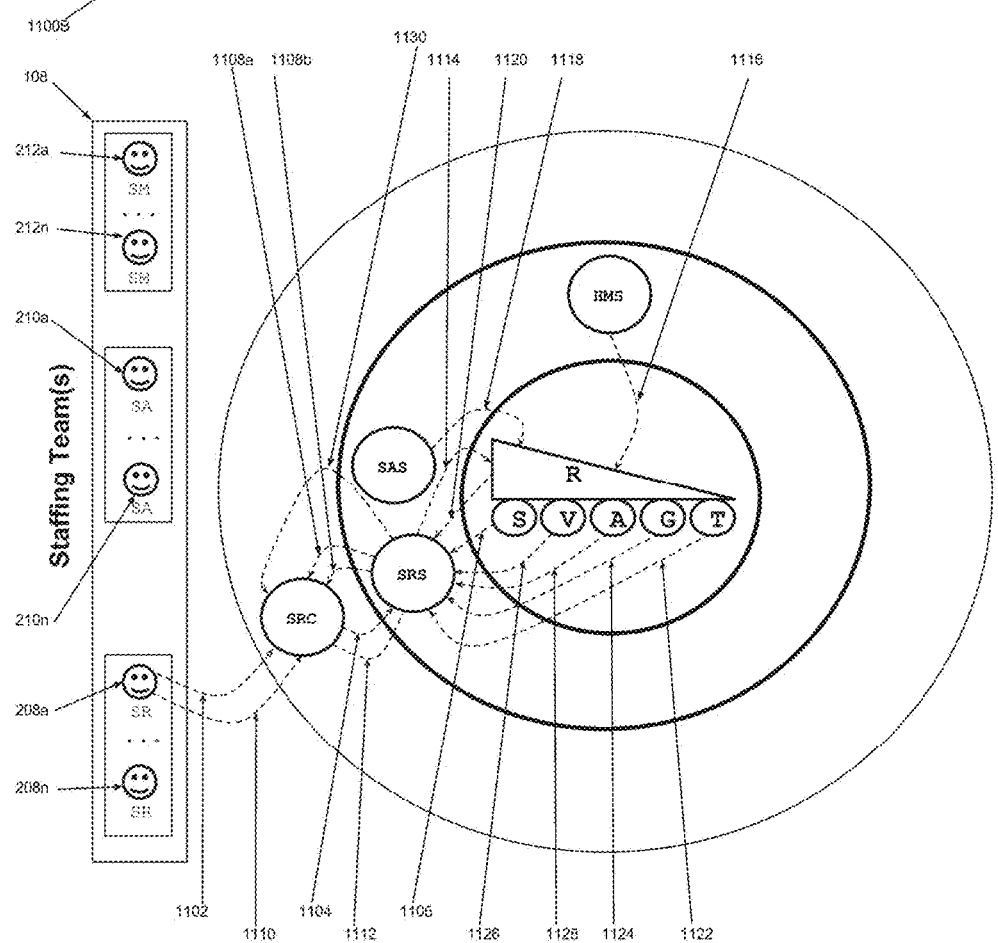
Figure 11B: Staffing Recruiter reviews job position - Activities

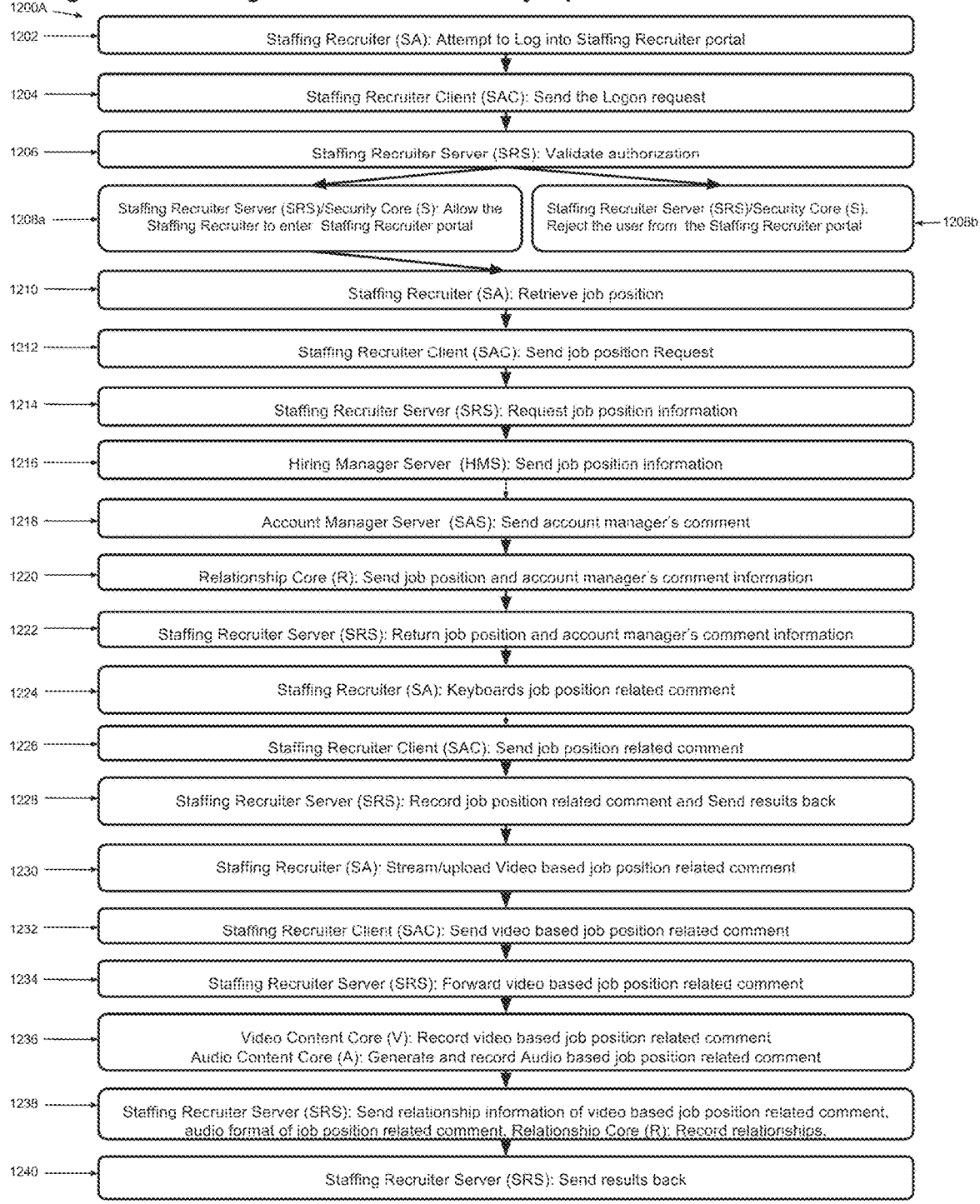

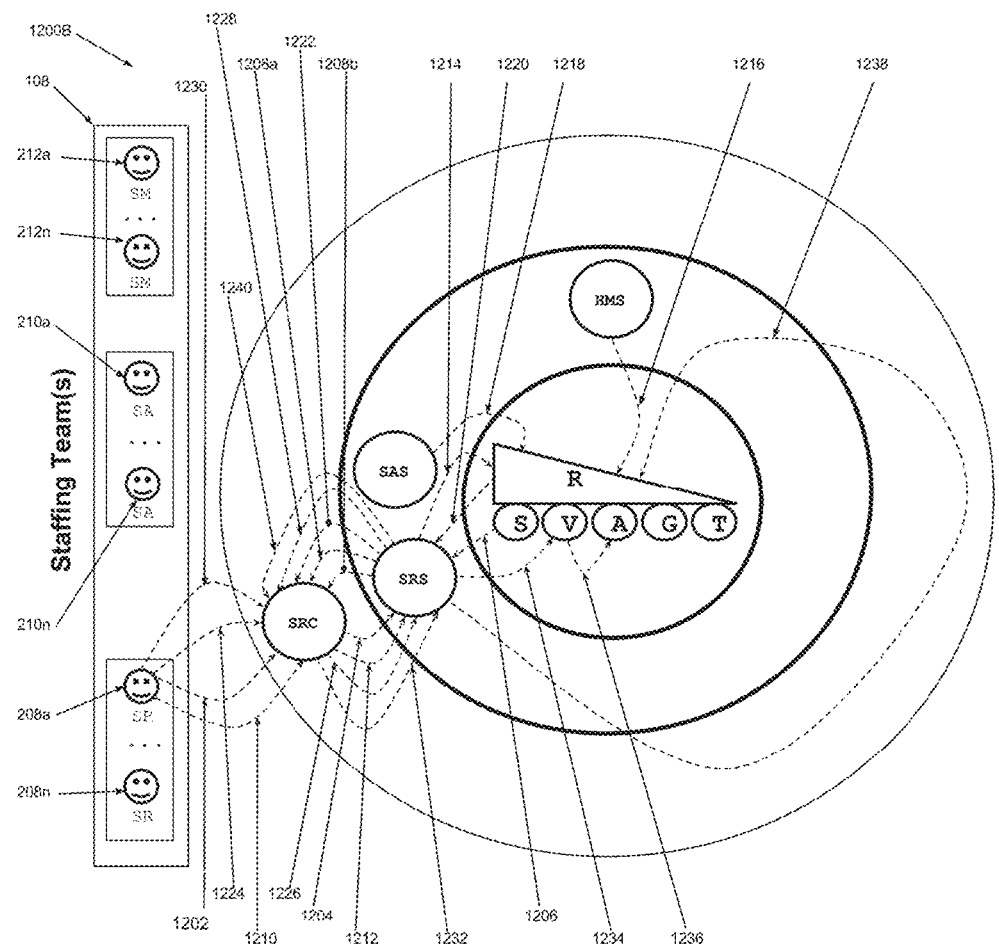
Figure 12B: Staffing Recruiter comments on job position - Activities

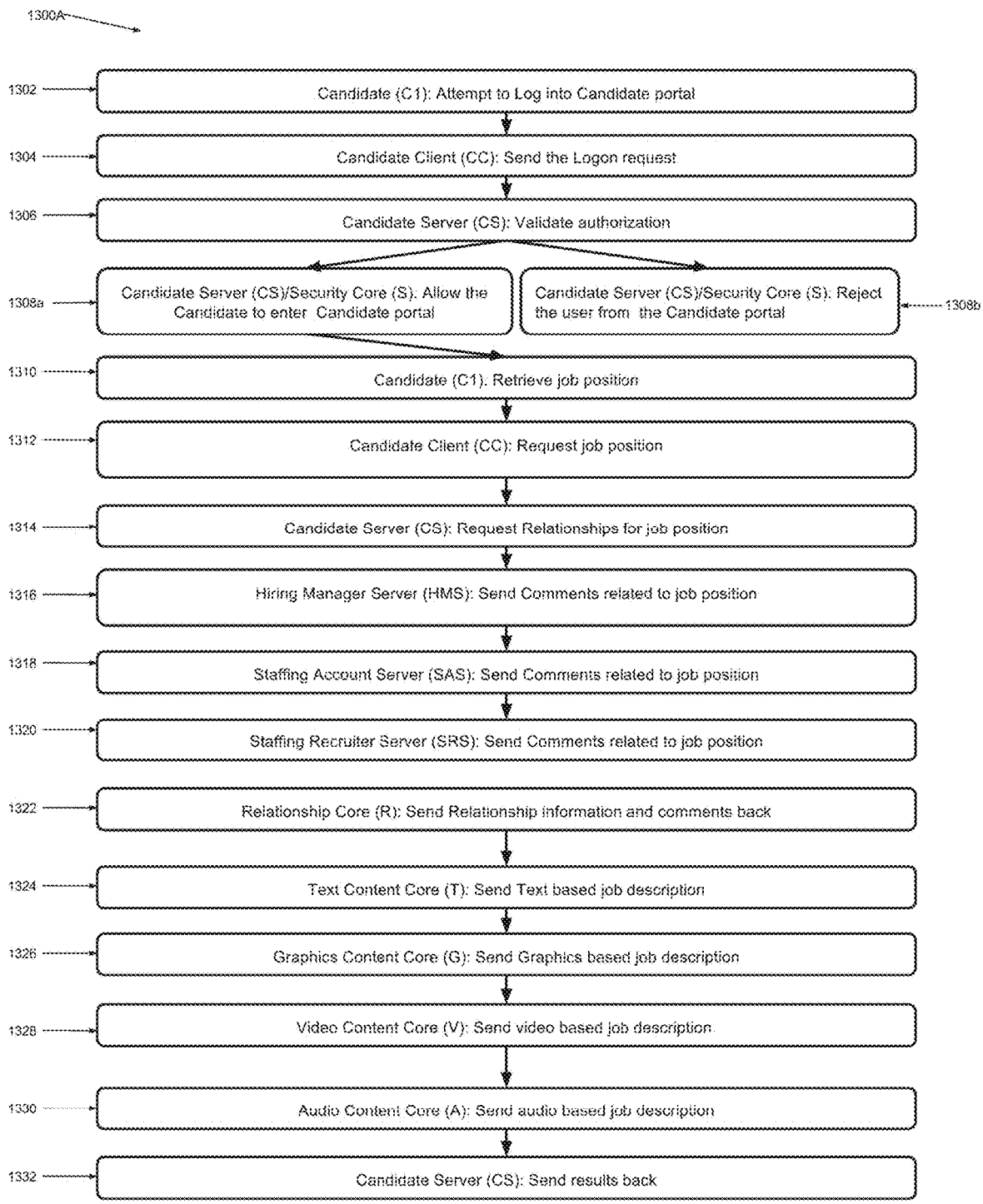

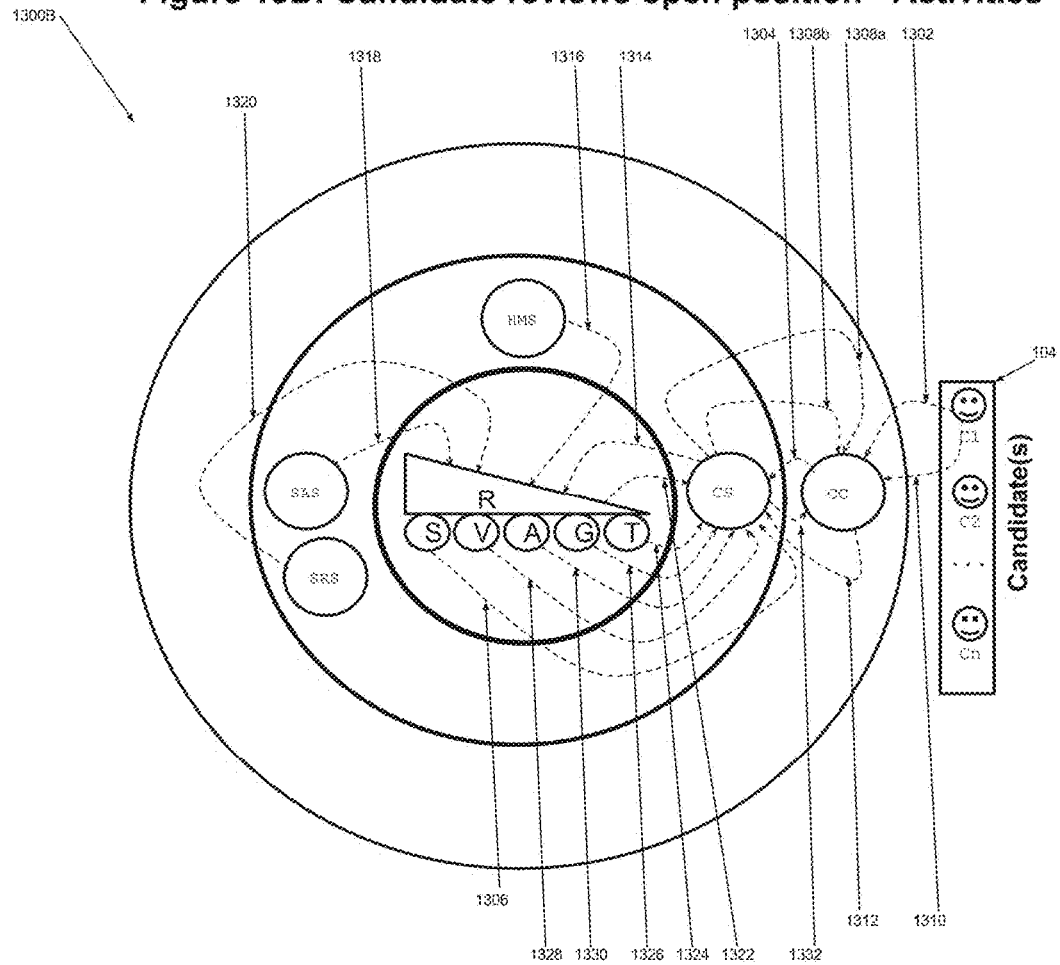
Figure 13B: Candidate reviews open position - Activities

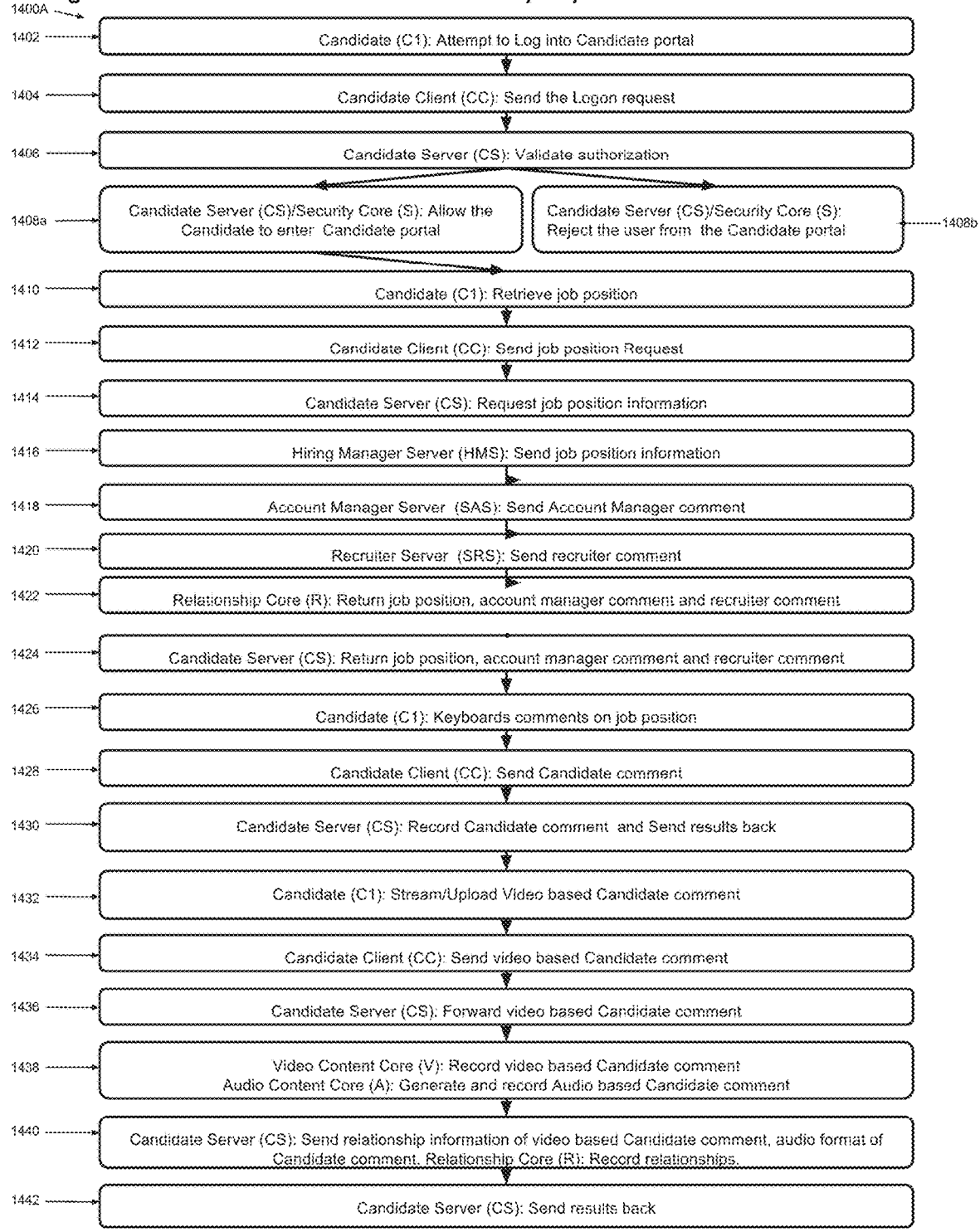

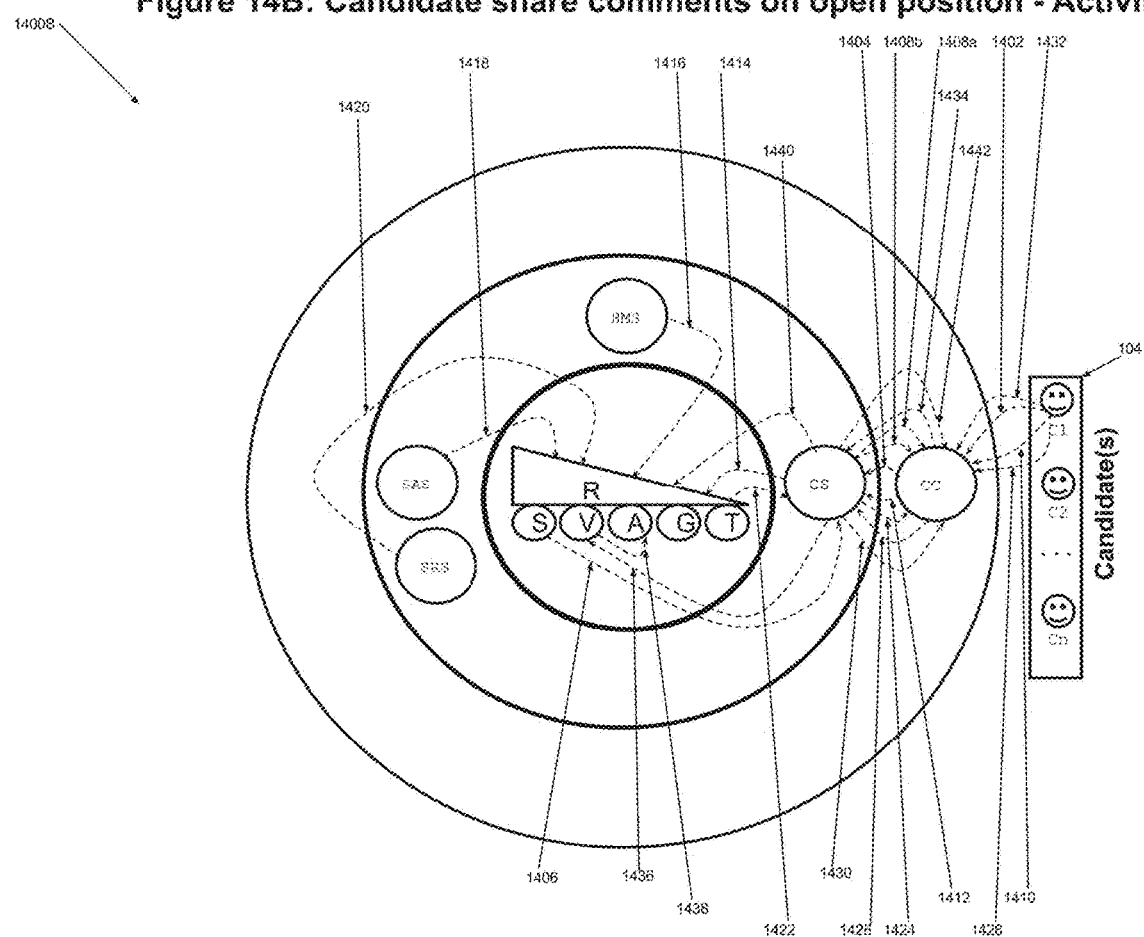
Figure 14B: Candidate share comments on open position - Activities

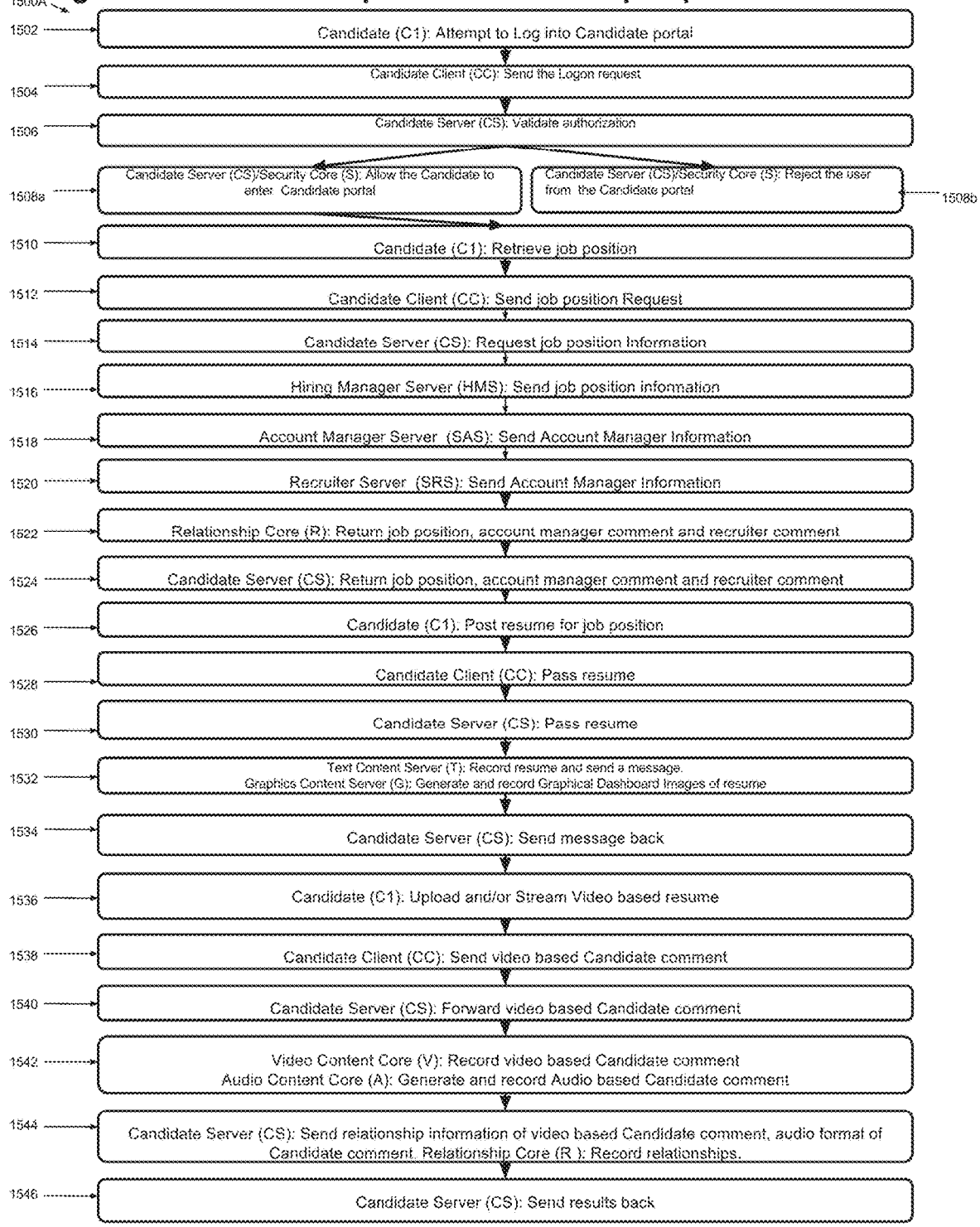

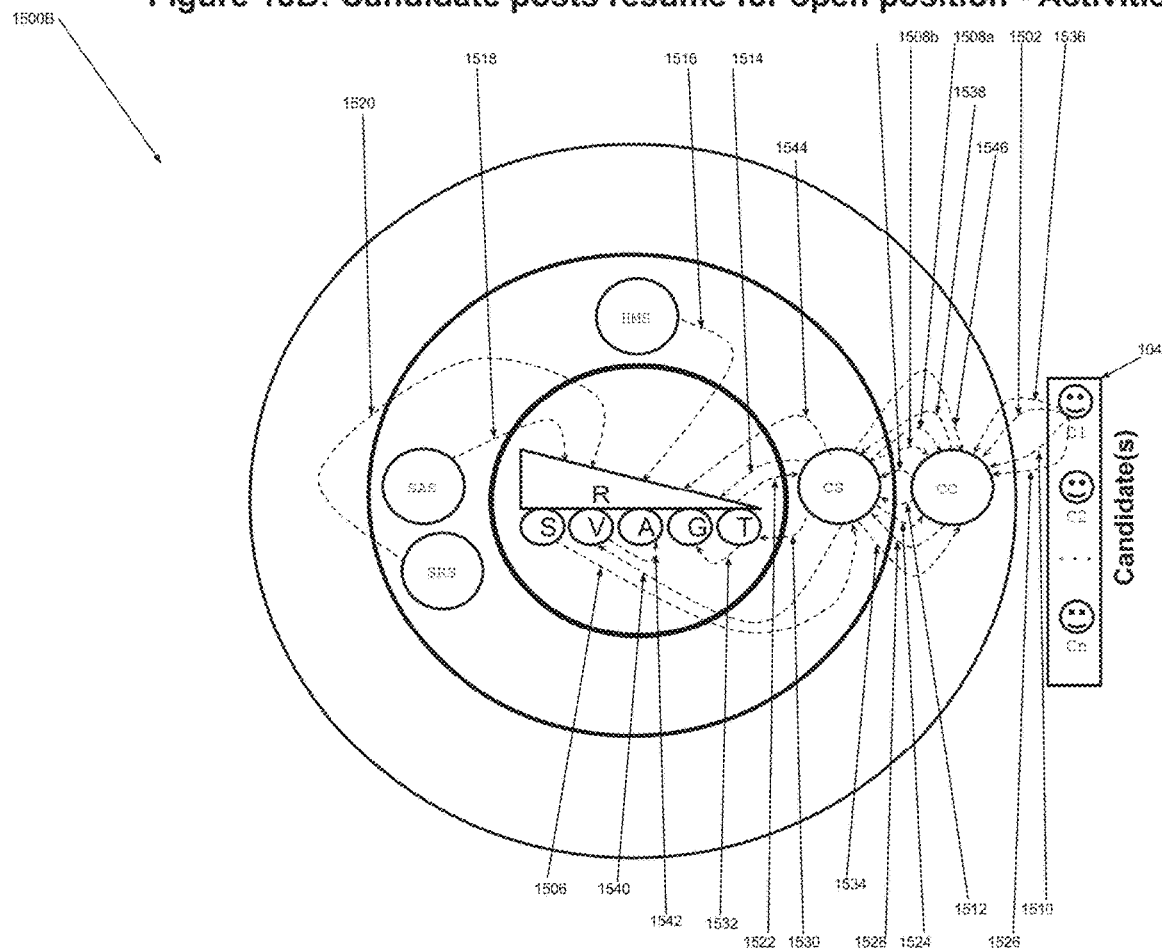
Figure 15B: Candidate posts resume for open position - Activities

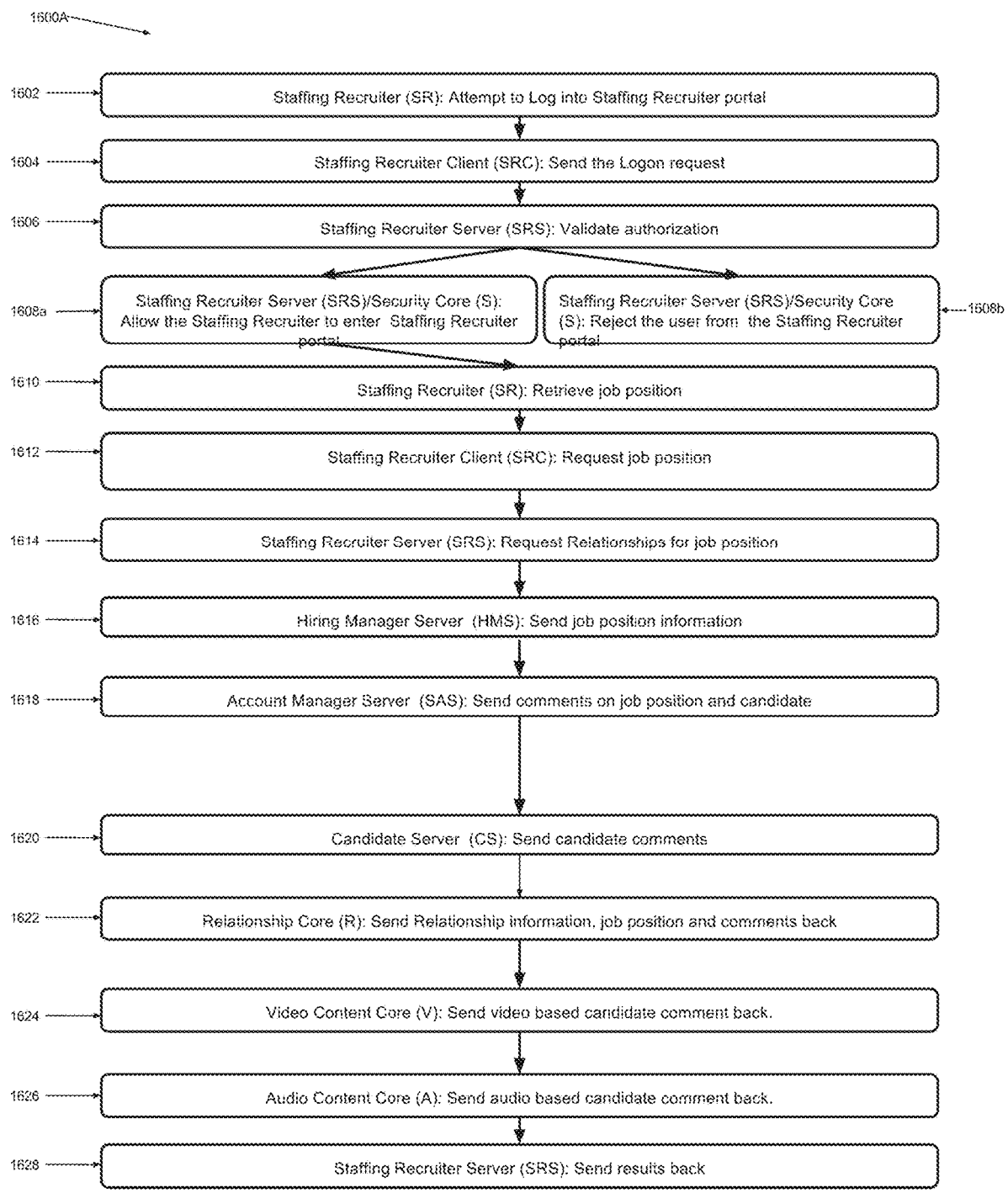

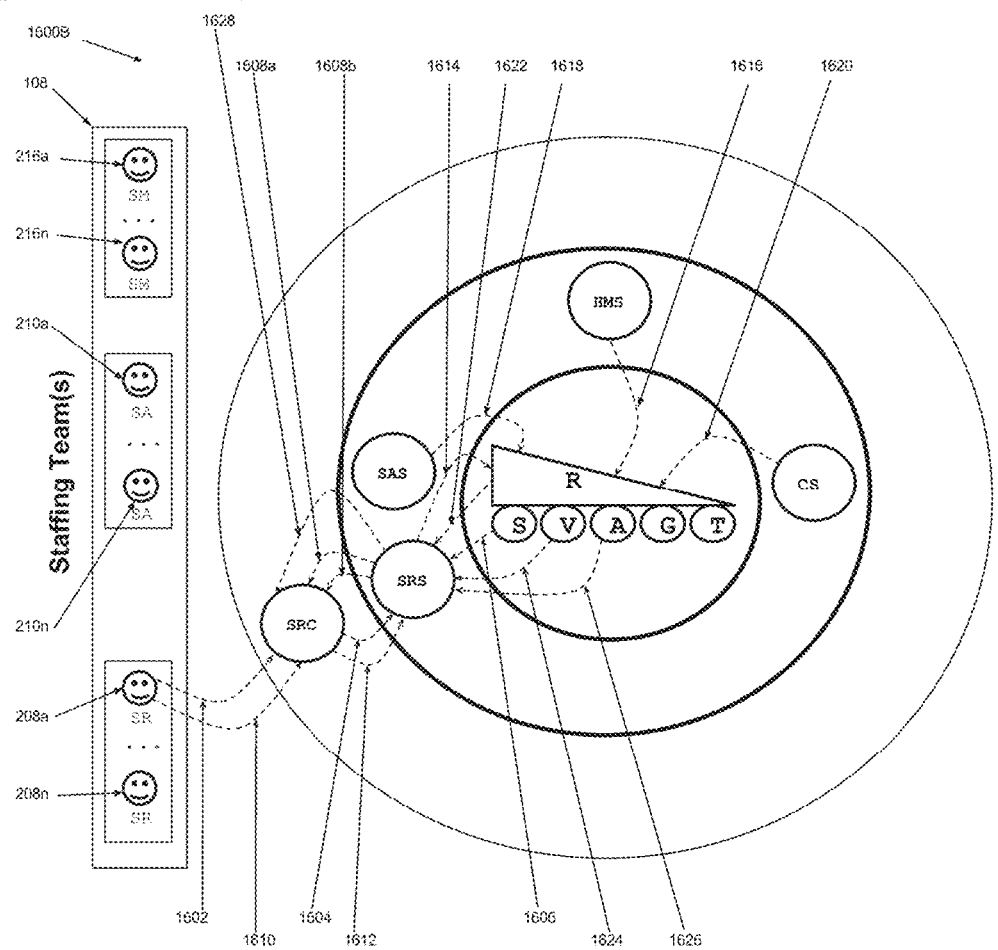
Figure 16B: Staffing Recruiter reviews candidate comments - Activities

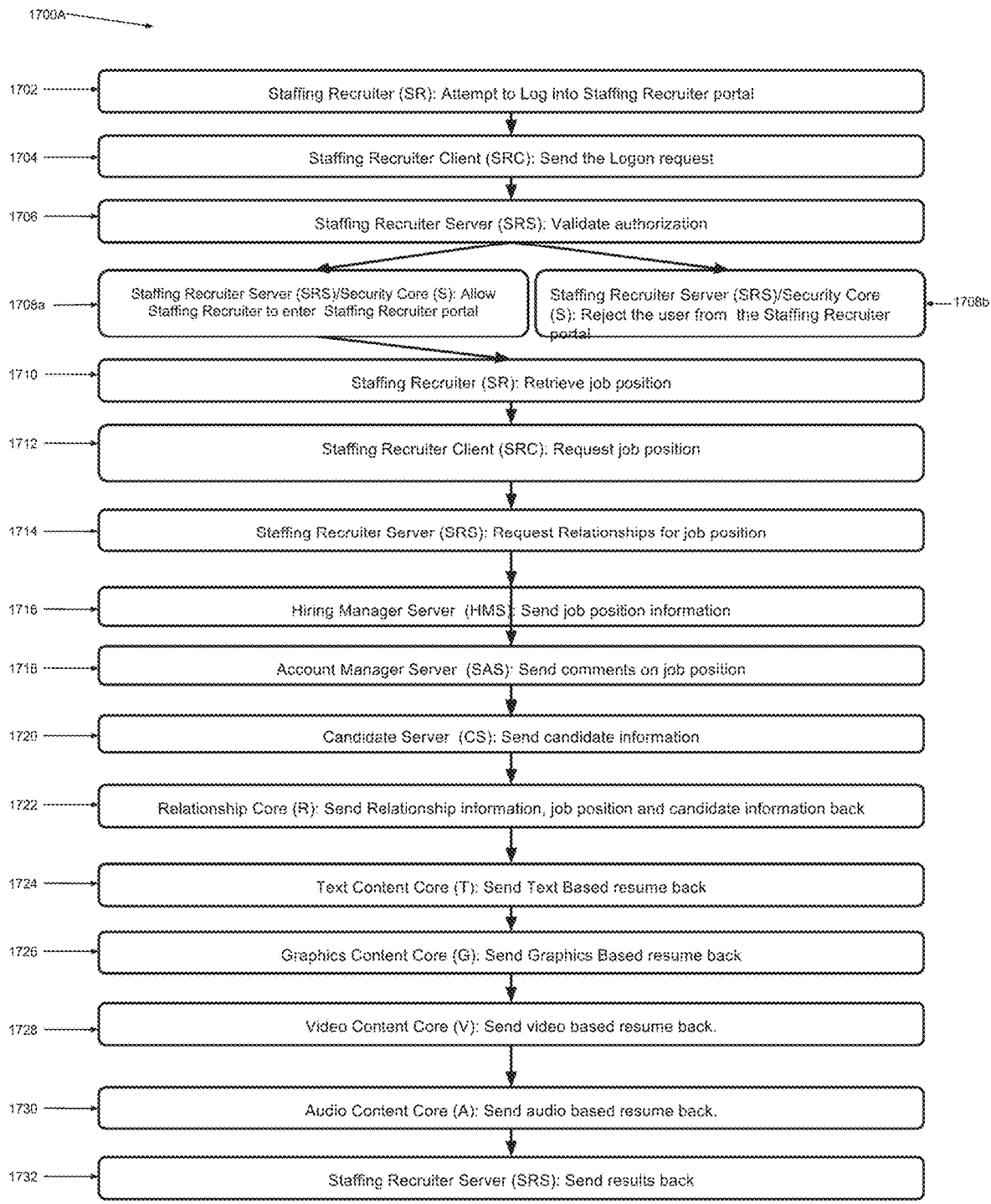

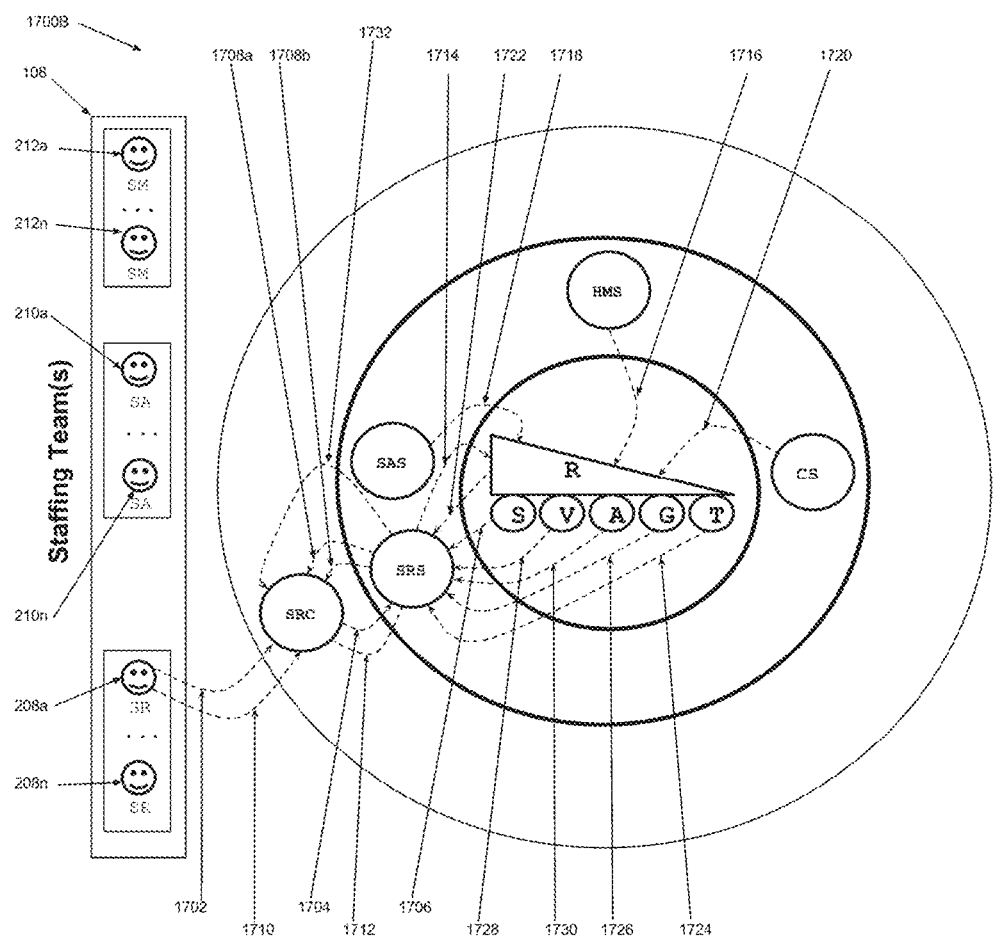
Figure 17B: Staffing Recruiter reviews candidate resume - Activities

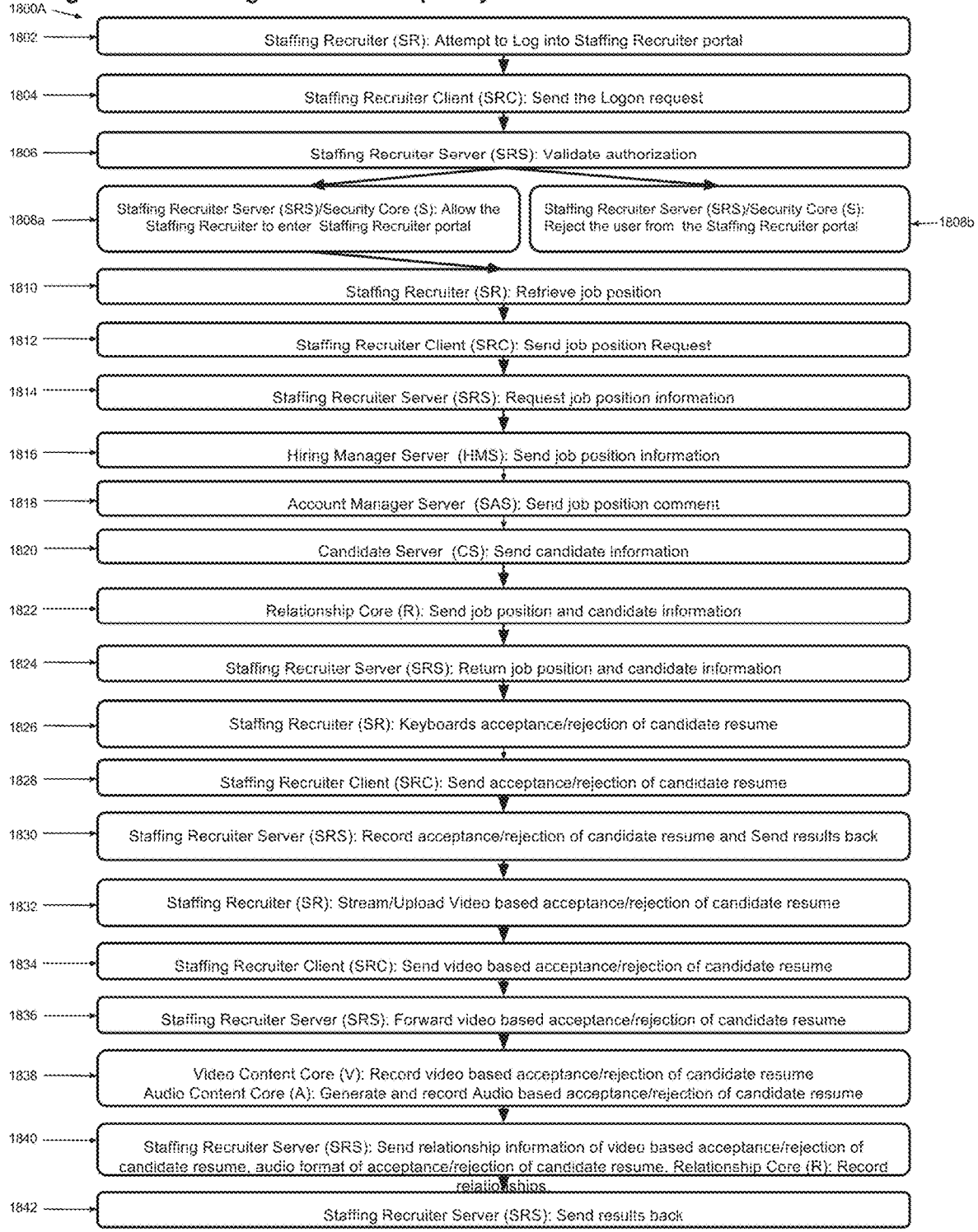

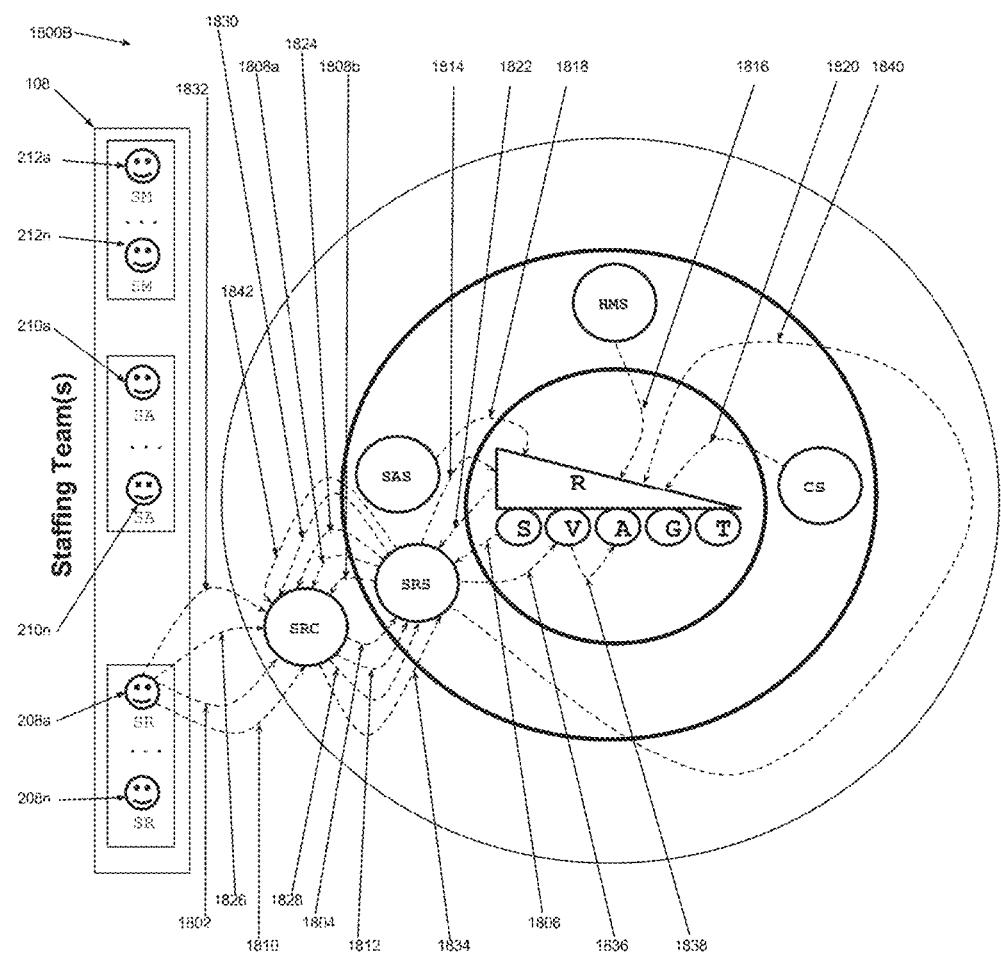
Figure 18B: Staffing recruiter accepts/rejects candidate's resume - Activities

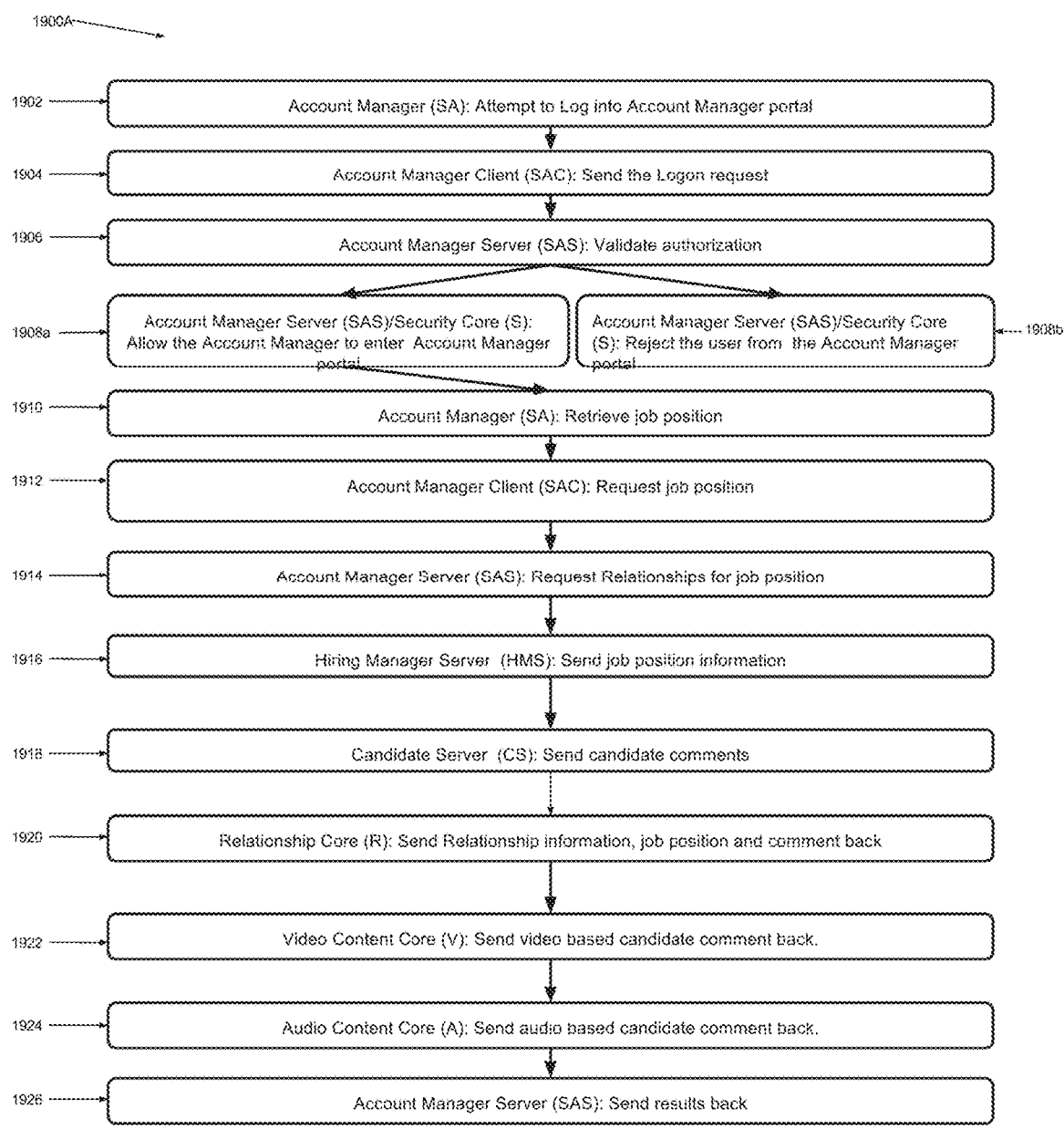

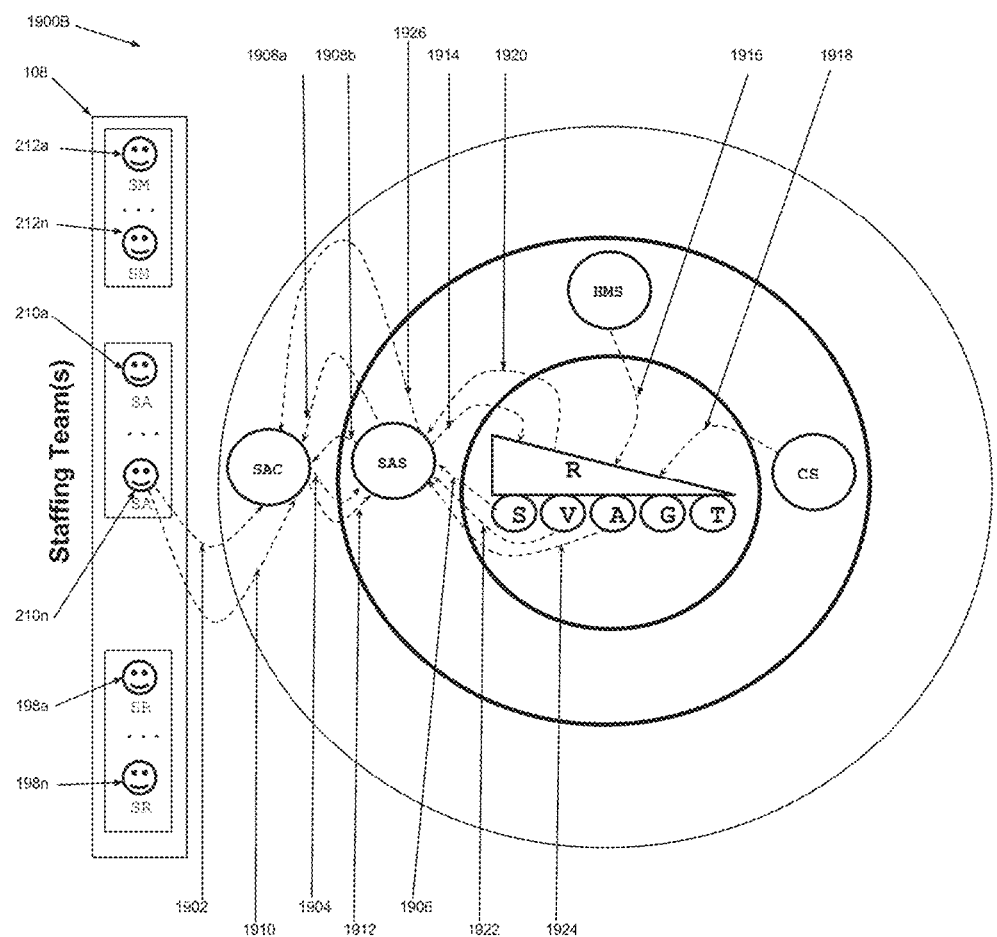
Figure 19B: Account Manager reviews candidate comments - Activities

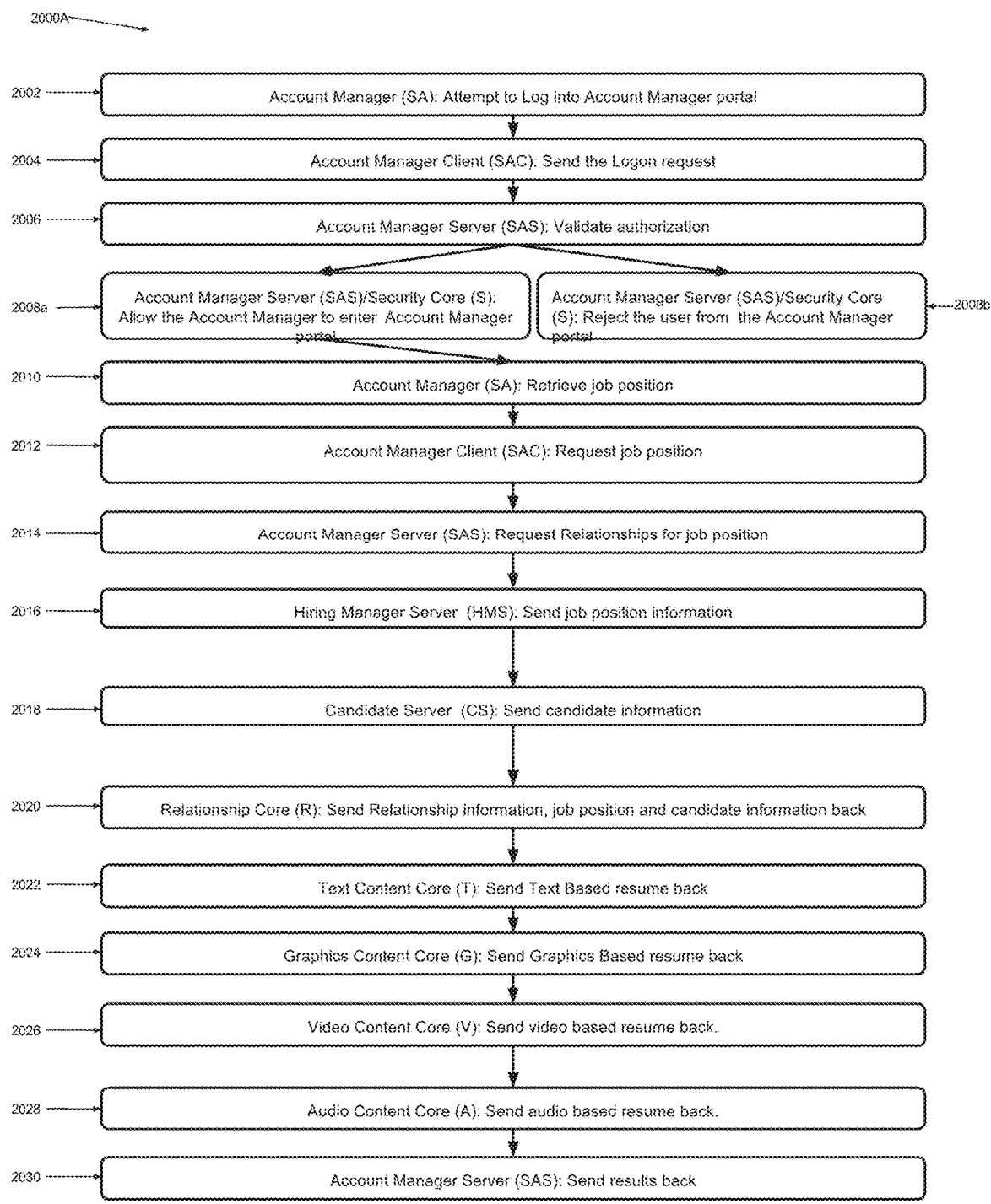

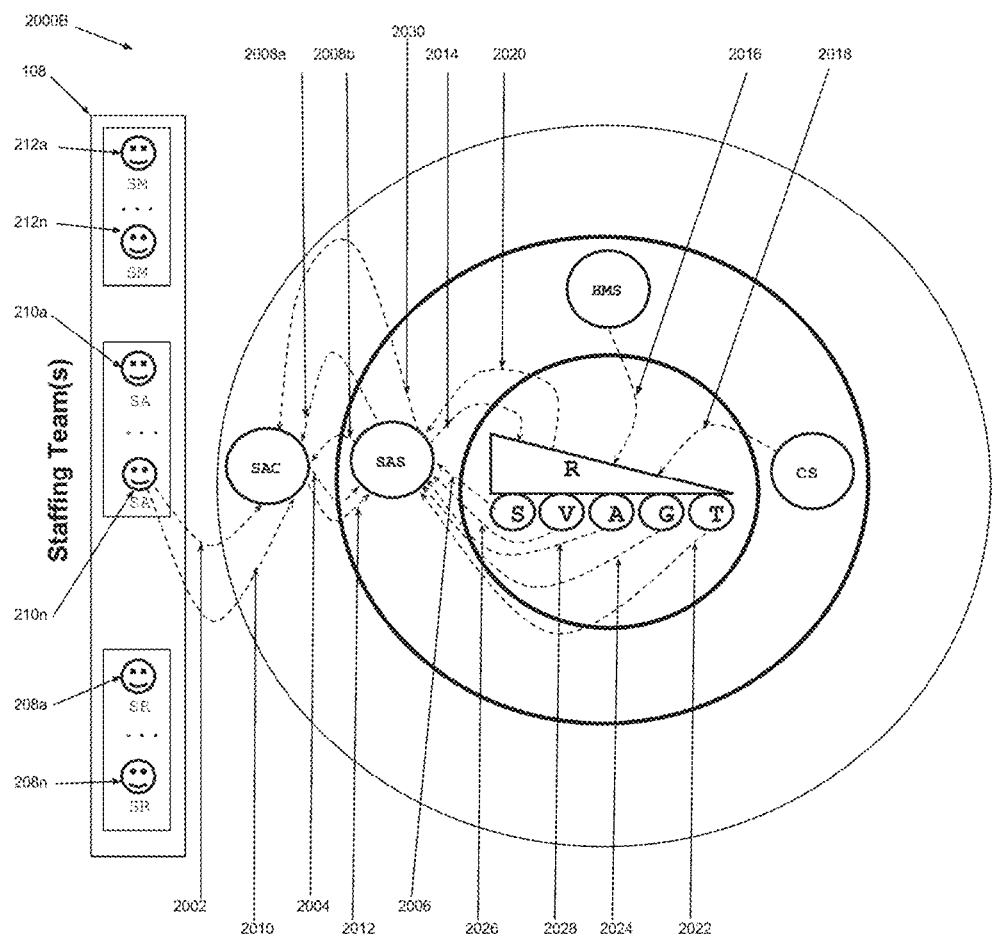
Figure 20B: Account Manager reviews candidate resume - Activities

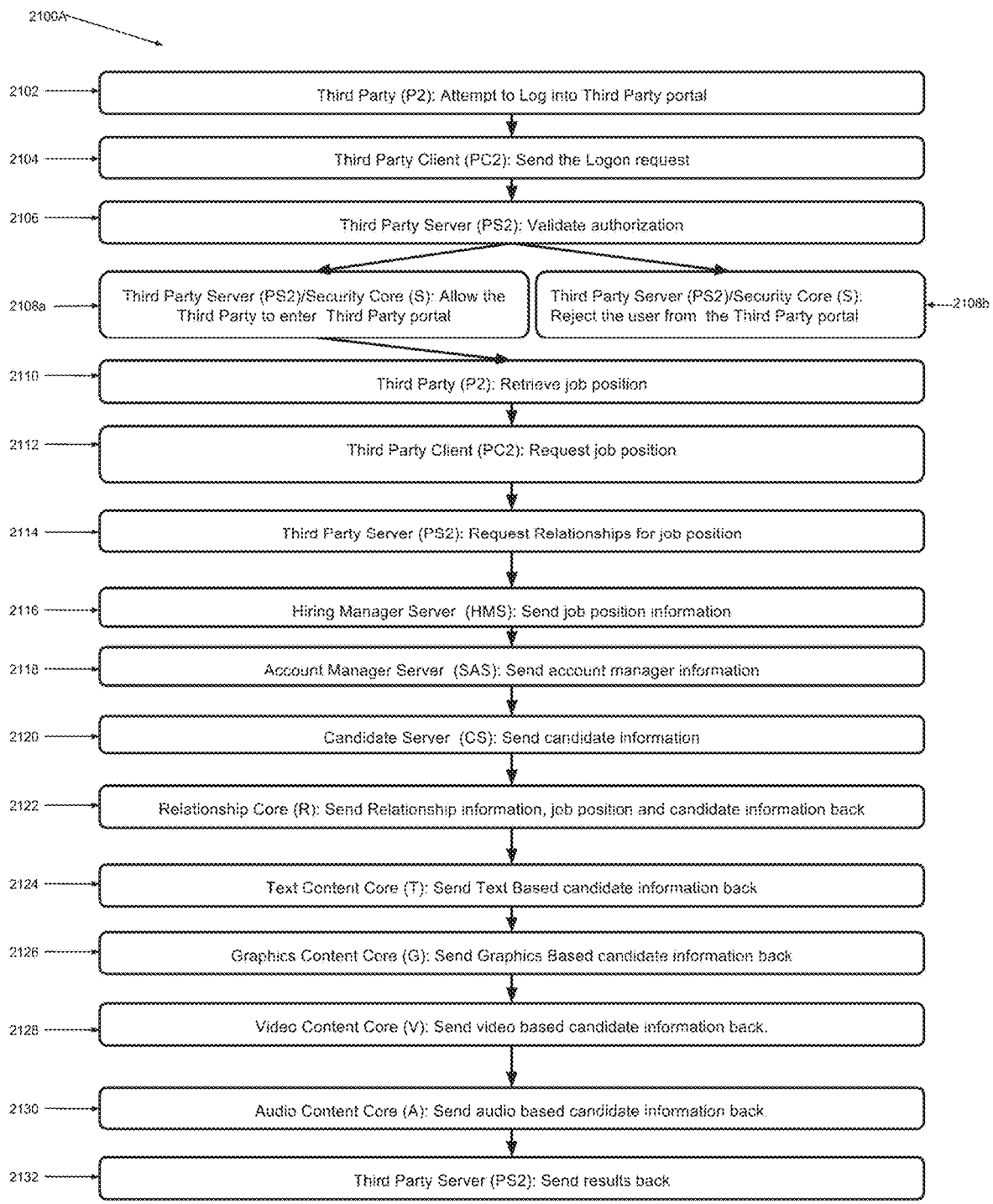

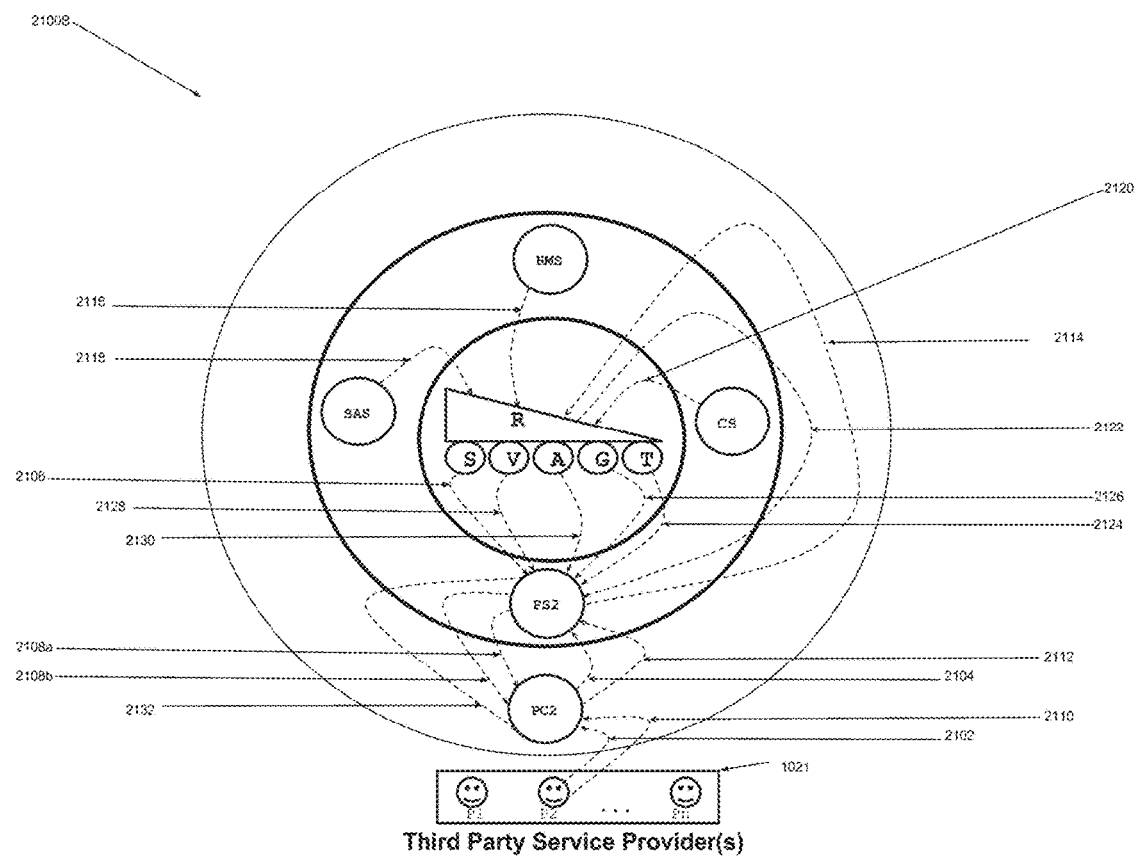
Figure 21B: Third Party reviews candidate - Activities

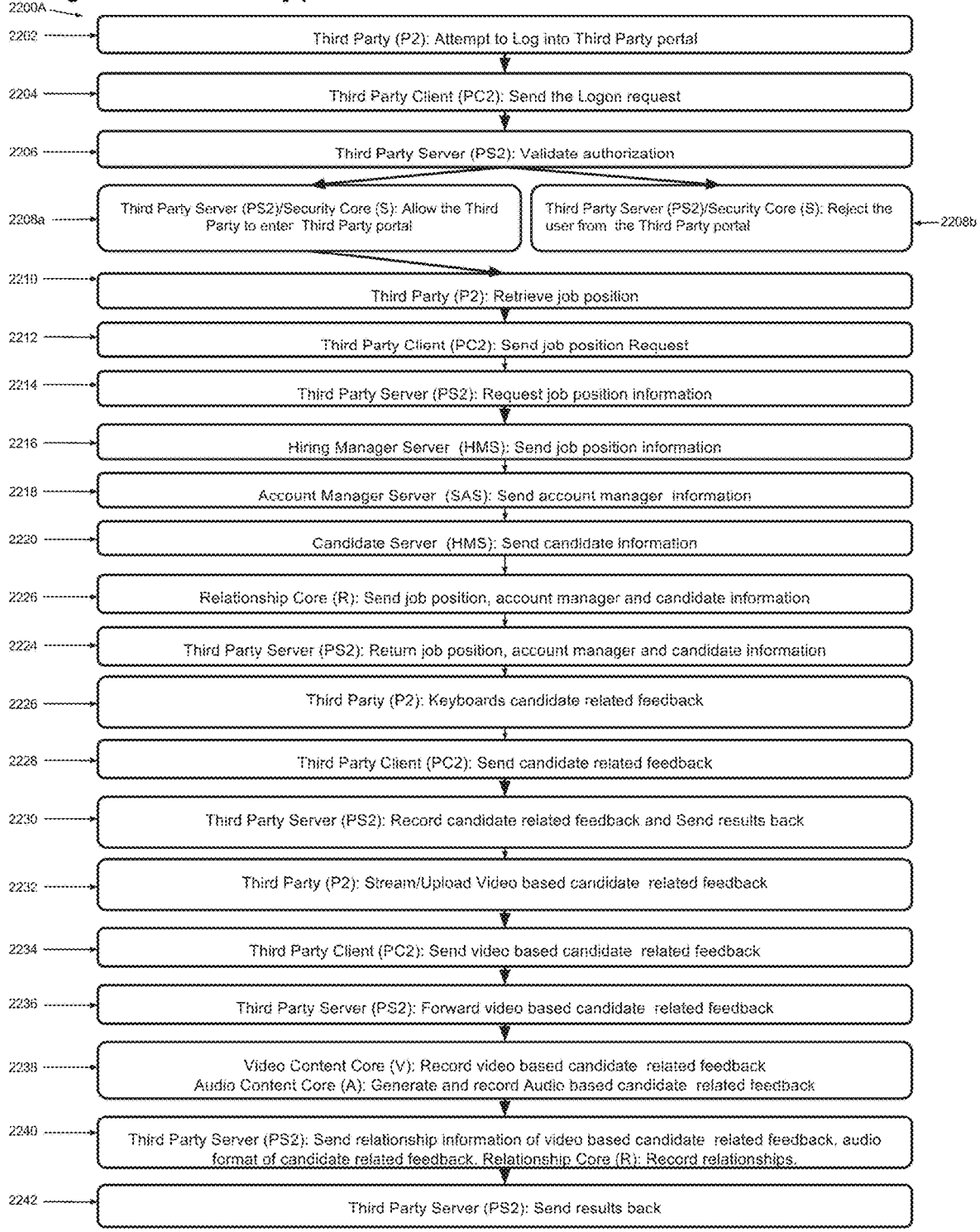

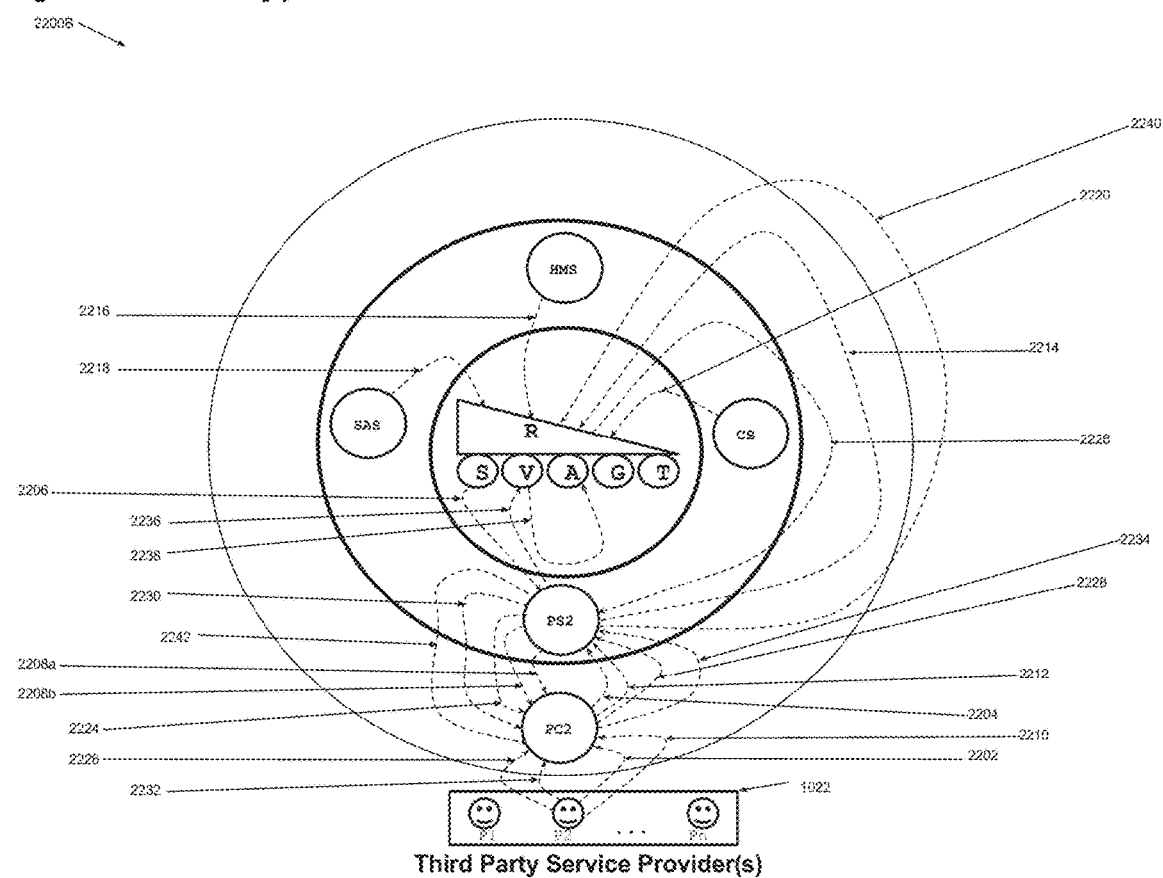
Figure 22B: Third Party provides feedback on candidate - Activities

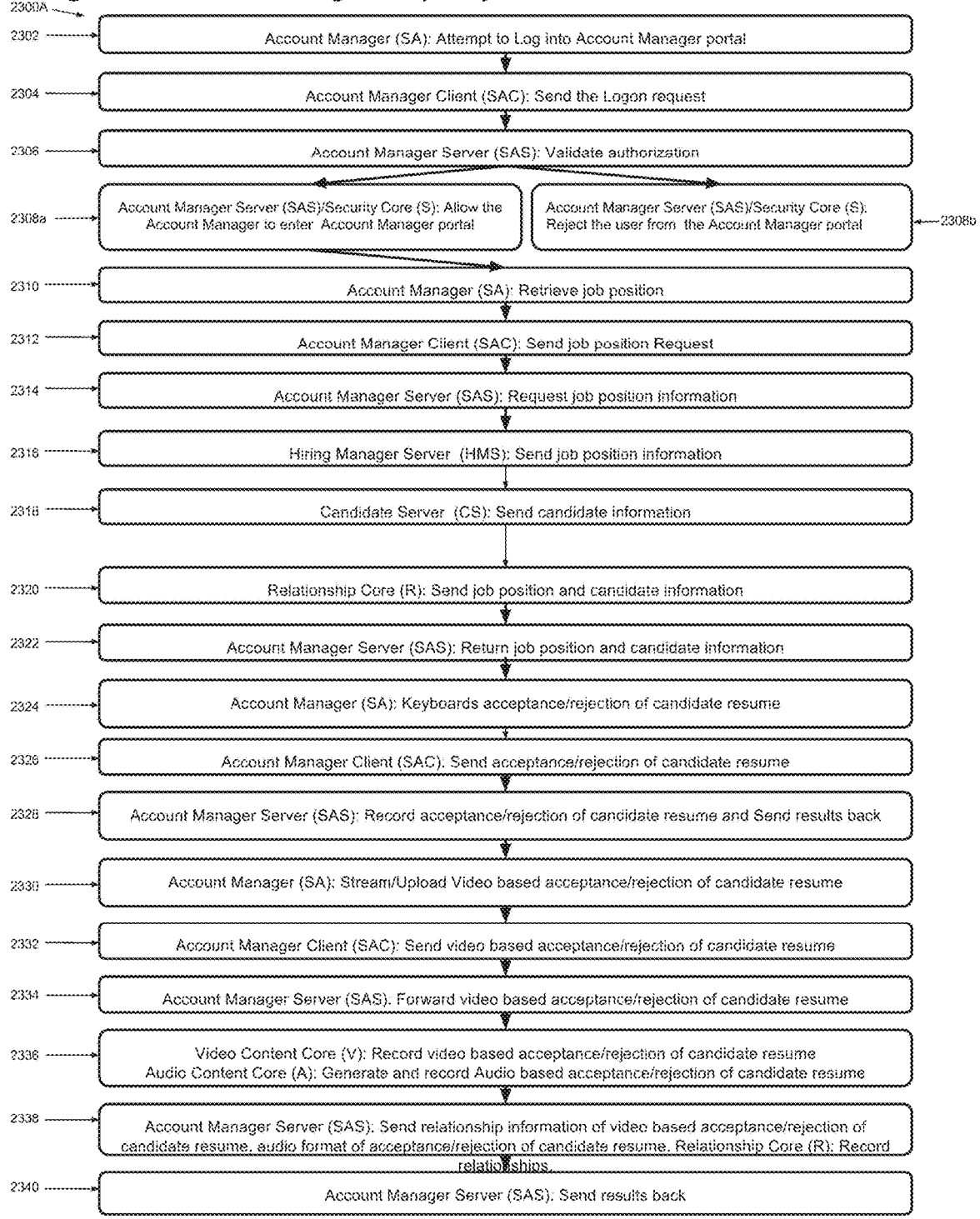

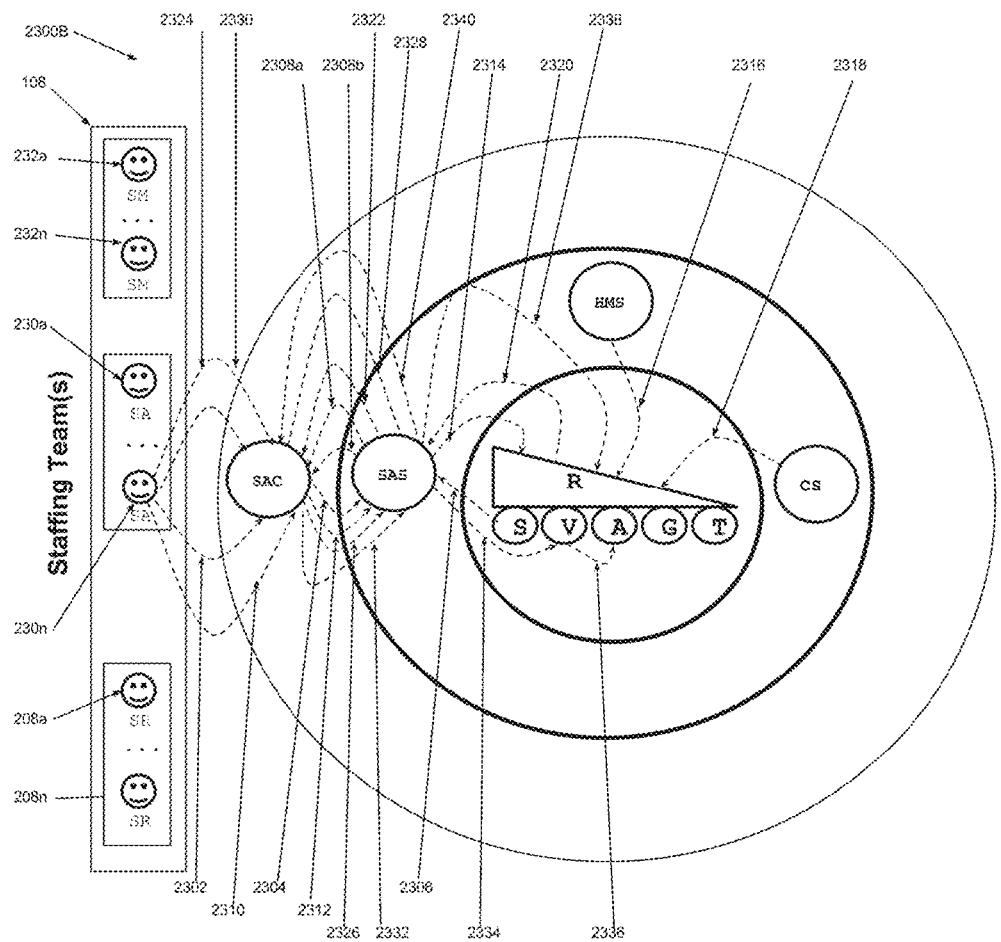

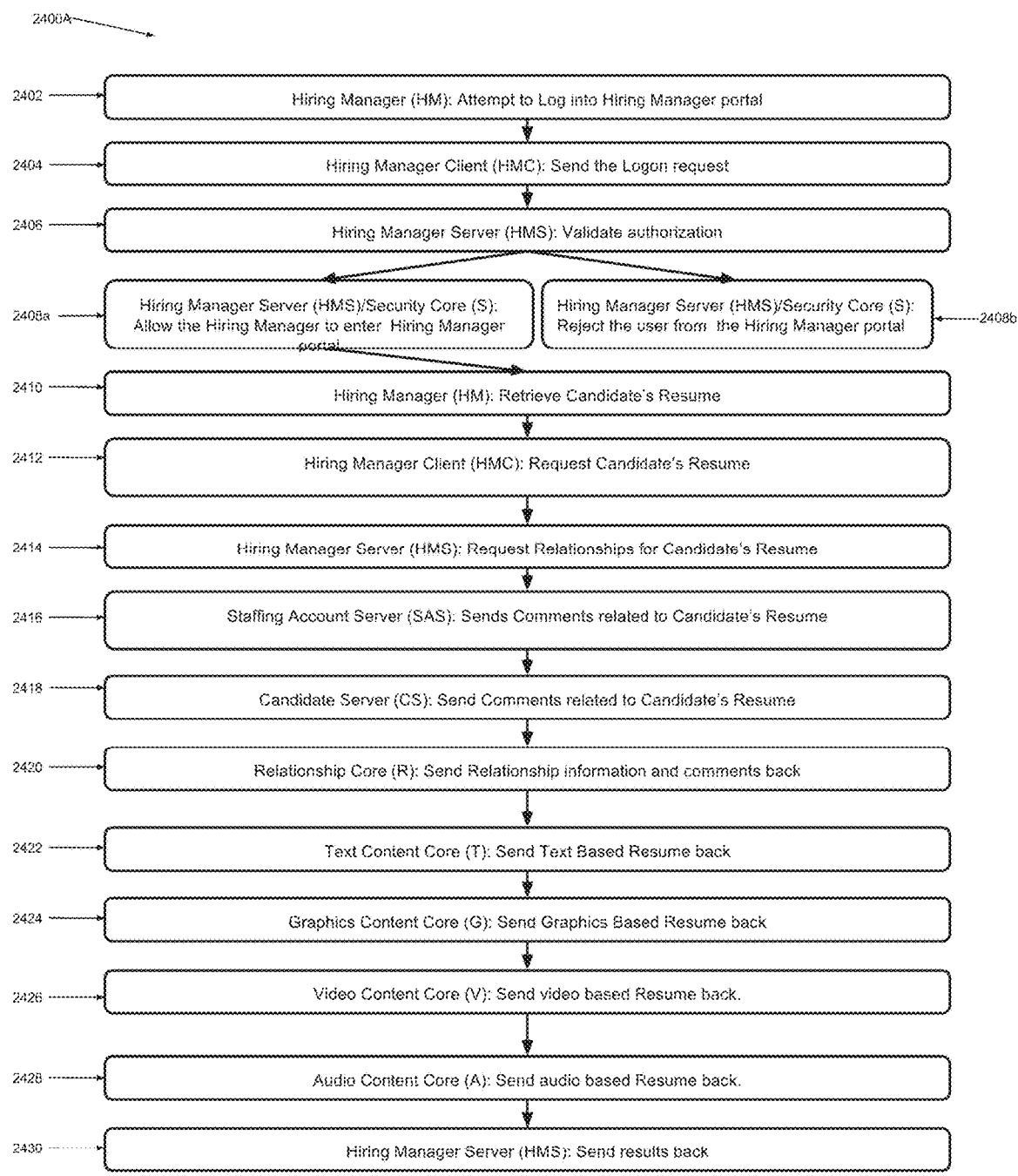

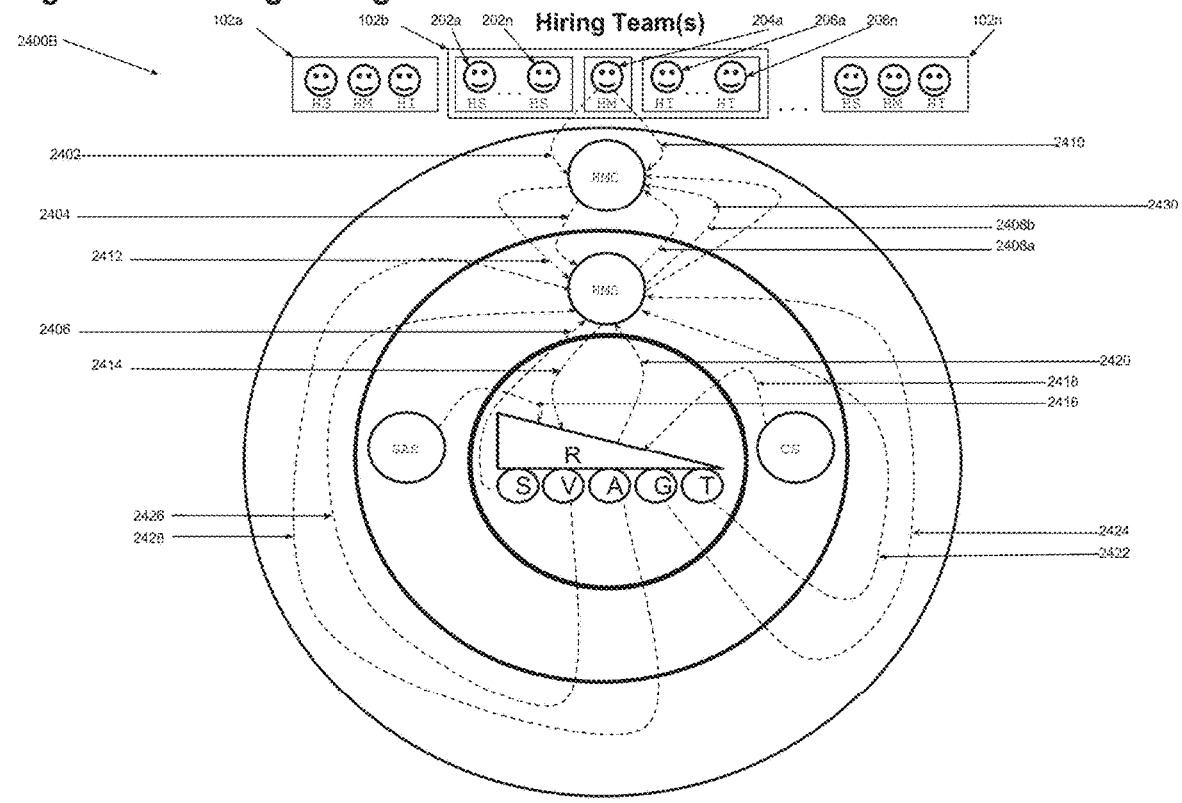
Figure 24B: Hiring Manager reviews candidate's resumes - Activities

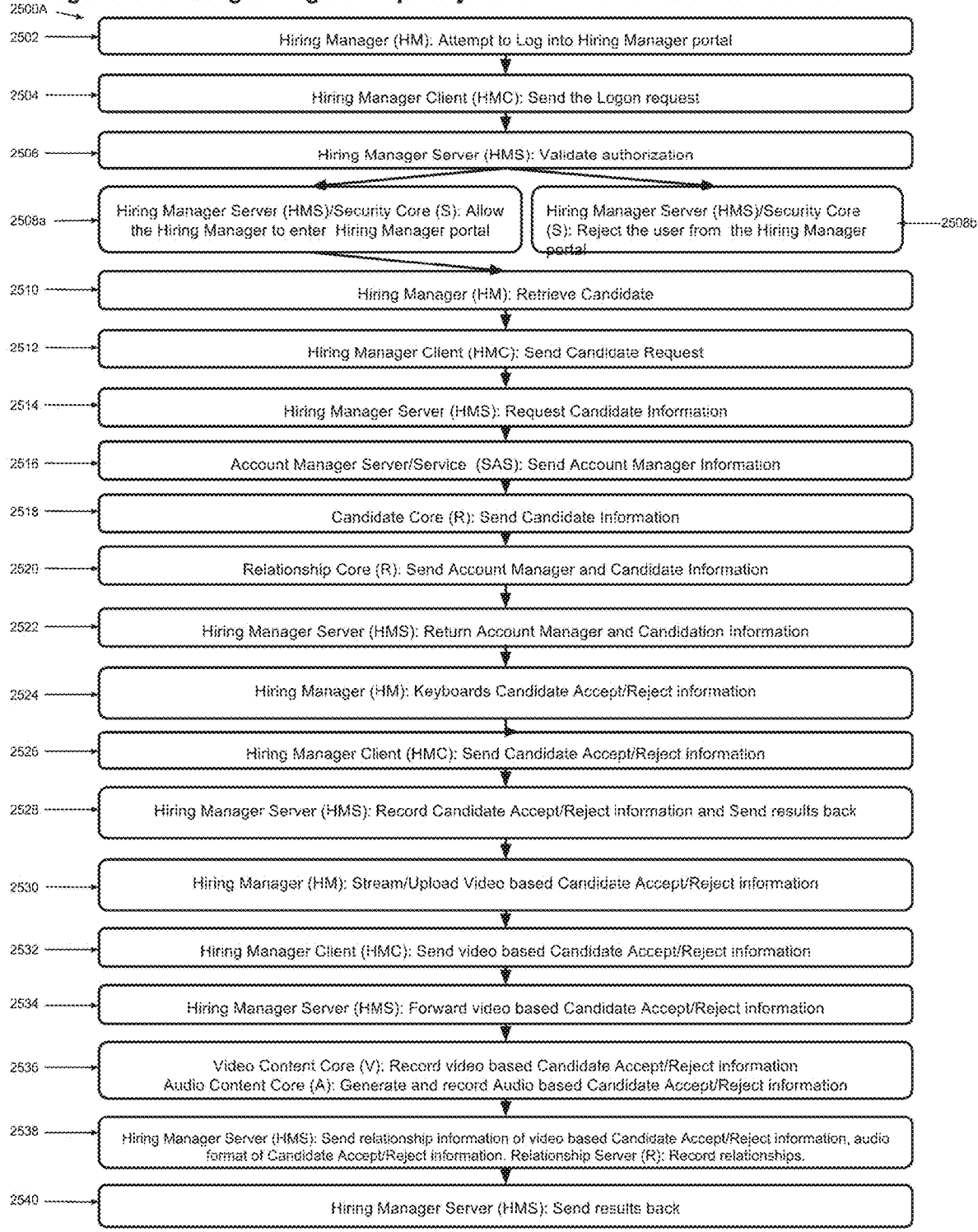

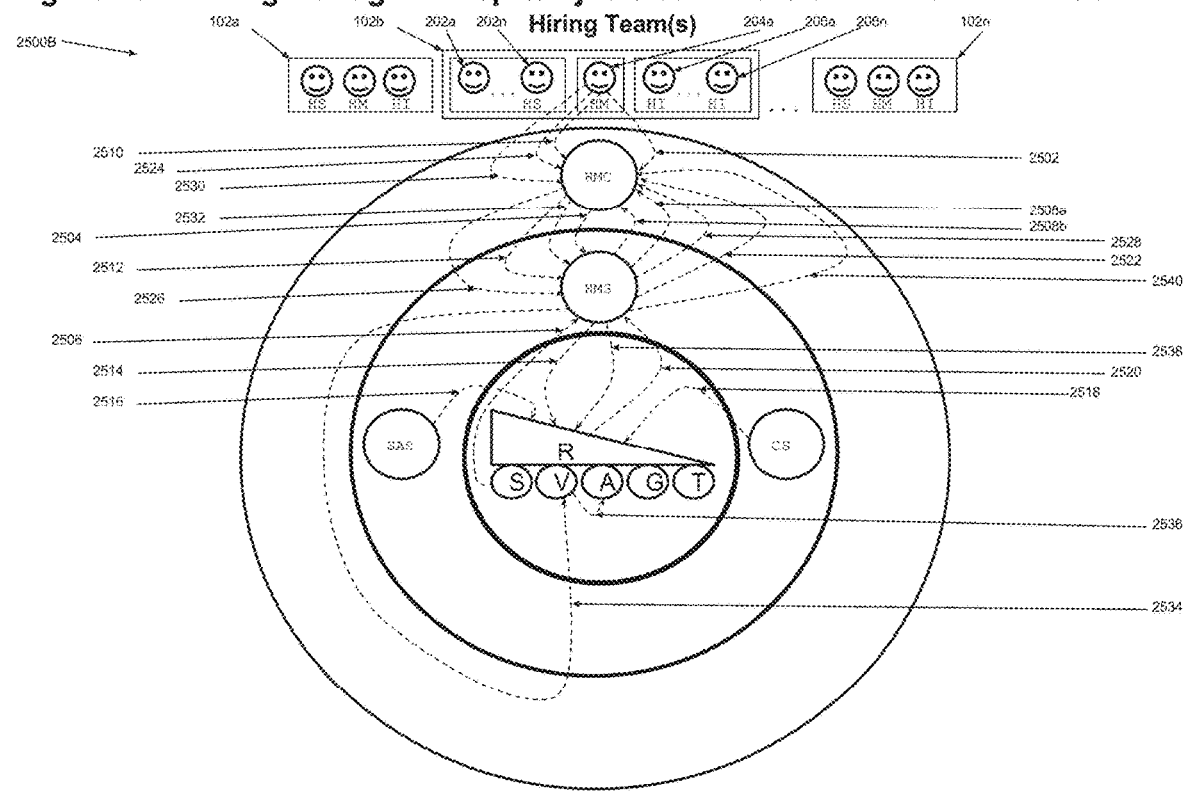
Figure 25B: Hiring Manager accepts/rejects candidate's resumes - Activities

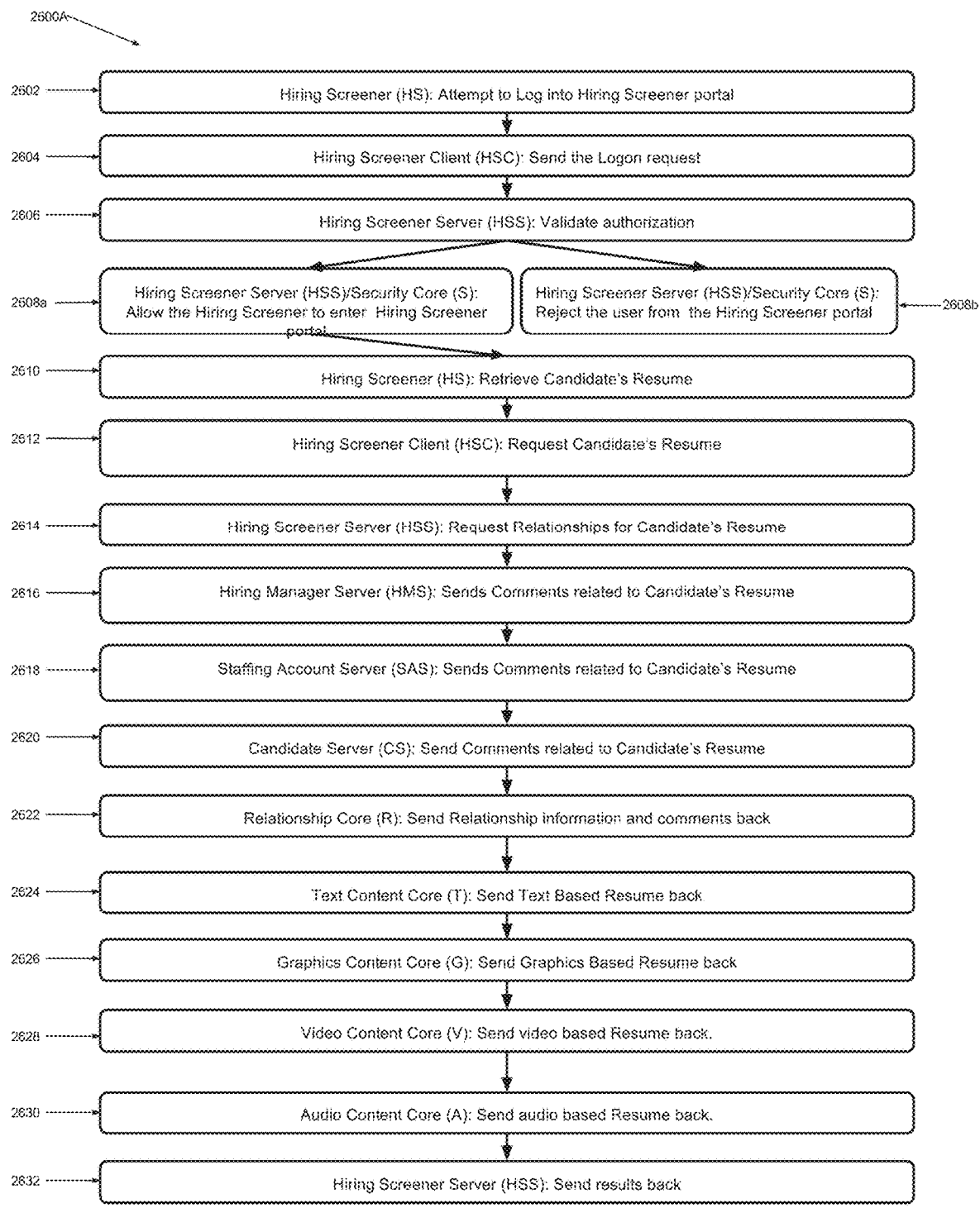

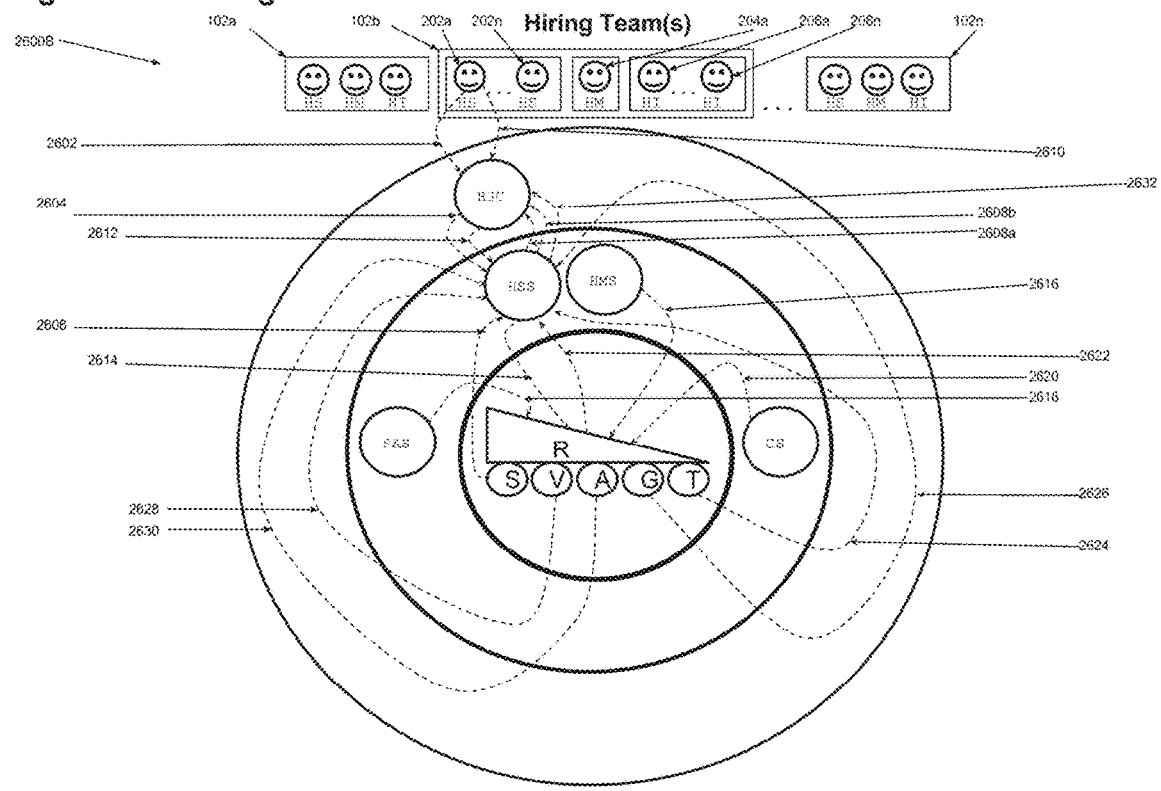
Figure 26B: Hiring Screener reviews candidate's resumes - Activities

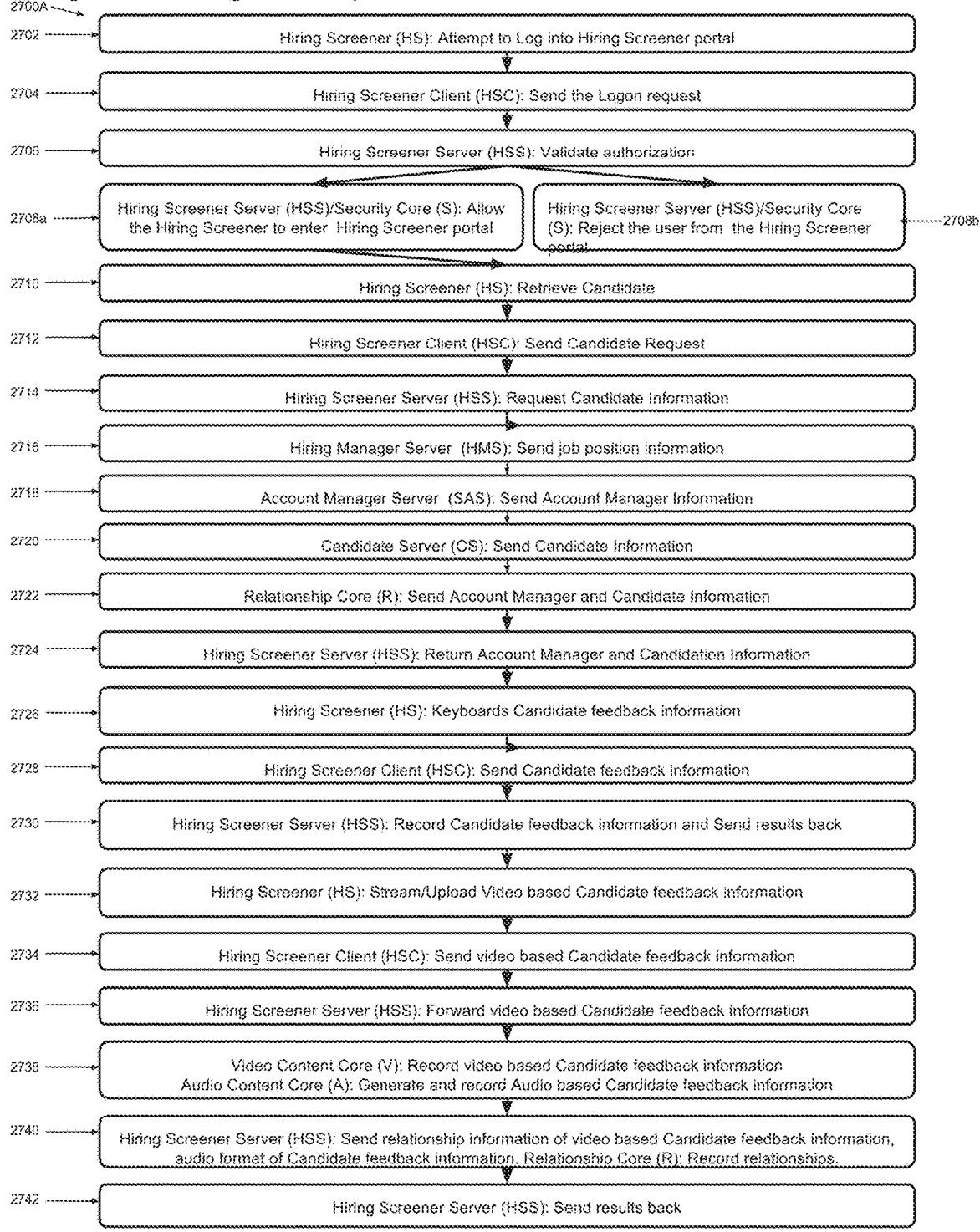

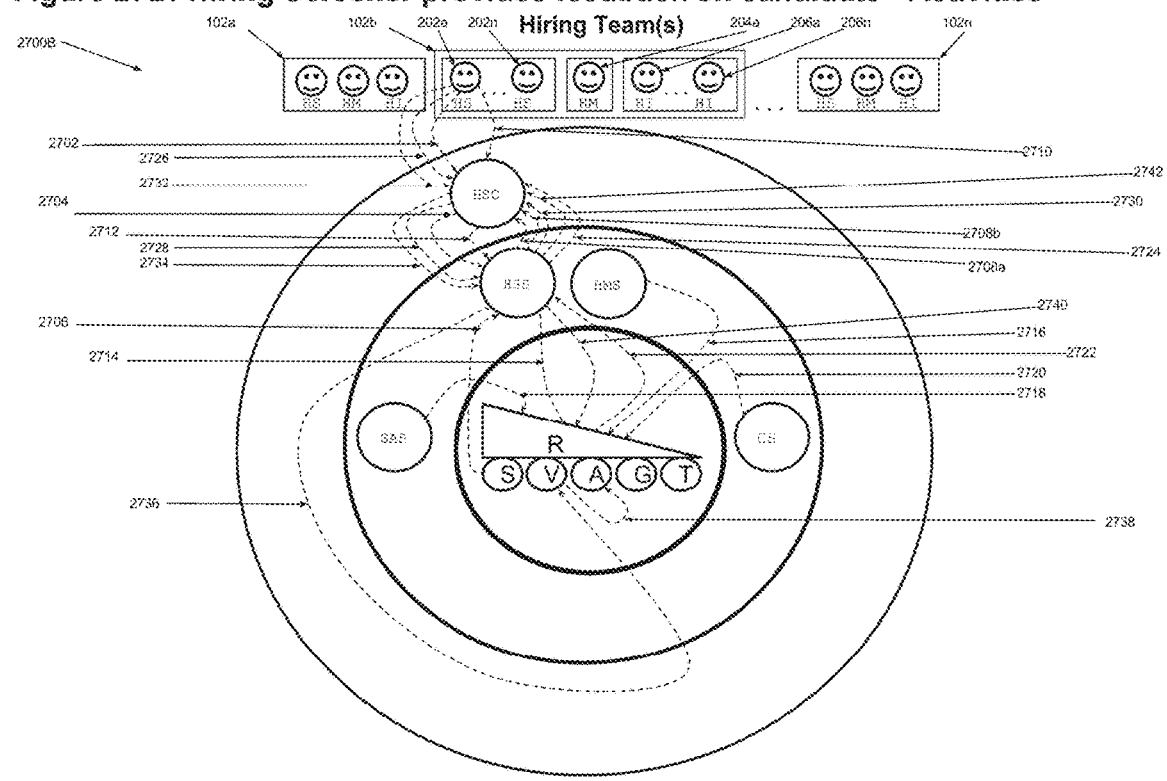
Figure 27B: Hiring Screener provides feedback on candidate - Activities

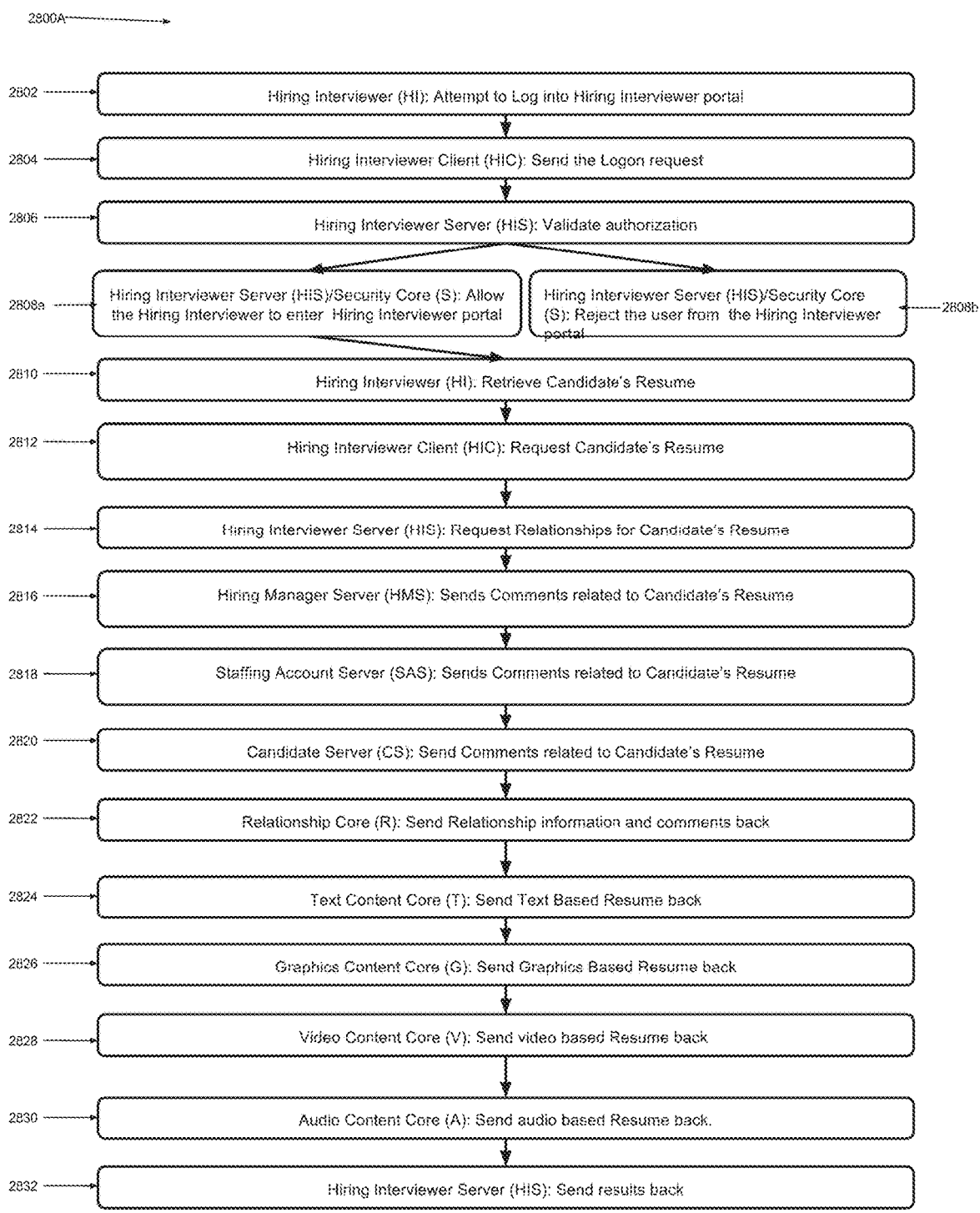

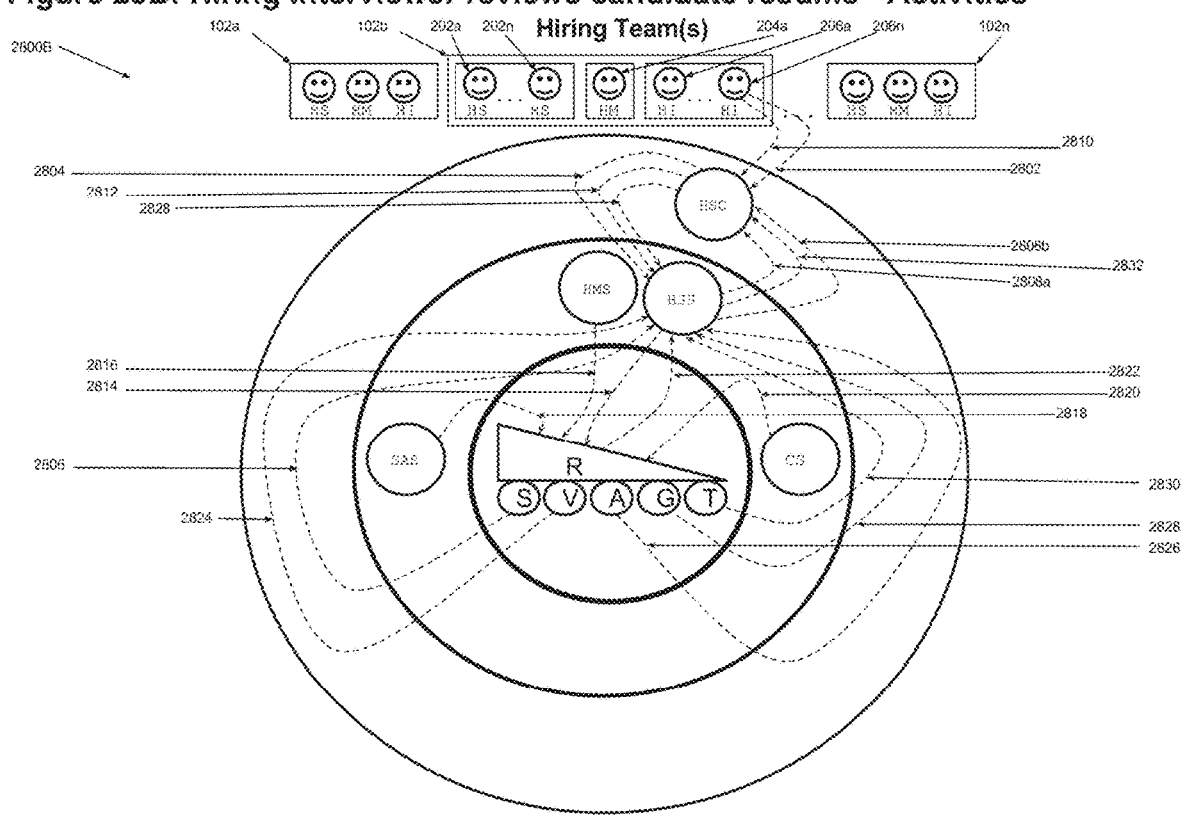
Figure 28B: Hiring Interviewer reviews candidate resume - Activities

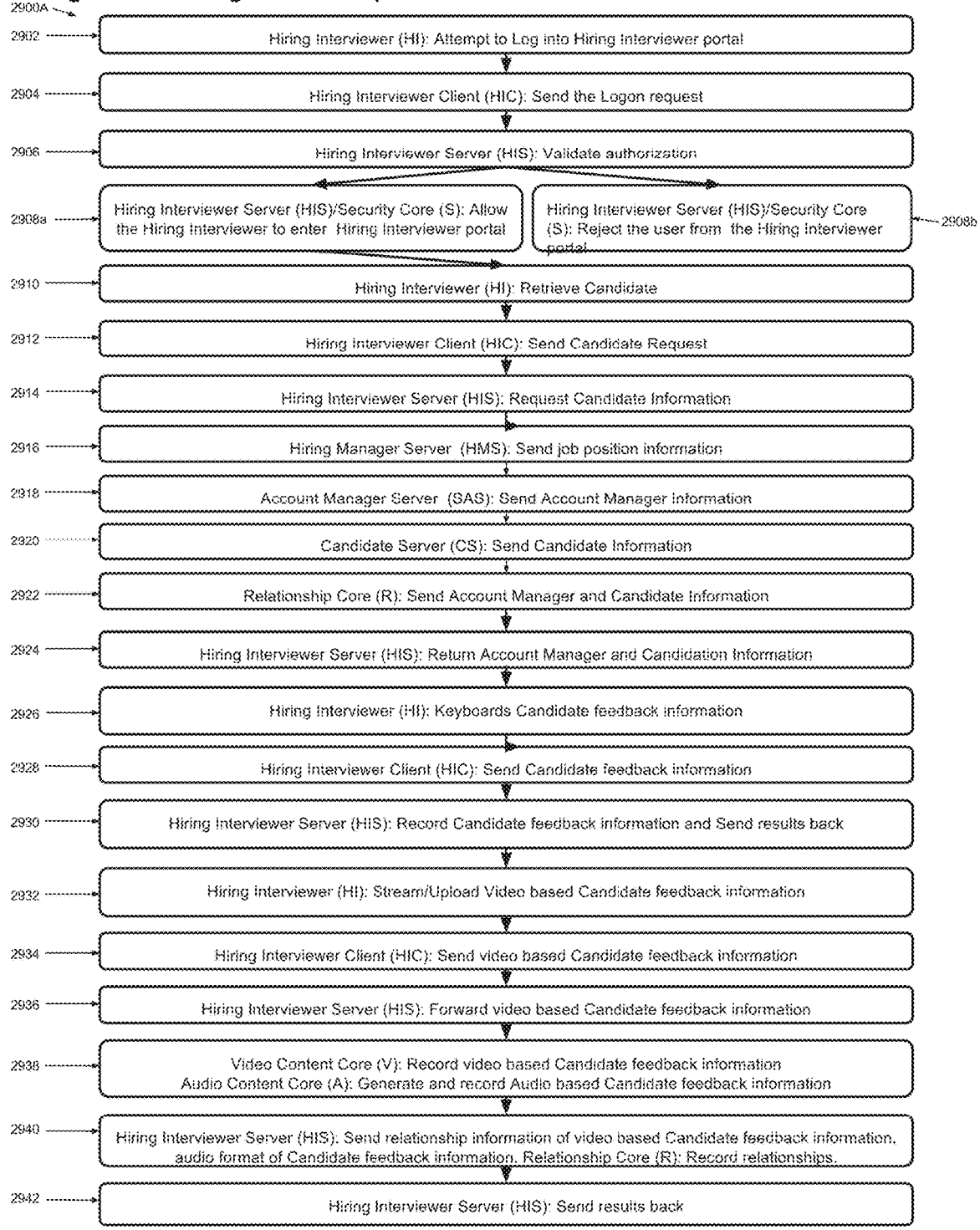

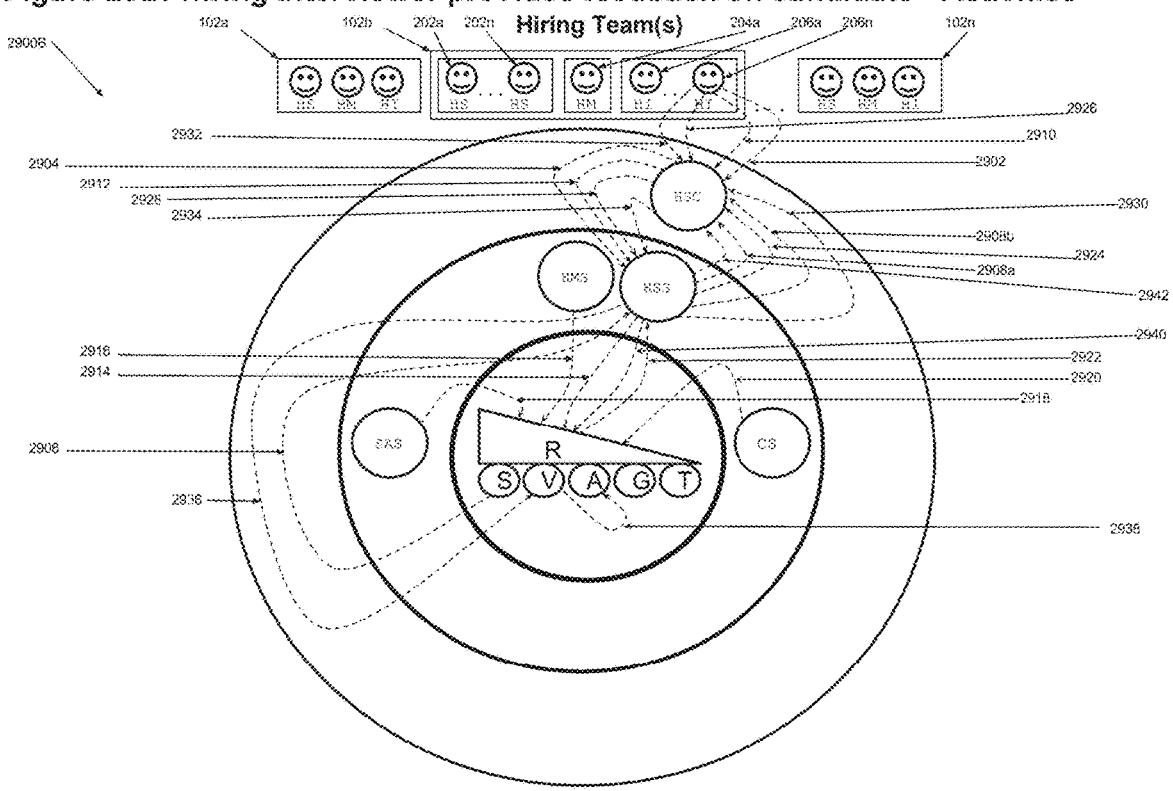

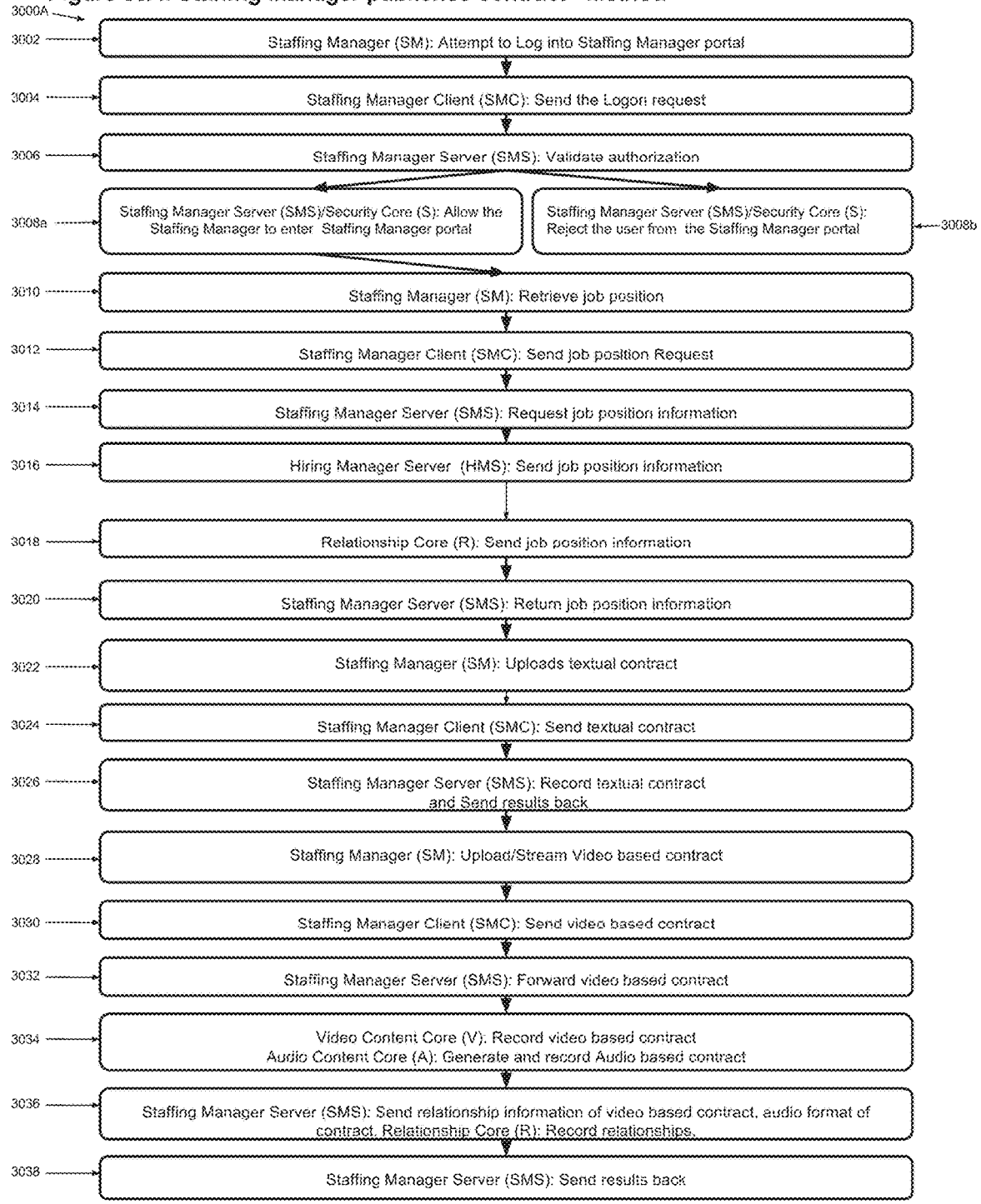

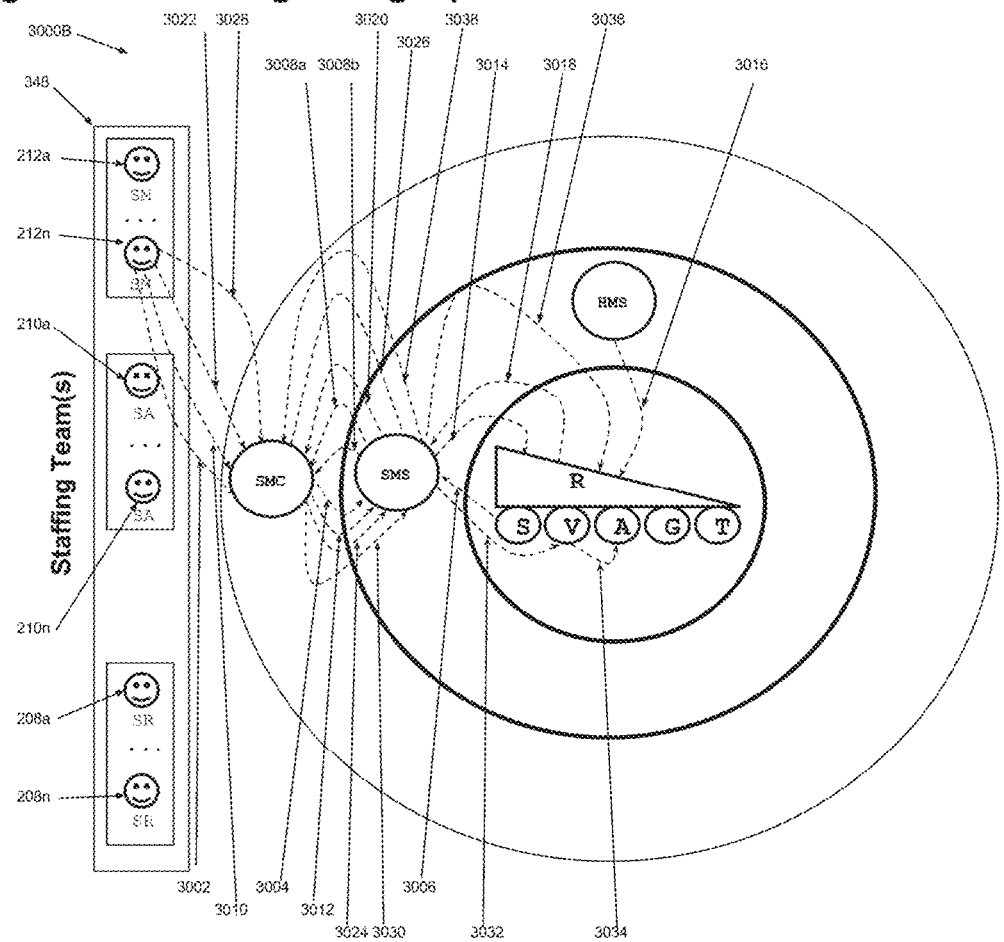
Figure 30B: Staffing Manager publishes contract - Activities

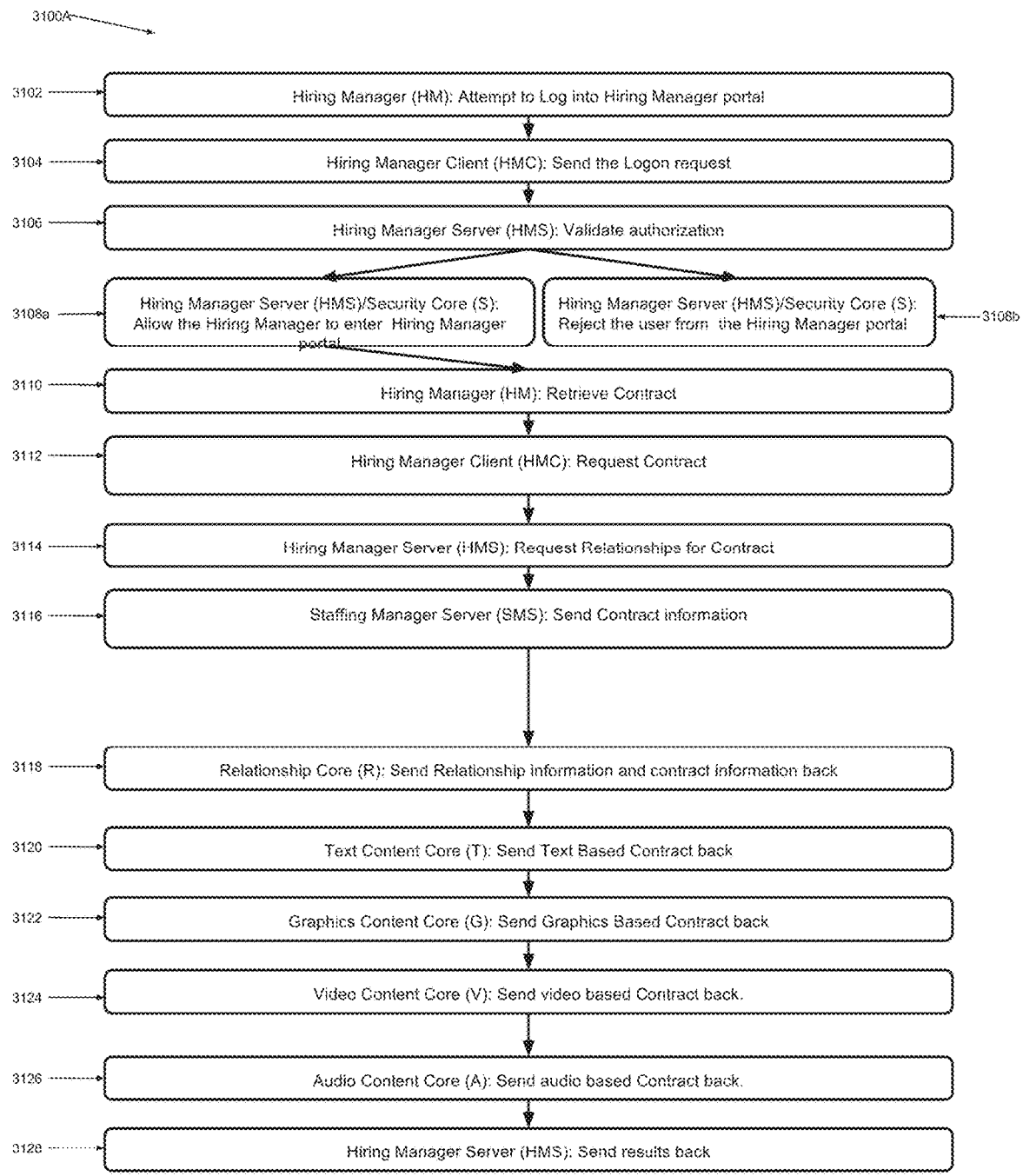

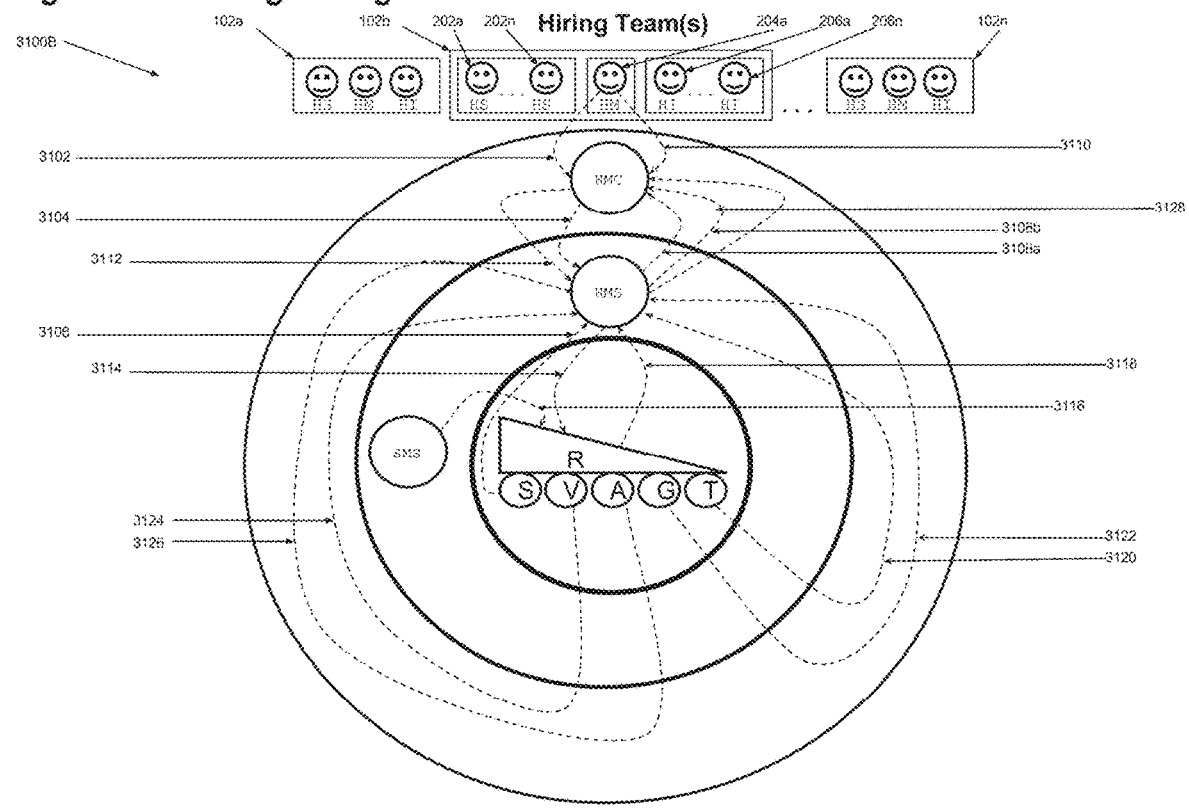
Figure 31B: Hiring Manager reviews contract - Activities

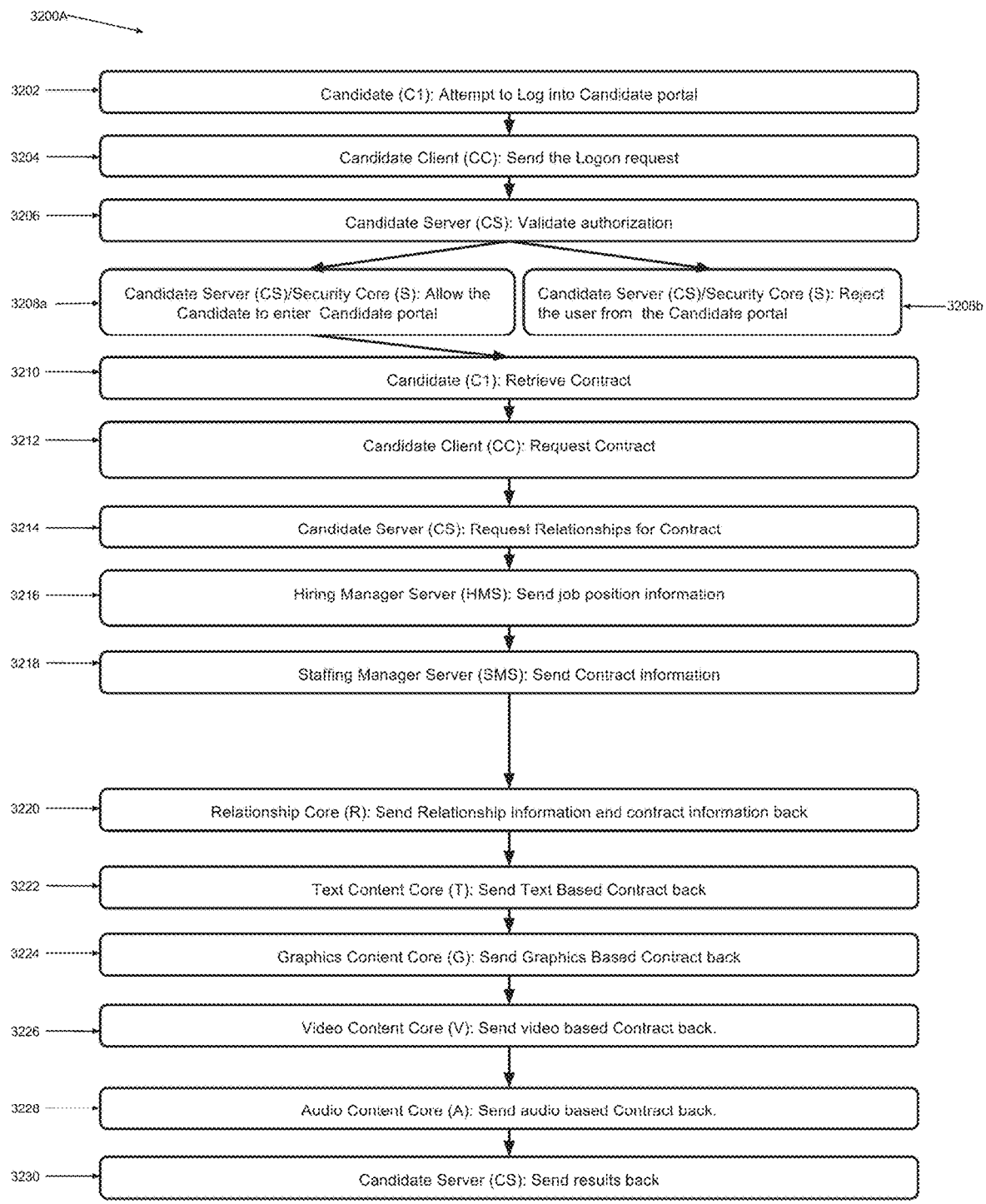

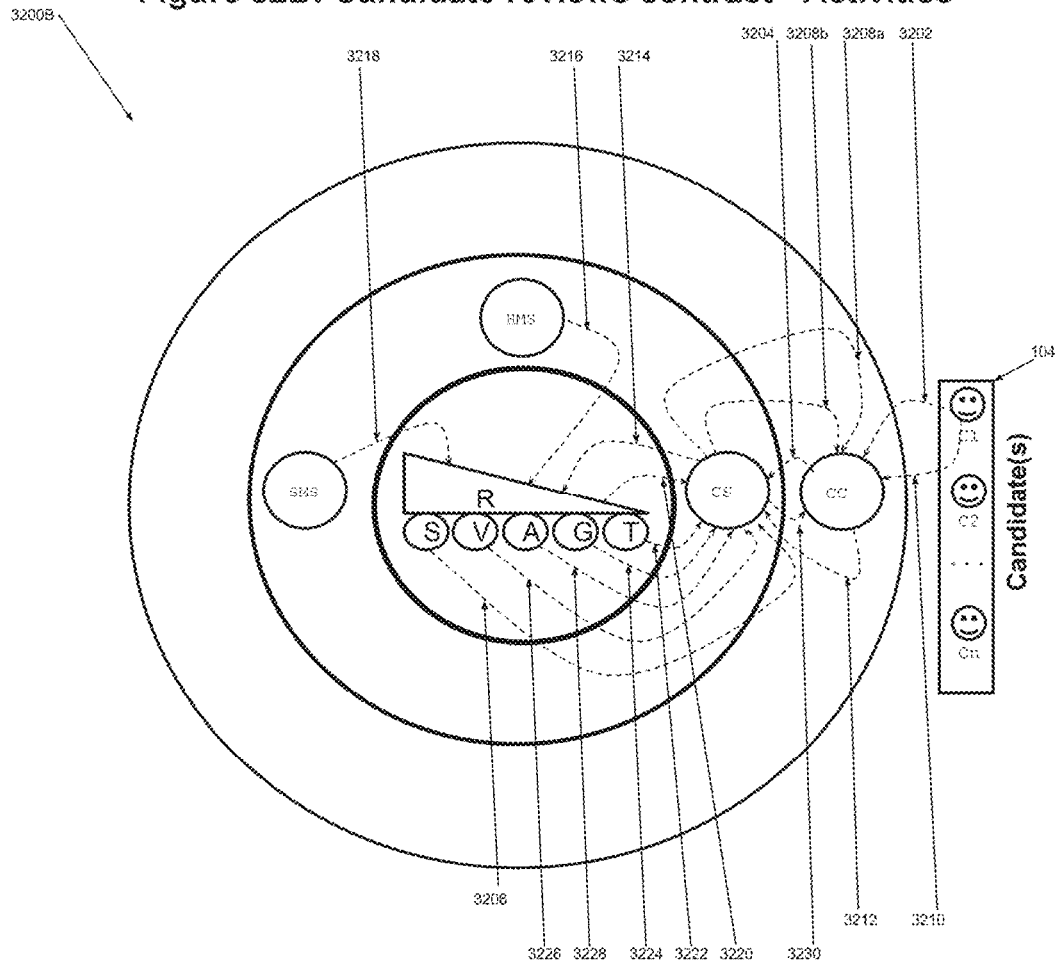
Figure 32B: Candidate reviews contract - Activities

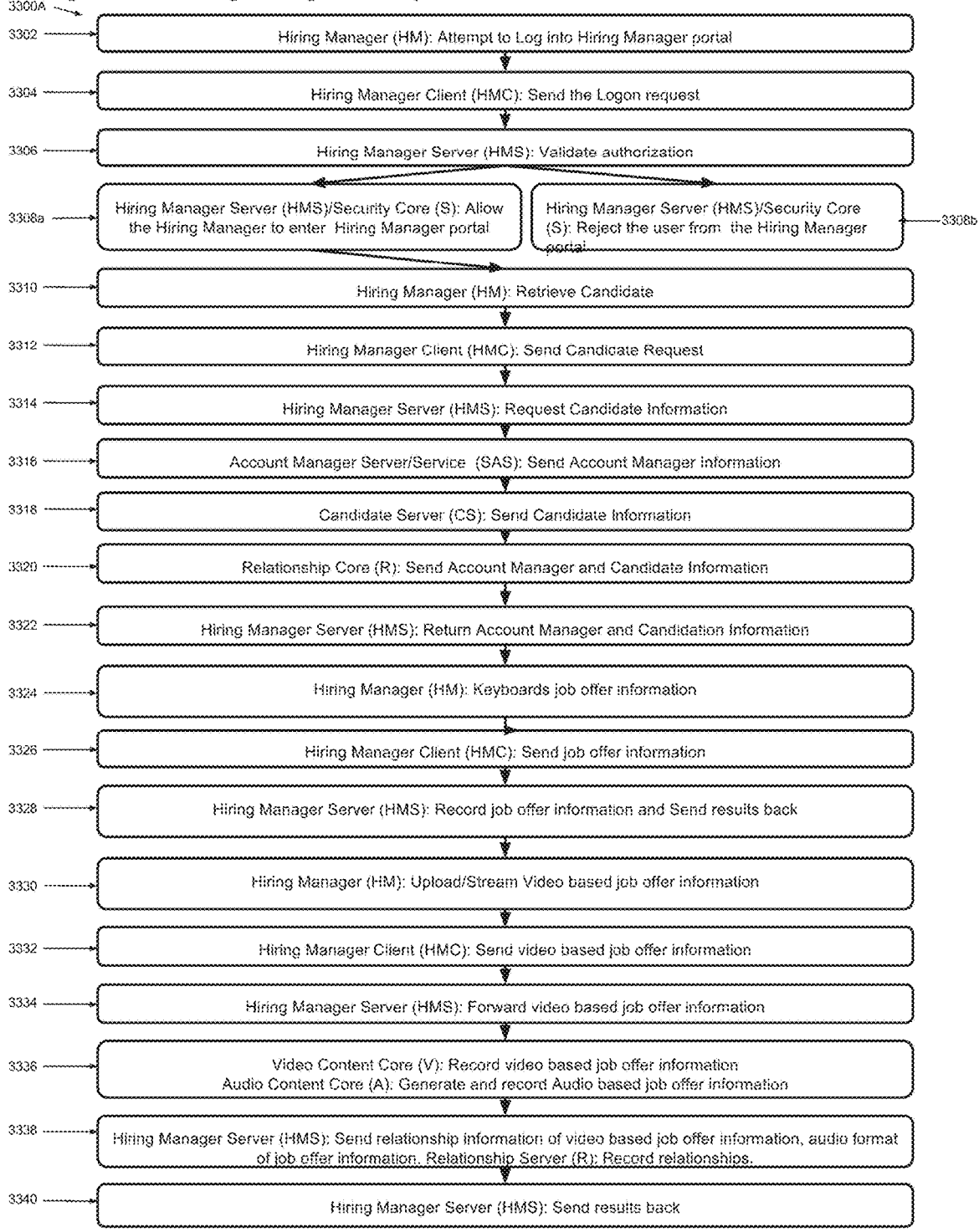

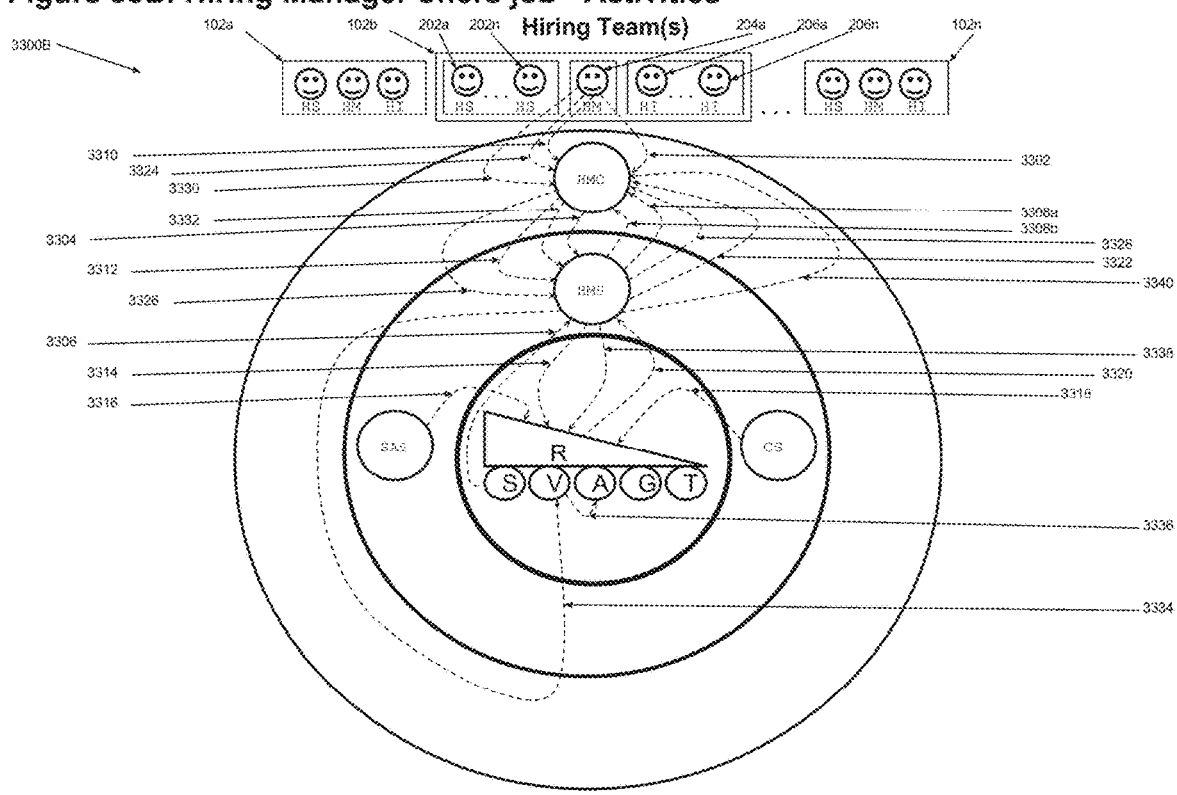
Figure 33B: Hiring Manager offers job - Activities

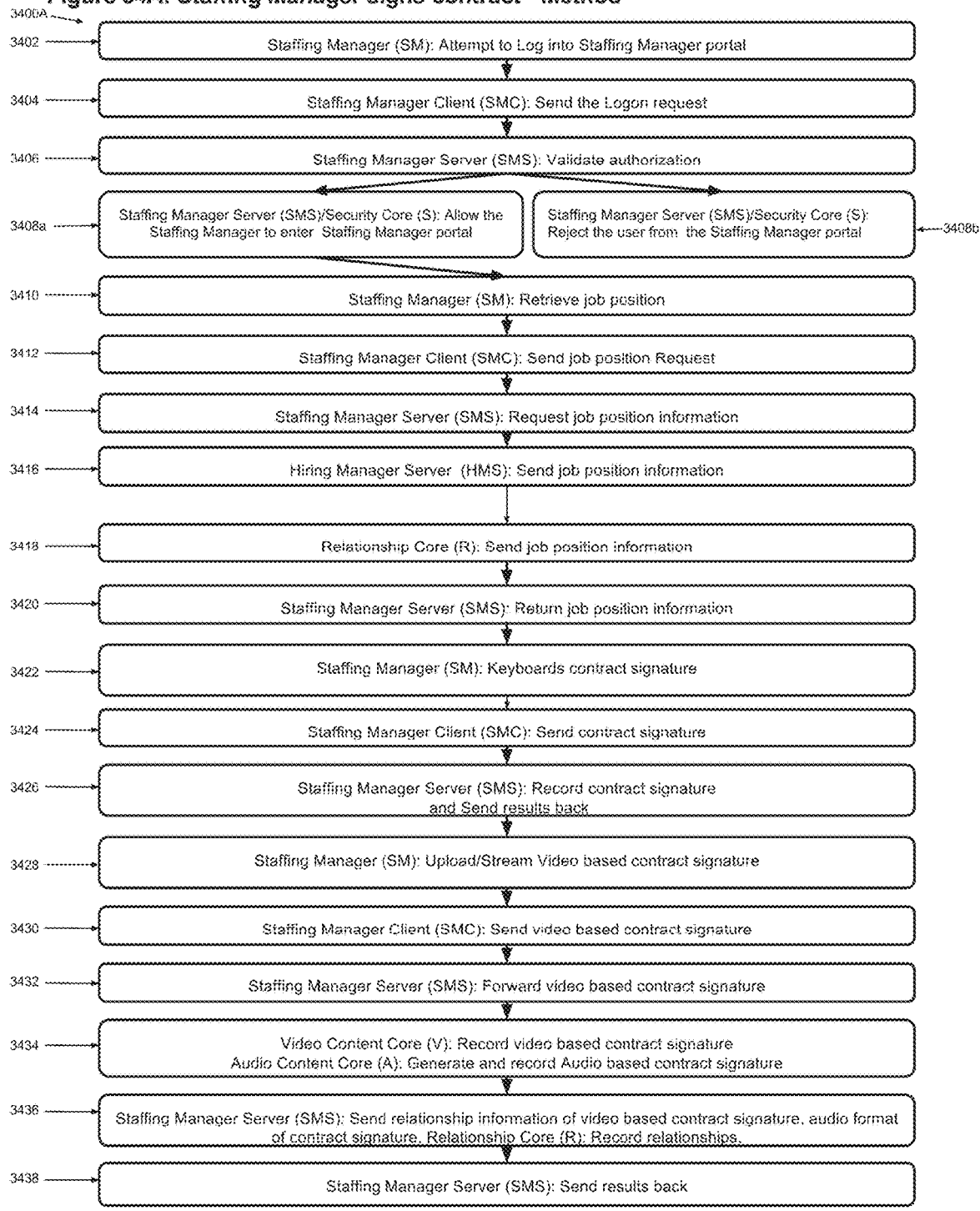

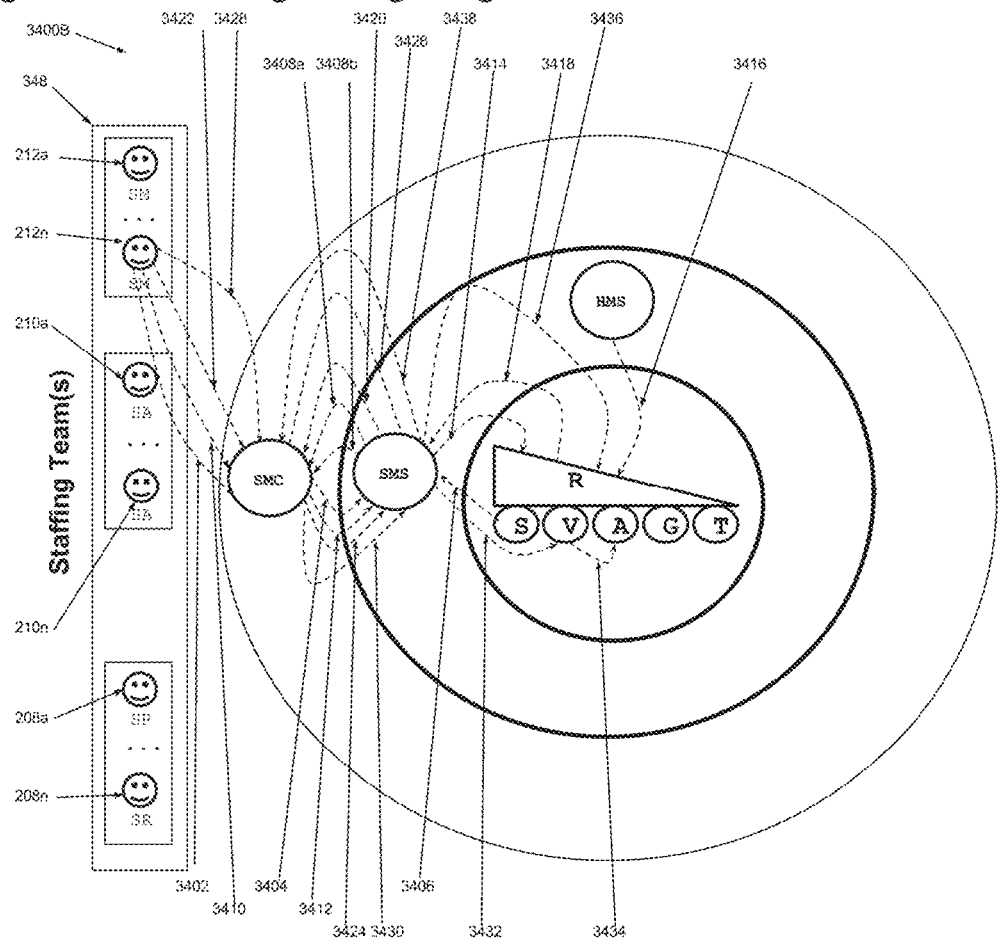

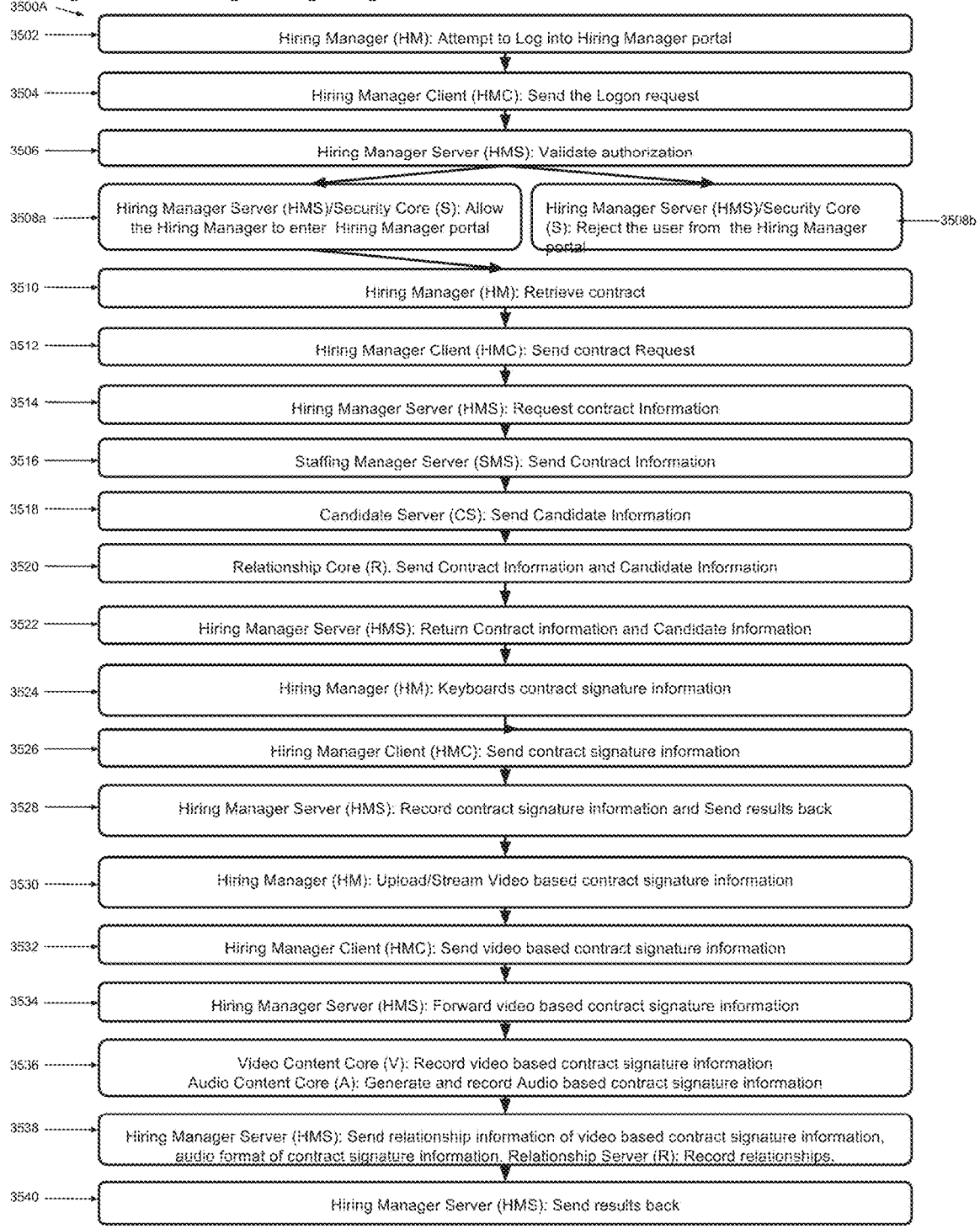

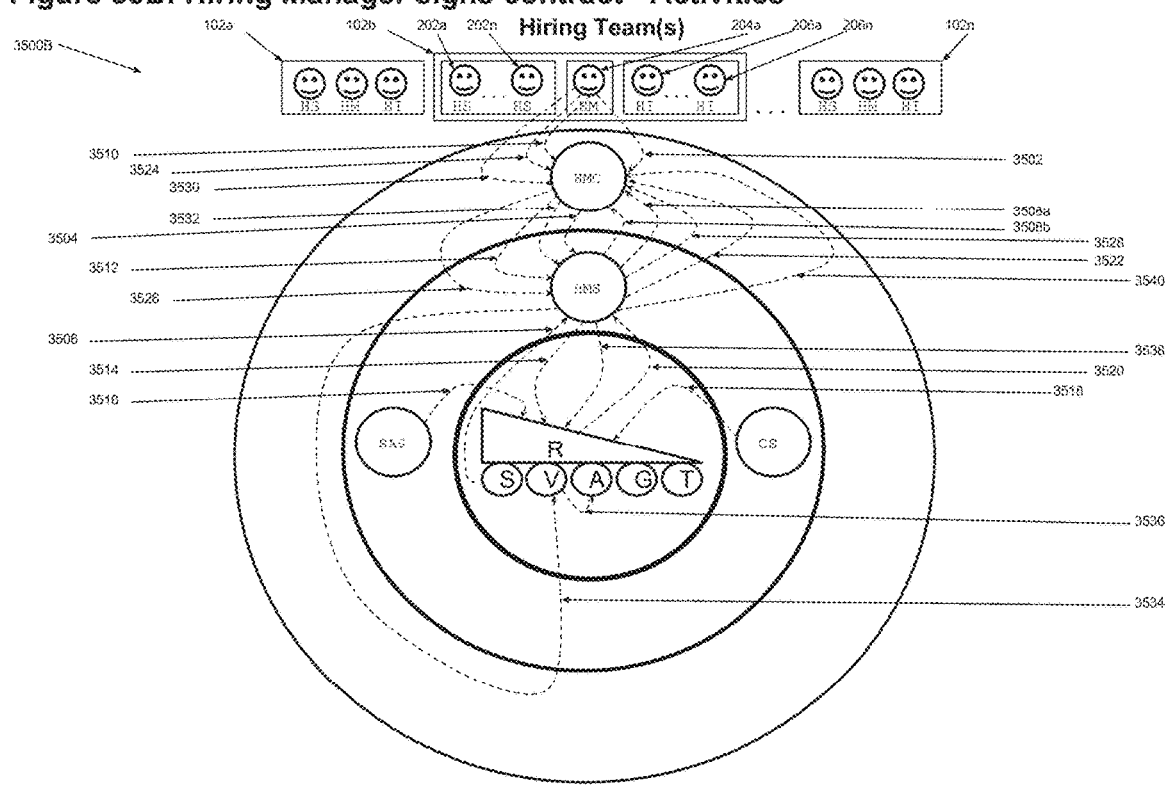
Figure 35B: Hiring Manager signs contract - Activities

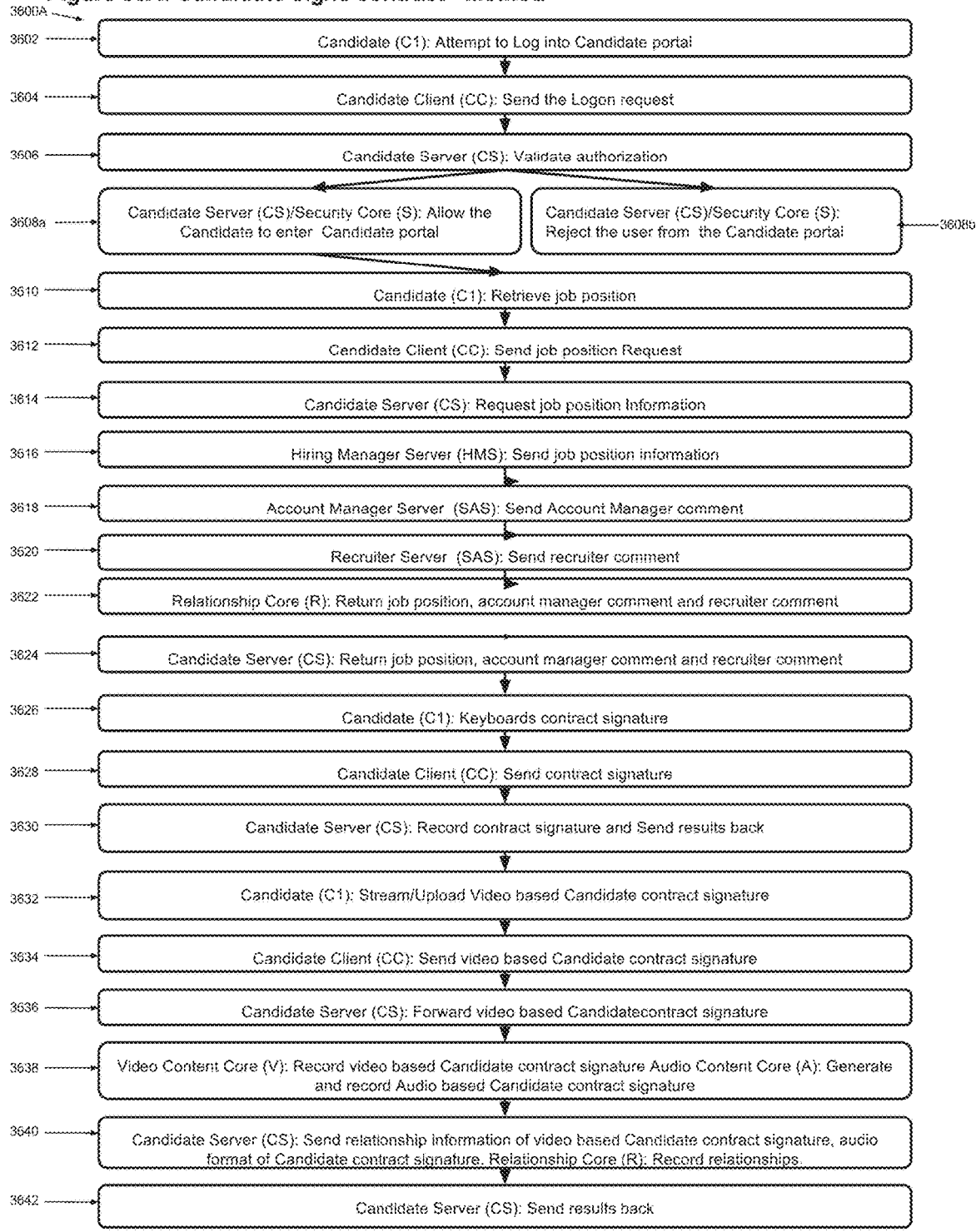

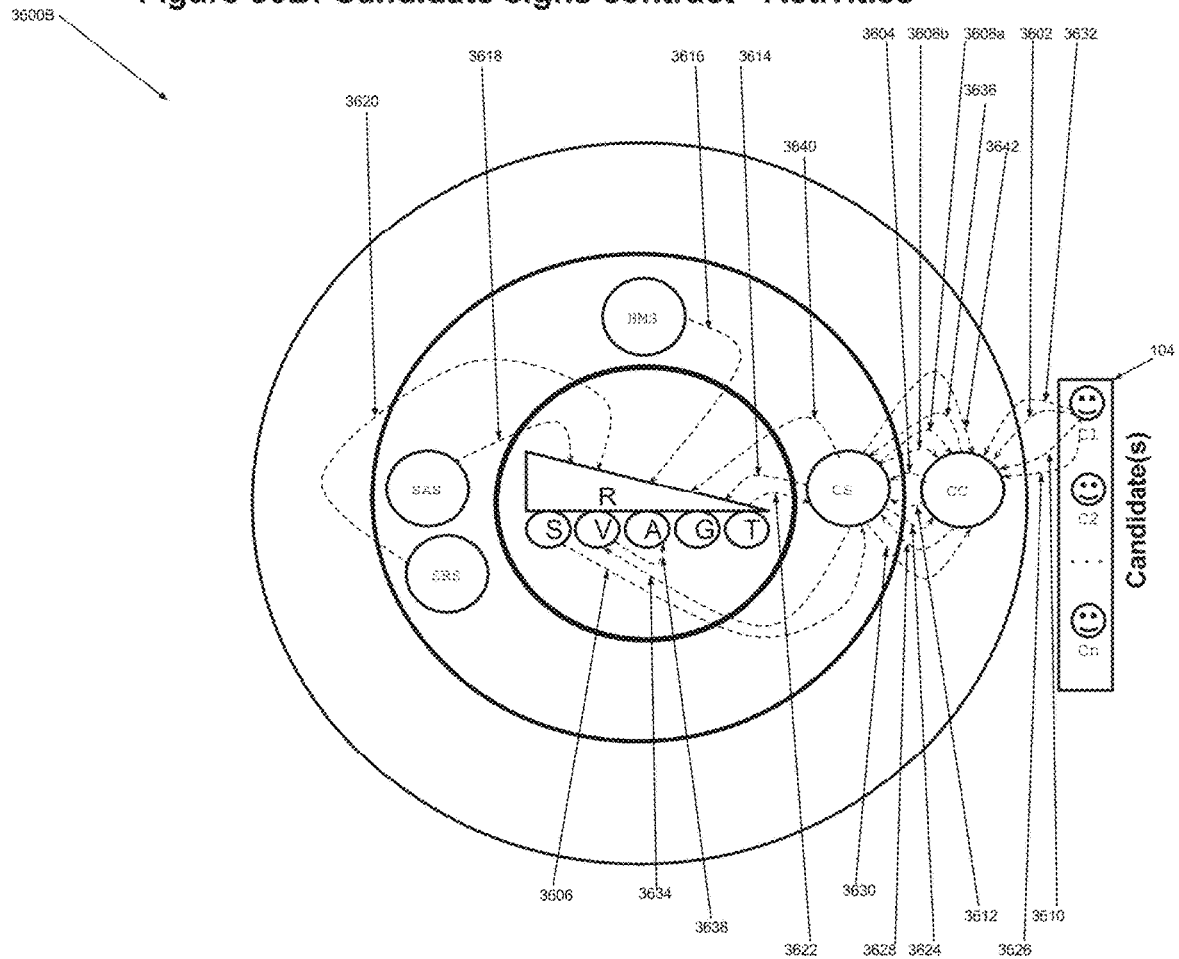
Figure 36B: Candidate signs contract - Activities

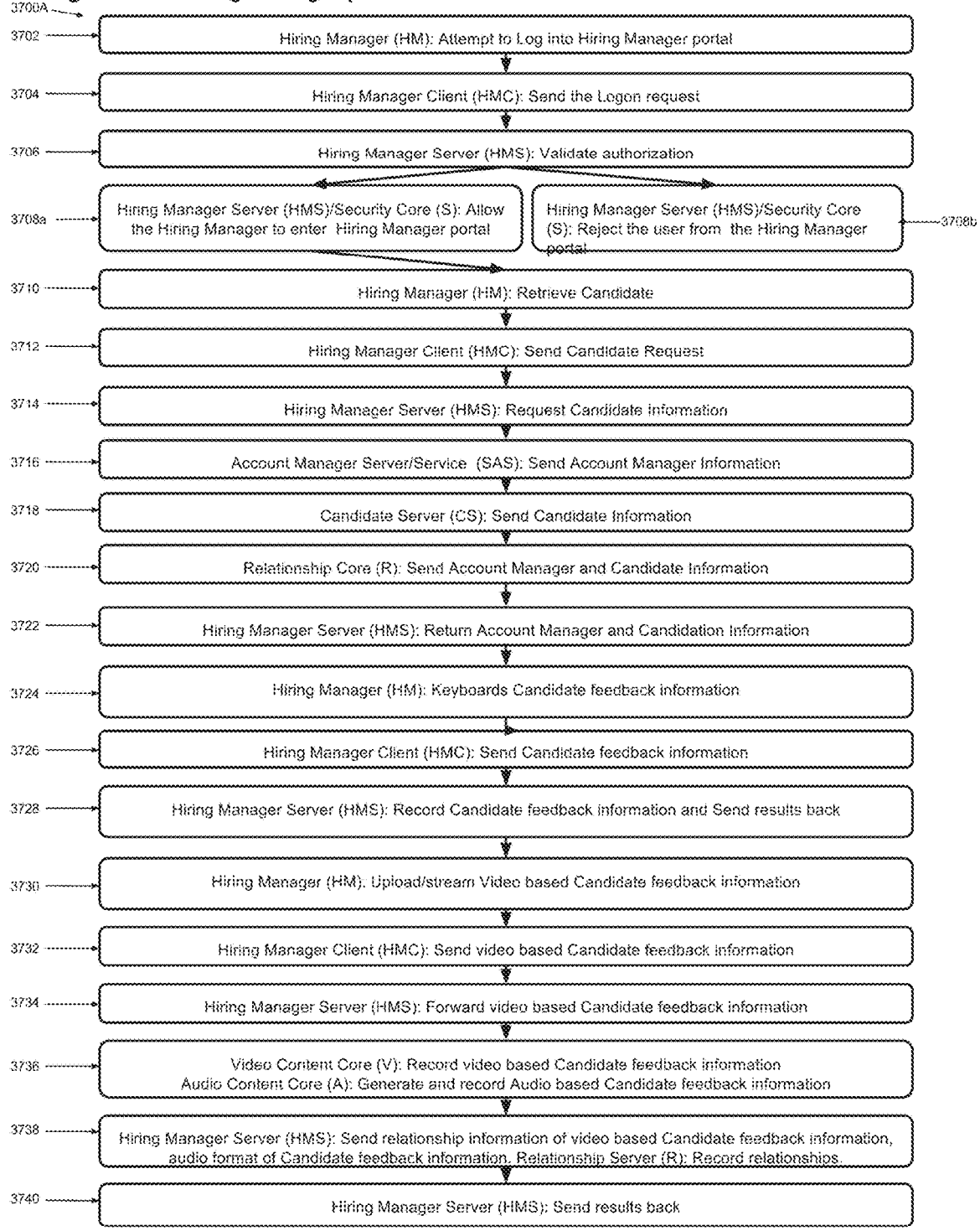

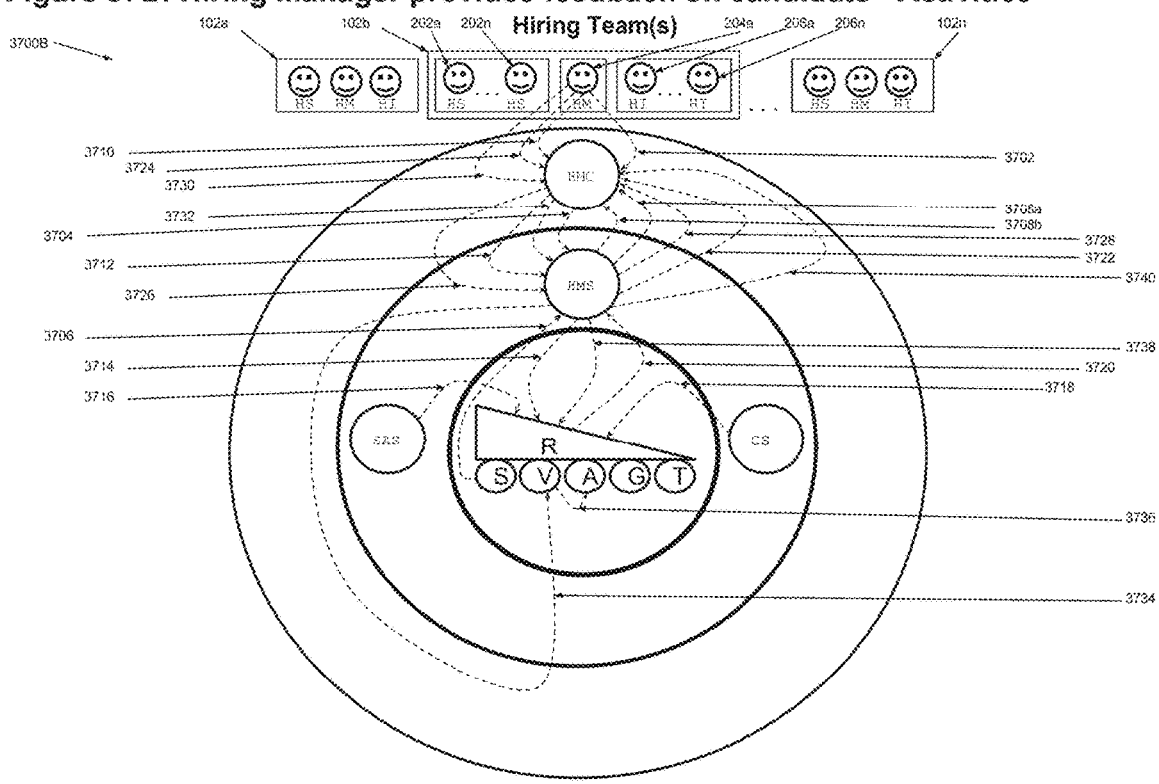
Figure 37B: Hiring Manager provides feedback on candidate - Activities

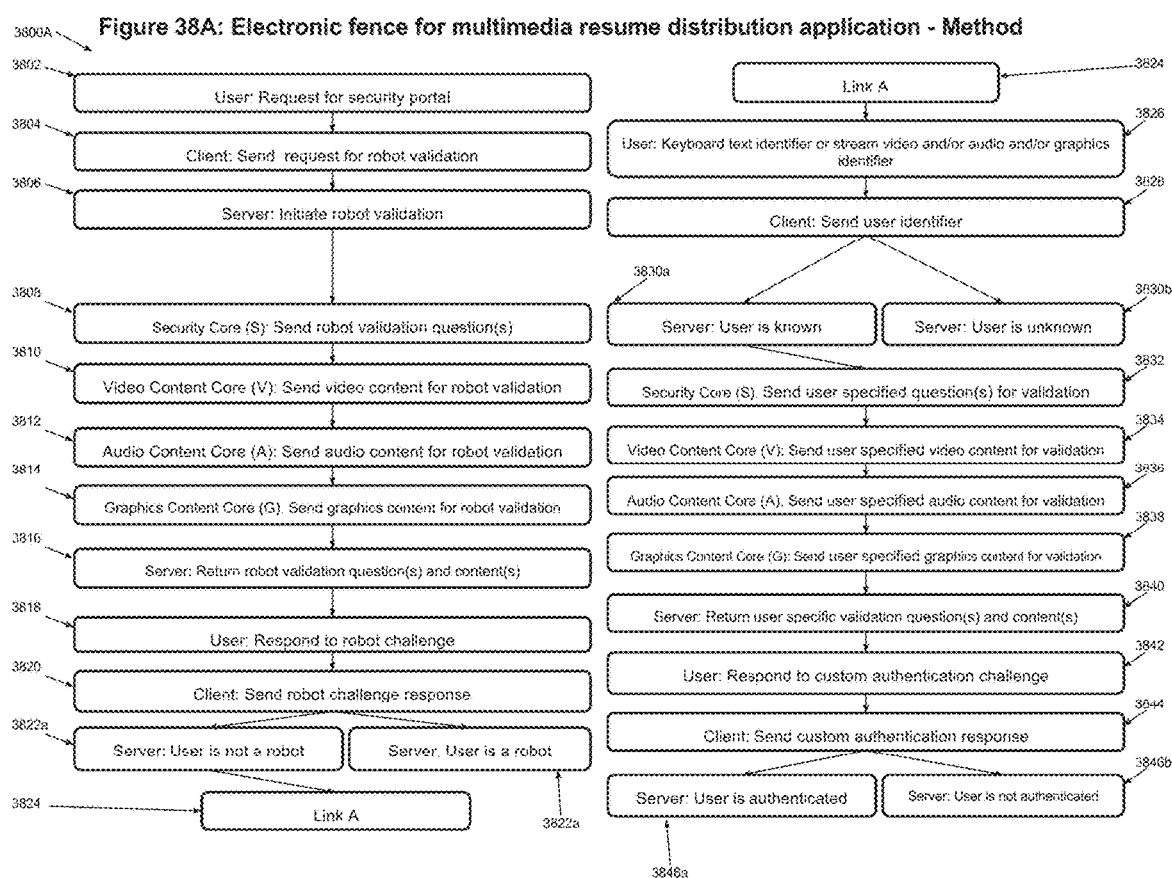

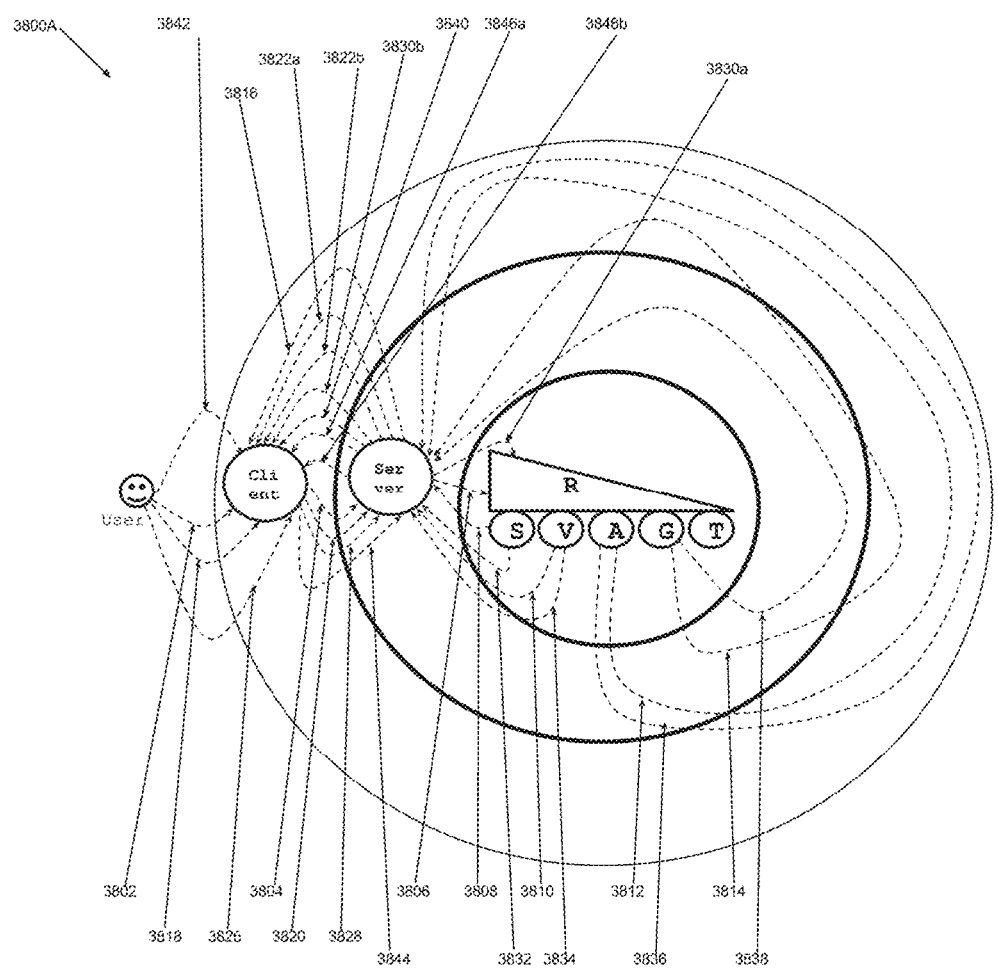
Figure 38B: Electronic fence for multimedia resume distribution application - Activities

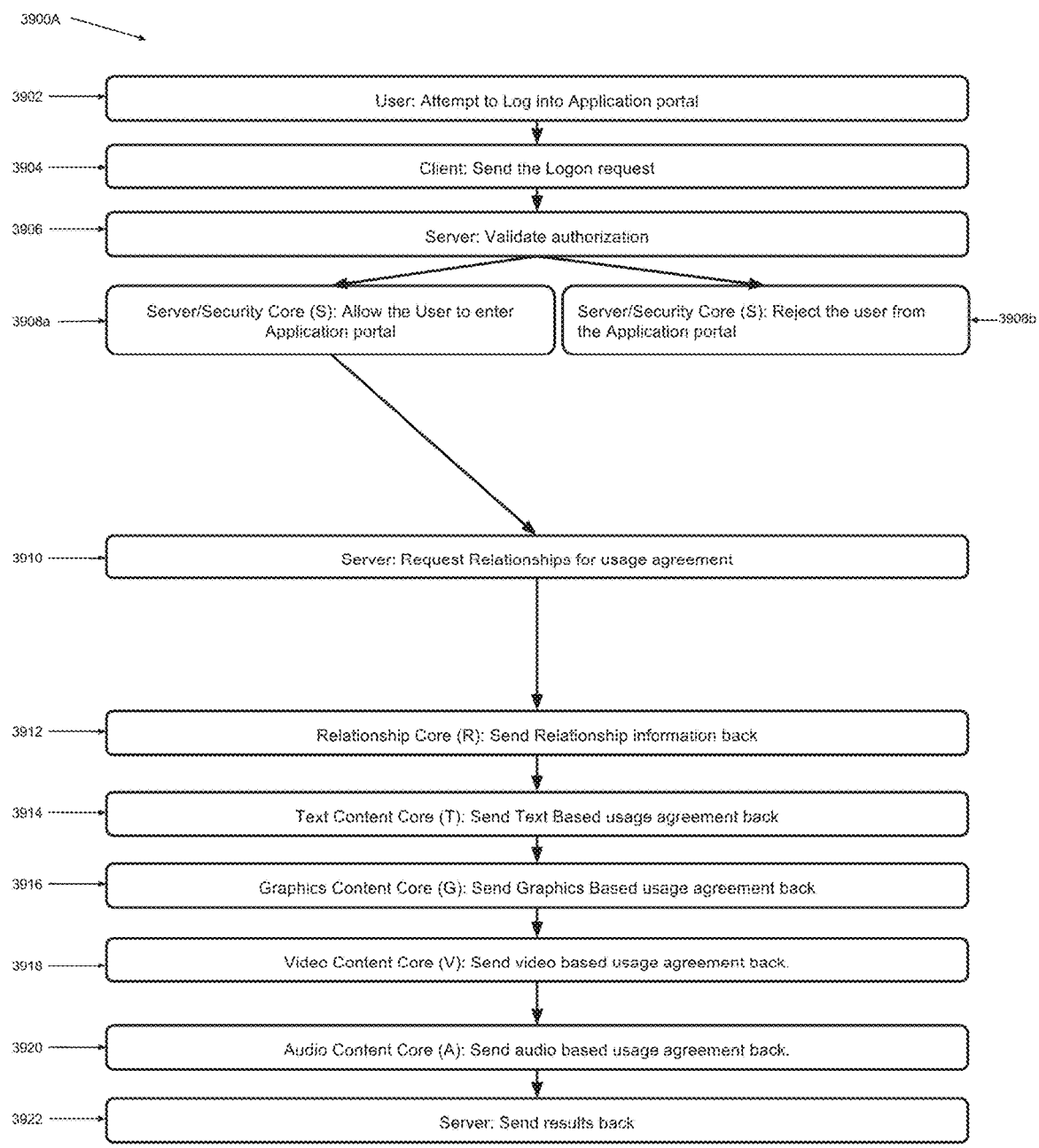

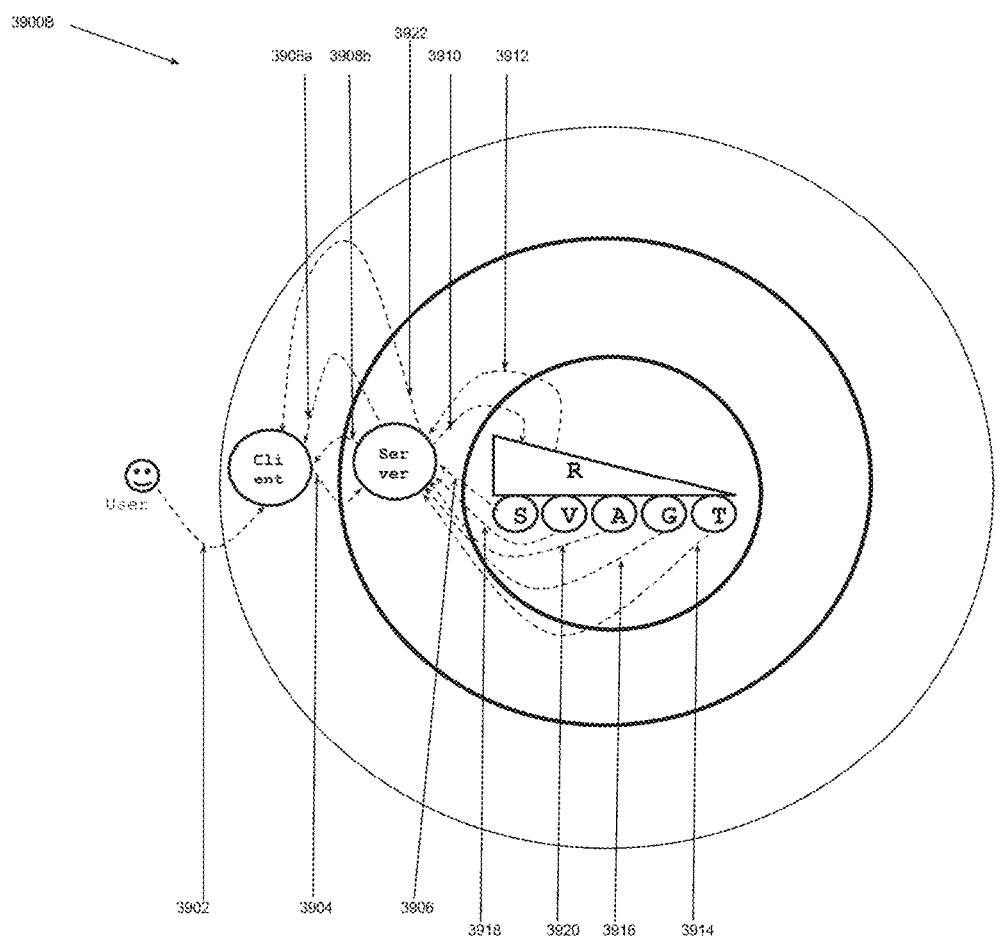
Figure 39B: User reviews usage agreement - Activities

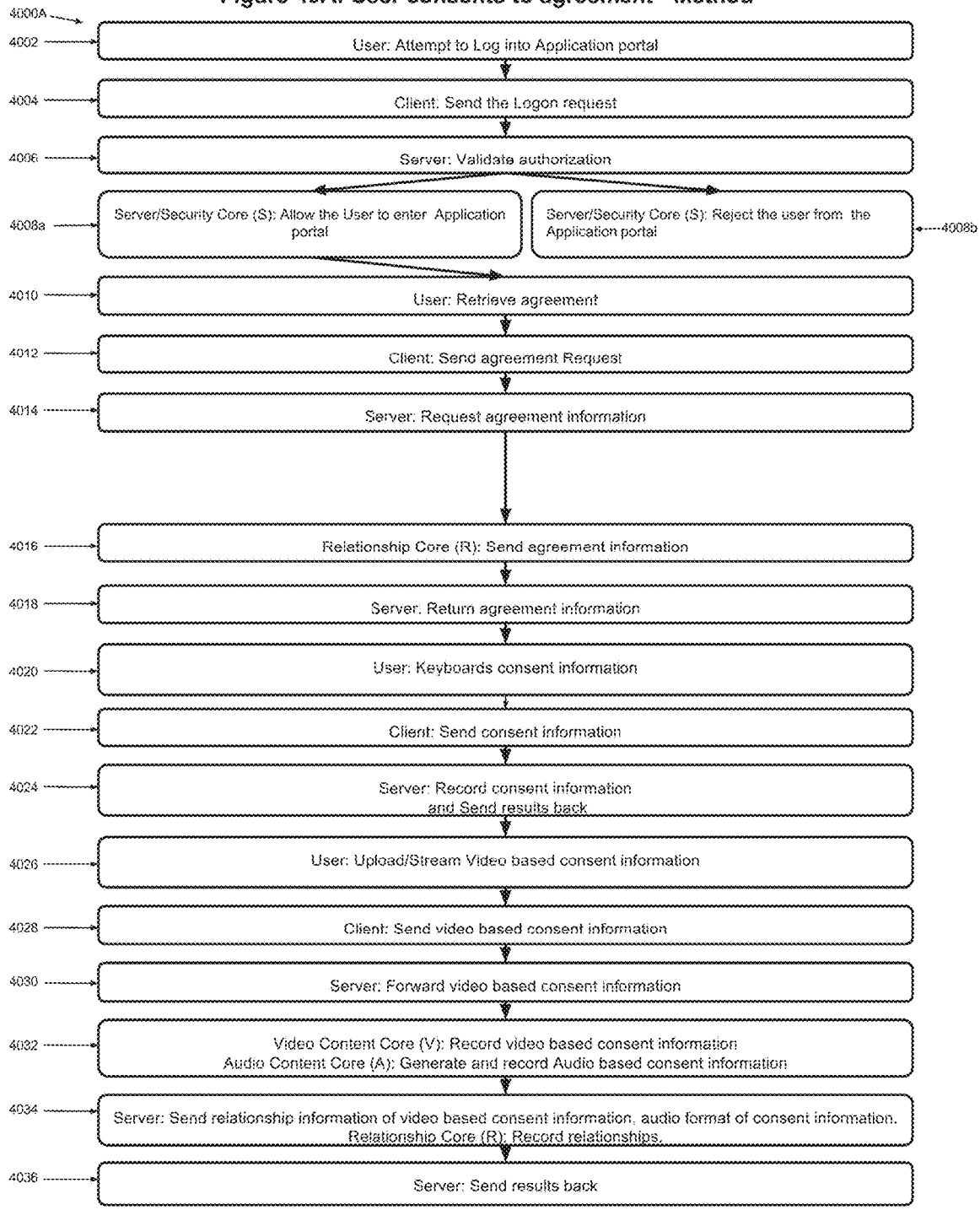

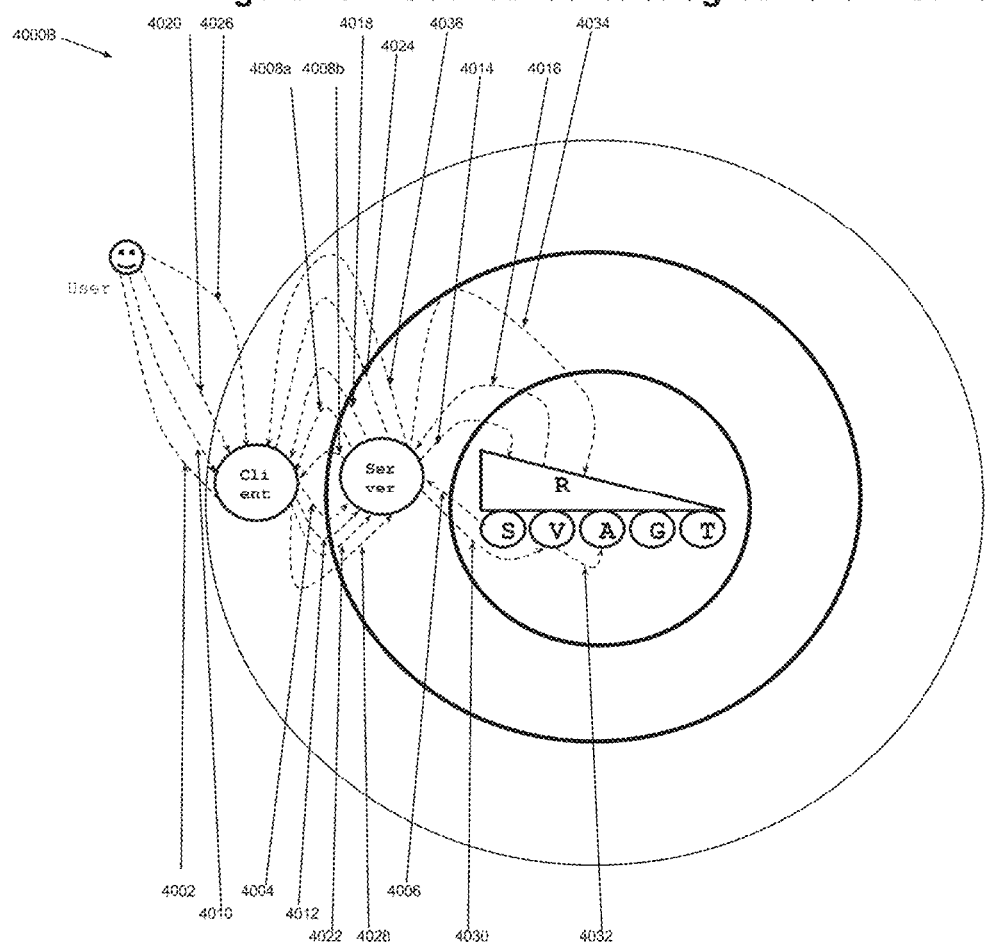
Figure 40B: User consents to agreement - Activities

MULTIMEDIA RESUME DISTRIBUTION SYSTEM

CROSS REFERENCE TO RELATED APPLICATIONS

This Non-Provisional patent application claims the benefit of the filing date of U.S. Provisional Patent Application Ser. No. 62/111,552, filed Feb. 3, 2015, entitled "MULTIMEDIA RESUME DISTRIBUTION SYSTEM" having Attorney Docket No. P1476.101.101, which is herein incorporated by reference.

BACKGROUND

There are various approaches to market a job seeker's capabilities and experience information using disintegrated and non-cohesive methods, such as text based resumes, stand-alone non-integrated audio based profiles, and stand-alone non-integrated video based profiles. These specific job seeker capabilities and experience information are also typically considered private (i.e., nonpublic) information and accordingly are typically desired to made available only to those in the supply chain of staffing process, who need to know.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a diagram illustrating an example multimedia resume distribution system architecture for building a multimedia resume distribution system.

FIG. 2 is a diagram of an example multimedia resume distribution solution architecture illustrating example roles that will be granted access privilege to a multimedia resume distribution system.

FIG. 3 is a diagram of an example multimedia resume distribution hardware architecture illustrating a hardware based staffing infrastructure solution, which includes special purpose hardware components of a multimedia resume distribution system.

FIG. 4 is a diagram of an example multimedia resume distribution software architecture illustrating a software application solution, which includes special purpose software components of a multimedia resume distribution system.

FIG. 5A is a diagram of an example multimedia resume distribution storage architecture illustrating a storage based staffing infrastructure solution, which includes special purpose storage components of a multimedia resume distribution system.

FIG. 5B is a dashboard map diagram of an example multimedia resume distribution application architecture illustrating an application building block based staffing application solution, which includes special purpose application building block components of a multimedia resume distribution system.

FIG. 5C is a dashboard map diagram of an example multimedia resume distribution user interaction architecture illustrating interaction based staffing application solution, which includes interactions among users and application building blocks of a multimedia resume distribution system.

FIG. 6A is a flow diagram illustrating an example method for a hiring manager to open a job position.

FIG. 6B is a diagram illustrating example activities performed for a hiring manager to open job position, the activities include handshakes and interactions among hiring manager, staffing client portal application software components, staffing server application software components, and staffing core application software components.

FIG. 7A is a flow diagram illustrating an example method for a hiring manager to assign screener.

FIG. 7B is a diagram illustrating example activities performed for a hiring manager to assign screener, which illustrates handshakes or interactions among hiring manager, staffing client portal application software components, staffing server application software components and staffing core application software components.

FIG. 8A is a flow diagram illustrating an example method for a hiring manager to assign interviewer.

FIG. 8B is a diagram illustrating example activities performed for a hiring manager to assign interviewer, which illustrates handshakes or interactions among hiring manager, staffing client portal application software components, staffing server application software components and staffing core application software components.

FIG. 9A is a flow diagram illustrating an example method for an account manager to review job position.

FIG. 9B is a diagram illustrating example activities performed for an account manager to review job position, which illustrates handshakes or interactions among account manager, staffing client portal application software components, staffing server application software components and staffing core application software components.

FIG. 10A is a flow diagram illustrating an example method for an account manager to comment on job position.

FIG. 10B is a diagram illustrating example activities performed for an account manager to comment on job position, which illustrates handshakes or interactions among account manager, staffing client portal application software components, staffing server application software components and staffing core application software components.

FIG. 11A is a flow diagram illustrating an example method for a staffing recruiter to review job position.

FIG. 11B is a diagram illustrating example activities performed for a staffing recruiter to review job position, which illustrates handshakes or interactions among staffing recruiter, staffing client portal application software components, staffing server application software components and staffing core application software components.

FIG. 12A is a flow diagram illustrating an example method for a staffing recruiter to comment on job position.

FIG. 12B is a diagram illustrating example activities performed for a staffing recruiter to comment on job position, which illustrates handshakes or interactions among staffing recruiter, staffing client portal application software components, staffing server application software components and staffing core application software components.

FIG. 13A is a flow diagram illustrating an example method for a candidate to review job position.

FIG. 13B is a diagram illustrating example activities performed for a candidate to review job position, which illustrates handshakes or interactions among candidate, staffing client portal application software components, staffing server application software components and staffing core application software components.

FIG. 14A is a flow diagram illustrating an example method for a candidate to provide feedback on the job position.

FIG. 14B is a diagram illustrating example activities performed for a candidate to provide feedback on the job position, which illustrates handshakes or interactions among candidate, staffing client portal application software components, staffing server application software components and staffing core application software components.

FIG. 15A is a flow diagram illustrating an example method for a candidate to post resume for the job position.

FIG. 15B is a diagram illustrating example activities performed for a candidate to post resume for the job position, which illustrates handshakes or interactions among candidate, staffing client portal application software components, staffing server application software components and staffing core application software components.

FIG. 16A is a flow diagram illustrating an example method for a staffing recruiter to review candidate's comment for the job position.

FIG. 16B is a diagram illustrating example activities performed for a staffing recruiter to review candidate's comment for the job position, which illustrates handshakes or interactions among staffing recruiter, staffing client portal application software components, staffing server application software components and staffing core application software components.

FIG. 17A is a flow diagram illustrating an example method for a staffing recruiter to review candidate's resume for the job position.

FIG. 17B is a diagram illustrating example activities performed for a staffing recruiter to review candidate's resume for the job position, which illustrates handshakes or interactions among staffing recruiter, staffing client portal application software components, staffing server application software components and staffing core application software components.

FIG. 18A is a flow diagram illustrating an example method for a staffing recruiter to accept/reject candidate's resume for the job position.

FIG. 18B is a diagram illustrating example activities performed for a staffing recruiter to accept/reject candidate's resume for the job position, which illustrates handshakes or interactions among staffing recruiter, staffing client portal application software components, staffing server application software components and staffing core application software components.

FIG. 19A is a flow diagram illustrating an example method for a account manager to review candidate's comment for the job position.

FIG. 19B is a diagram illustrating example activities performed for an account manager to review candidate's comment for the job position, which illustrates handshakes or interactions among account manager, staffing client portal application software components, staffing server application software components and staffing core application software components.

FIG. 20A is a flow diagram illustrating an example method for an account manager to review candidate's resume for the job position.

FIG. 20B is a diagram illustrating example activities performed for an account manager to review candidate's resume for the job position, which illustrates handshakes or interactions among account manager, staffing client portal application software components, staffing server application software components and staffing core application software components.

FIG. 21A is a flow diagram illustrating an example method for a third party to review candidate.

FIG. 21B is a diagram illustrating example activities performed for a third party to review candidate, which illustrates handshakes or interactions among third party, staffing client portal application software components, staffing server application software components and staffing core application software components.

FIG. 22A is a flow diagram illustrating an example method for a third party to provide feedback on candidate.

FIG. 22B is a diagram illustrating example activities performed for a third party to provide feedback on candidate, which illustrates handshakes or interactions among third party, staffing client portal application software components, staffing server application software components and staffing core application software components.

FIG. 23A is a flow diagram illustrating an example method for an account manager to accept/reject candidate's resume.

FIG. 23B is a diagram illustrating example activities performed for an account manager to accept/reject candidate's resume, which illustrates handshakes or interactions among account manager, staffing client portal application software components, staffing server application software components and staffing core application software components.

FIG. 24A is a flow diagram illustrating an example method for a hiring manager to review candidate's resume.

FIG. 24B is a diagram illustrating example activities performed for a hiring manager to review candidate's resume, which illustrates handshakes or interactions among hiring manager, staffing client portal application software components, staffing server application software components and staffing core application software components.

FIG. 25A is a flow diagram illustrating an example method for a hiring manager to accept/reject candidate's resume.

FIG. 25B is a diagram illustrating example activities performed for a hiring manager to accept/reject candidate's resume, which illustrates handshakes or interactions among hiring manager, staffing client portal application software components, staffing server application software components and staffing core application software components.

FIG. 26A is a flow diagram illustrating an example method for a hiring screener to review candidate's resume.

FIG. 26B is a diagram illustrating example activities performed for a hiring screener to review candidate's resume, which illustrates handshakes or interactions among hiring screener, staffing client portal application software components, staffing server application software components and staffing core application software components.

FIG. 27A is a flow diagram illustrating an example method for a hiring screener to provide feedback on candidate.

FIG. 27B is a diagram illustrating example activities performed for a hiring screener to provide feedback on candidate, which illustrates handshakes or interactions among hiring screener, staffing client portal application software components, staffing server application software components and staffing core application software components FIG. 28A is a flow diagram illustrating an example method for a hiring interviewer to review candidate's resume.

FIG. 28B is a diagram illustrating example activities performed for a hiring interviewer to review candidate's resume, which illustrates handshakes or interactions among hiring interviewer, staffing client portal application software components, staffing server application software components and staffing core application software components.

FIG. 29A is a flow diagram illustrating an example method for a hiring interviewer to provide feedback on candidate.

FIG. 29B is a diagram illustrating example activities performed for a hiring interviewer to provide feedback on candidate, which illustrates handshakes or interactions among hiring interviewer, staffing client portal application software components, staffing server application software components and staffing core application software components.

FIG. 30A is a flow diagram illustrating an example method for a staffing manager to publish contract.

FIG. 30B is a diagram illustrating example activities performed for a staffing manager to publish contract, which illustrates handshakes or interactions among staffing manager, staffing client portal application software components, staffing server application software components and staffing core application software components.

FIG. 31A is a flow diagram illustrating an example method for a hiring manager to review contract.

FIG. 31B is a diagram illustrating example activities performed for a hiring manager to review contract, which illustrates handshakes or interactions among hiring manager, staffing client portal application software components, staffing server application software components and staffing core application software components.

FIG. 32A is a flow diagram illustrating an example method for a candidate to review contract.

FIG. 32B is a diagram illustrating example activities performed for a candidate to review contract, which illustrates handshakes or interactions among candidate, staffing client portal application software components, staffing server application software components and staffing core application software components.

FIG. 33A is a flow diagram illustrating an example method for a hiring manager to offer job position.

FIG. 33B is a diagram illustrating example activities performed for a hiring manager to offer job position, which illustrates handshakes or interactions among hiring manager, staffing client portal application software components, staffing server application software components and staffing core application software components.

FIG. 34A is a flow diagram illustrating an example method for a staffing manager to sign contract.

FIG. 34B is a diagram illustrating example activities performed for a staffing manager to sign contract, which illustrates handshakes or interactions among staffing manager, staffing client portal application software components, staffing server application software components and staffing core application software components.

FIG. 35A is a flow diagram illustrating an example method for a hiring manager to sign contract.

FIG. 35B is a diagram illustrating example activities performed for a hiring manager to sign contract, which illustrates handshakes or interactions among hiring manager, staffing client portal application software components, staffing server application software components and staffing core application software components.

FIG. 36A is a flow diagram illustrating an example method for a candidate to sign contract.

FIG. 36B is a diagram illustrating example activities performed for a candidate to sign contract, which illustrates handshakes or interactions among candidate, staffing client portal application software components, staffing server application software components and staffing core application software components.

FIG. 37A is a flow diagram illustrating an example method for a hiring manager to provide feedback on candidate.

FIG. 37B is a diagram illustrating example activities performed for a hiring manager to provide feedback on candidate, which illustrates handshakes or interactions among hiring manager, staffing client portal application software components, staffing server application software components and staffing core application software components.

FIG. 38A is a flow diagram illustrating an example method for any user to enter electronic fence.

FIG. 38B is a diagram illustrating example activities performed for any user to enter electronic fence, which illustrates handshakes or interactions among any user, staffing client portal application software components, staffing server application software components and staffing core application software components.

FIG. 39A is a flow diagram illustrating an example method for any user to review usage agreement.

FIG. 39B is a diagram illustrating example activities performed for any user to review usage agreement, which illustrates handshakes or interactions among any user, staffing client portal application software components, staffing server application software components and staffing core application software components.

FIG. 40A is a flow diagram illustrating an example method for any user to consent to usage agreement.

FIG. 40B is a diagram illustrating example activities performed for any user to consent to usage agreement, which illustrates handshakes or interactions among any user, staffing client portal application software components, staffing server application software components and staffing core application software components.

DETAILED DESCRIPTION

In the following Detailed Description, reference is made to the accompanying drawings, which form a part hereof, and in which is shown by way of illustration specific embodiments in which the invention may be practiced. Because components of embodiments can be positioned in a number of different orientations, directional terminology is used for purposes of illustration and is in no way limiting. It is to be understood that other embodiments may be utilized and structural or logical changes may be made without departing from the scope of the present invention.

It is to be understood that the features of the various exemplary embodiments described herein may be combined, in part or whole, with each other, unless specifically noted otherwise Text based resumes have been used by job seeking candidates, staffing agencies, and hiring teams for centuries. However, a text based resume does not readily and inherently represent some of the soft skills, such as verbal capabilities and body language of the candidate. For example, the candidate may describe in a text based resume as having excellent verbal skills, however in reality, the candidate may have poor usage of grammar during verbal communication. In addition, the text based resume lends itself to unlimited number of free formats and structures, which limits the hiring team from effectively comparing candidates side by side quantitatively and qualitatively. As a result, the process of qualifying and hiring candidates using text based resumes tend to be subjective and 'gut feelings' based, rather than objective and analytic based. In recent years, staffing agencies and hiring managers have been using resume reading software to speed up the screening of qualified candidates. However, there have been articles that show how to write a resume to beat resume reading software. In addition, several studies show that qualified candidates have been disqualified by resume reading software. As the text based resume contains personnel information, the job seeking candidate typically expects to safeguard the resume from public media outlets.

Audio based profiles of job seeking candidate have been advocated in several articles. Audio based profiles can highlight verbal capabilities of the candidate. However, audio based profiles fall short on highlighting the body language of the candidate. Audio based profiles are used by some practitioners in a stand-alone non-integrated fashion. However, the stand-alone non-integrated audio based profile approach allows human errors, such as a text based resume of a candidate gets cross mixed with audio based profile of another candidate and gets presented to a hiring team. As a result, the hiring team gets confused, frustrated and loses valuable time. In turn, the staffing company loses revenue and credibility. The candidates lose the opportunity to fill the open positions. As the audio based profile contains personnel information, the job seeking candidate typically expects to safeguard the audio profile from public media outlets.

Stand-alone video based profiles have been advocated in several articles. Video based profiles can highlight verbal and body language of the candidate. Video based profiles are used by some practitioners in a stand-alone non-integrated fashion. However, the stand-alone non-integrated video based profile approach allows human errors, such as a text based resume of a candidate gets cross mixed with video based profile of another candidate and gets presented to a hiring team. As a result, the hiring team gets confused, frustrated and lose valuable time. The staffing company loses revenue and credibility. The candidates lose the opportunity to fill the open position. As the video based profile contains personnel information, the job seeking candidate typically expects to safeguard the video profile from public media outlets.

Multimedia resume distribution system embodiments include a technological system to distribute multimedia based staffing industry related articles and multimedia based security related articles among authorized users effectively and efficiently.

Example multimedia based staffing articles include multimedia resumes, multimedia job descriptions, multimedia contracts, and miscellaneous multimedia articles. Example multimedia resumes include video resume content, audio resume content, graphical resume content, and textual resume content. Example multimedia job descriptions include video job descriptions, audio job descriptions, graphical job descriptions, and textual job descriptions. Example multimedia contracts include video based contracts, audio based contracts, graphics based contracts, and textual contracts. Example miscellaneous multimedia articles include: miscellaneous video based articles (e.g., video based comments on a job position); miscellaneous audio based articles (e.g., audio based comment on contract); miscellaneous graphics based articles (e.g., example: education credential); and miscellaneous textual articles (e.g., direction for interview location).

Example multimedia based security articles include generic multimedia security articles and user specific multimedia security articles. Example generic multimedia security articles include generic video article, generic audio article, generic graphical article, and generic textual article. Example user specific multimedia security articles include user specific video article, user specific audio article, user specific graphical article, and user specific textual article.

Multimedia resume distribution system embodiments can securely supplement a passive traditional resume, which is created to describe the capability and experience of a candidate in the job market, with lively multimedia components, which are integrated seamlessly without cross candidate profile mix-up. More specifically, a text based resume of a candidate is supplemented with custom configured audio profile of the same candidate, custom configured video profile of the same candidate, and visual capability dashboard of the same candidate to facilitate objective, quantitative and qualitative comparison of respective competing candidates for the open position(s) by recruiters, account managers, hiring managers, screeners, interviewers, and third party service providers (e.g., personality test service providers).

Multimedia resume distribution system embodiments can implement example methods for seamlessly integrating and securely presenting a comprehensive multi-media profile of a job seeking candidate without cross mixing other job seeking candidates' profiles, which would be in multimedia formats. The example methods employ a multimedia resume distribution architecture to securely connect with security server(s), database server(s), private nonpublic video content delivery server(s), private nonpublic audio content delivery server(s), private nonpublic text content delivery server(s), private nonpublic image content delivery server(s).

The staffing application server allows hiring manager(s) of hiring team(s) to post open job position(s) using a software, such as web browser. The staffing application server allows account manager(s) of the staffing company(ies) to review the posted open job position(s) and interact with hiring manager(s) via integrated instant messaging server(s) and/or integrated audio/video streaming server(s) and gather additional information and have questions clarified using a software, such as web browser. The application server allows recruiter(s) of the staffing company(ies) to review the posted open job position(s) and interact with account manager(s) of staffing company(ies) via integrated instant messaging and/or integrated audio/video streaming server(s) and gather additional information and have questions clarified using a software such as web browser. The staffing application server allows the recruiter(s) to interact with job seeking candidate(s) via integrated instant messaging server(s) and/or integrated audio/video streaming server(s) and/or email server(s) and discuss the open job position(s) using a software such as web browser. The staffing application server allows the job seeking candidate to upload his/her text based resume(s) and video profile(s) using a software, such as web browser. The staffing application server interacts with video content server(s) and stores the video content and records the reference in database server(s) along with job seeking candidate information. The staffing application server interacts with audio content server(s) to peel the audio portion, stores the audio content and records the reference in database server(s) along with job seeking candidate information. The staffing application server allows the recruiter to review the uploaded text based resume, video profile and audio profile and approve/reject the content. The staffing application server allows the recruiter(s) to interact with job seeking candidate and request for updated textual resume or video profile. The staffing application server allows the account manager(s) to review the approved text based resume, video profile and audio profile and approve/reject the job seeking candidate. The staffing application server allows the hiring manager to review the submitted text based resume, video profile and audio profile. The staffing application server allows the hiring manager(s) to assign screener(s) and/or interviewer(s) for the open job position. The staffing application server allows the hiring manager(s) to interact with screener(s) and/or interviewer(s) via instant messaging server(s) and/or audio/video streaming server(s). The staffing application server allows the screener(s) and/or interviewer(s) to record their screening/interview feedback. The staffing application server allows the hiring manager(s) to pick candidate(s) for the open job position(s) and make job offer(s). The staffing application server allows the hiring manager(s) to provide ongoing feedback of selected candidate(s).

Multimedia resume distribution system embodiments can implement methods to integrate the text based resume, video profile and audio profile of the job seeking candidate by recording the references of these various formats to respective job seeking candidate. When a job seeking candidate is submitted for open job position(s) using the staffing application server, the multimedia resume distribution system implemented method embodiments can prevent potential cross candidate profile mix-up.

There are previous approaches to store and distribute text based resumes to authorized users. However, these previous store and distribution approaches for text based resumes lack storage and distribution of multimedia based staffing articles.

Multimedia resume distribution system embodiments disclosed herein can store and distribute video based resumes, audio based resumes, graphics based resumes, video based job descriptions, audio based job descriptions, graphics based job descriptions, video based contracts, audio based contracts, graphics based job contracts, miscellaneous video based articles, miscellaneous audio based articles, and miscellaneous graphics based articles. As such, multimedia resume distribution system embodiments can store and distribute texted based resumes and multimedia based staffing articles.

There are previous approaches to store and distribute video based articles to users. However, this previous siloed approach lacks integration with staffing applications and allows mishandling of video articles, including a video of a job seeker being attached manually to another job seeker. Multimedia resume distribution system embodiments disclosed herein can integrate storage and distribution of video based articles with textual staffing articles.

There are previous approaches to store and distribute audio based articles to users. However, this previous siloed approach lacks integration with staffing applications and allows mishandling of audio articles, including an audio of a job seeker being attached manually to another job seeker. Multimedia resume distribution system embodiments disclosed herein can integrate storage and distribution of audio based articles with textual staffing articles, and audio based staffing articles.

There are previous approaches to store and distribute graphics based articles to users. However, this previous siloed approach lacks integration with staffing applications and allows mishandling of graphics based articles, including a graphics based article of a job seeker being attached manually to another job seeker. Multimedia resume distribution system embodiments disclosed herein can integrate storage and distribution of graphics based articles with textual staffing articles, video based staffing articles, and graphics based staffing articles.

There are previous approaches to establish legal agreement among parties using methods, including ink based signature, digital signature and thumb print. Multimedia resume distribution system embodiments disclosed herein can include audio based staffing contract agreement that comprises of audio article of language of agreement and audio acknowledgement of agreement by parties. Multimedia resume distribution system embodiments disclosed herein can include video based staffing contract agreement that comprises of video article of language of agreement and video acknowledgement of agreement by parties.

There are previous approaches to attempt to prevent any software applications from software robots to gain access. However, these previous approaches are not readily user readable because of generic scrambled symbols, including numbers, characters and special characters. Another previous approach uses audio format of generic symbols. Another previous approach uses user specific graphics. Multimedia resume distribution system embodiments disclosed herein can employ generic and user specific video based articles. Such multimedia resume distribution system embodiments can prevent software robots to gain access to any software application, including multimedia staffing article distribution system, and improve user experience.

FIG. 1 illustrates an example multimedia resume distribution system architecture 100 for building a multimedia resume distribution system. multimedia resume distribution system architecture 100 includes: hiring teams 102a-102n; a group of candidates 104; a group of third party service providers 106; a group of staffing teams 108; a group of staffing client systems 110; a group of staffing server systems 112; a group of staffing core systems 114; a group of private hiring systems 116; and a group of private candidate systems 118.

FIG. 2 illustrates an example multimedia resume distribution solution architecture 200 illustrating example roles that will be granted access privilege to a multimedia resume distribution system. Roles that will be granted access privilege to the multimedia resume distribution system include an example hiring team 102a including a hiring screener (HS) role, a hiring manager (HM) role, and a hiring interviewer (HI) role. Roles that will be granted access privilege to the multimedia resume distribution system include another hiring team 102b including hiring screener (HS) roles 202a-202n, a hiring manager (HM) role 204a, and hiring interviewer (HI) roles 206a-206n. As illustrated in FIG. 2, there may be any number of hiring teams 102a-102n. In some scenarios, a single user may play more than one role at any time.

FIG. 2 illustrates group of candidates 104 including C1, C2 . . . Cn. There can be any number of candidates. Example candidates 104 include legal assistant, registered nurse, software consultant, office administrator, and any other suitable job candidates. In some scenarios, a single user may play more than one role at any time.

FIG. 2 illustrates group of third party service provider roles 106 including P1, P2 . . . Pn. There can be any number of third party service provider roles. Example third party service provider roles 106 include sub-contracting service provider, personality test provider, drug test provider, aptitude test provider, background check provider, and any other suitable third party service provider role. In some scenarios, a single user may play more than one role at any time.

FIG. 2 illustrates staffing teams 108 including a group of staffing recruiter (SR) roles 208a-208n, a group of staffing account manager (SA) roles 210a-210n, and a group of staffing manager (SM) roles 212a-212n. There can be any number of staffing recruiter roles, any number of staffing account manager roles, any number of staffing manager roles. In some scenarios, a single user may play more than one role at any time.

FIG. 3 illustrates an example multimedia resume distribution hardware architecture 300 illustrating a hardware based staffing infrastructure solution, which includes special purpose hardware components of a multimedia resume distribution system. A special purpose hardware component system that can be employed in an operating environment and used to host or run a computer application implementing methods of this disclosure (such as method 600A, 700A, 800A, etc.), as included on one or more computer readable storage mediums storing computer executable instructions for controlling the computer system, such as a computing device, to perform a process. A computing device typically includes one or more processors and memory. The processors may include two or more processing cores on a chip or two or more processor chips. The computing device can also have one or more additional processing or specialized processors, such as graphics processor for general purpose computing on graphics processor units, to perform processing functions offloaded from the processor. Memory may be arranged in a hierarchy and may include one or more levels of cache. Memory may be volatile (such as random access memory (RAM)), non-volatile (such as read only memory (ROM), flash memory, etc.) or some combination of the two. The computing device can take one or more of several forms. Such forms include a tablet, a personal computer, a workstation, a server, a handheld device, a consumer electronic device, or other, and can be a stand-alone device or configured as part of a computer network, computer cluster, cloud services infrastructure, or other. Computing device may also include additional storage. Storage may be removable and/or non-removable and can include magnetic or optical disks or solid-state memory, or flash storage devices. Computer storage media includes volatile and non-volatile, removable and non-removable media implemented in any suitable method or technology for storage of information such as computer readable instructions, data structures, program modules or other data. A propagating signal by itself does not qualify as storage media. Computing device often includes one or more input and/or output connections, such as USB connections, display ports, proprietary connections, and other to connect various devices such as keyboard, pointing device (e.g., mouse), pen, voice input device (e.g. microphone), video camera, touch input device, or other. Output devices may include devices such as a display, speakers, printer, or the like. Computing device often includes one or more communication connections that allow computing device to communicate with other computers/applications. Example communication connections can include, but are not limited to, an Ethernet interface, a wireless interface, a bus interface, a storage area network interface, a proprietary interface. The communication connections can be used to couple the computing device to a computer network, which is a computing devices and possibly other devices interconnected by communications channels that facilitate communications and allows sharing of resources and information among interconnected devices. Examples of computer networks include a local area network, a wide area network, the Internet, or other network. Special purpose media delivery computer systems are optimized for storage and delivery of respective media content, such as video, audio, graphics, and text. Computing device can be configured to run an operating system software program and one or more computer software applications, which make up a system platform. A computer software application configured to execute on the computing device is typically provided as a set of instructions written in a programming language, implementing methods of this disclosure, such as 600A, 700A, 800A, etc. A computer application configured to execute on the computing device includes at least one computing process (or computing task), which is an executing program. Each computing process provides the computing resources to execute the program. Multimedia resume distribution hardware architecture 300 includes a group of staffing client devices 302, a group of staffing server appliances 324, a group of staffing core appliances 346, a group of private hiring manager appliances 360, and a group of private candidate appliances 364.

Group of staffing client devices 302 comprises: a group of candidate client devices 304; third party service provider devices 306, 308, and 310; a group of staffing recruiter client devices 312; a group of staffing account manager client devices 314; a group of staffing manager client devices 316; a group of hiring screener client devices 318; a group of hiring manager client devices 320; and a group of hiring interviewer client devices 322. Example staffing client devices 302 can include a suitable combination of any suitable electronic devices and peripherals, such as a laptop, a desktop, a cell phone, a tablet, a keyboard, a mouse, a video camera, a microphone, a speaker, a network device, and other suitable electronic devices and peripherals.

Group of staffing server appliances 324 comprises: a group of candidate server appliances 326; a group of third party service provider server appliances 328, 330, and 332; a group of staffing recruiter server appliances 334; a group of staffing account manager server appliances 336; a group of staffing manager server appliances 338; a group of hiring screener server appliances 340; a group of hiring manager server appliances 342; and a group of hiring interviewer client appliances 344. Example staffing server appliances 324 can include a suitable combination of suitable computer servers, such as commodity grade servers, mid-range servers, high end servers, high availability servers, cloud based servers, and data center based servers, in-house server, and other suitable servers. Staffing server appliances 324 can also be housed in a suitable combination of cloud service providers, data center providers, and in-house servers. Staffing server appliances 324 can provide data backup, data archival, data restore capabilities, physical security, network security, and other suitable server services.

Group of staffing core appliances 346 comprises: a group of relationship core appliances 348; a group of security core appliances 350; a group of video content core appliances 352; a group of audio content core appliances 354; a group of graphics content core appliances 356; a group of text content core appliances 358. Example staffing core appliances 346 can include a suitable combination of suitable computer servers, such as commodity grade servers, mid-range servers, high end servers, high availability servers, cloud based servers, and data center based servers, in-house server, and other suitable servers. Staffing core appliances 346 can also be housed in a suitable combination of cloud service providers, data center providers, and in-house servers. Staffing core appliances 346 can provide data backup, data archival, data restore capabilities, physical security, network security, and other suitable server services.

Group of private hiring manager appliances 360 comprises of a group of private hiring manager appliances 362. Example private hiring manager appliances 360 can include a suitable combination of suitable computer servers, such as commodity grade servers, mid-range servers, high end servers, high availability servers, cloud based servers, data center based servers, in-house server, and other suitable servers. Private hiring manager appliances 360 can also be housed in a suitable combination of cloud service providers, data center providers, and in-house servers. Private hiring manager appliances 360 can provide data backup, data archival, data restore capabilities, physical security, network security, and other suitable server services.

Group of private candidate appliances 364 comprises of a group of private candidate appliances 366. Example private candidate appliances 364 can include a suitable combination of suitable computer servers, such as commodity grade servers, mid-range servers, high end servers, high availability servers, cloud based servers, data center based servers, in-house server, and other suitable servers. Private candidate appliances 364 can also be housed in a suitable combination of cloud service providers, data center providers, and in-house servers. Private candidate appliances 364 can provide data backup, data archival, data restore capabilities, physical security, network security, and other suitable server services.

FIG. 4 illustrates an example multimedia resume distribution software architecture 400 illustrating a software application solution, which includes a special purpose software components of a multimedia resume distribution system. Multimedia resume distribution software architecture 400 executes on multimedia resume distribution hardware architecture 300. Multimedia resume distribution software architecture 400 includes a group of staffing client portals 402, a group of staffing server applications 424, a group of staffing core applications 446, a group of private hiring manager applications 460, and a group of private candidate applications 464.

Group of staffing client portals 402 includes instructions for requesting and presenting information, and comprises: a group of candidate client portal application software components 404 (which executes on a group of candidate client devices 304); a group of third party service provider portal application software components 406, 408, and 410 (which execute on third party service provider devices 306, 308, and 310 respectively); a group of staffing recruiter client portal application software components 412 (which executes on a group of staffing recruiter client devices 312); a group of staffing account manager client portal application software components 414 (which executes on a group of staffing account manager client devices 314); a group of staffing manager client portal application software components 416 (which executes on a group of staffing manager client devices 316); a group of hiring screener client portal application software components 418 (which executes on a group of hiring screener client devices 318); a group of hiring manager client portal application software components 420 (which executes on a group of hiring manager client devices 320); and a group of hiring interviewer client portal application software components 422 (which executes on a group of hiring interviewer client devices 322).

Group of staffing server applications 424 includes integration instructions for controlling communications and data transfer among special purpose media delivery computer systems, written in a programming language, implementing methods of this disclosure (such as 600A, 700A, 800A, etc.) and comprises: a group of candidate server application software components 426 (which executes on a group of candidate server appliances 326); a group of third party service provider server application software components 428, 430, and 432 (which execute on a group of third party service provider server appliances 328, 330, and 332 respectively); a group of staffing recruiter server application components 434 (which executes on a group of staffing recruiter server appliances 334); a group of staffing account manager server application software components 436 (which executes on a group of staffing account manager server appliances 336); a group of staffing manager server application software components 438 (which executes on a group of staffing manager server appliances 338); a group of hiring screener server application software components 440 (which executes on a group of hiring screener server appliances 340); a group of hiring manager server application software components 442 (which executes on a group of hiring manager server appliances 342); and a group of hiring interviewer client application software components 444 (which executes on a group of hiring interviewer client appliances 344).

Group of staffing core applications 446 includes integration instructions for controlling communications and represents special purpose media delivery software applications, which includes delivery instructions for optimal data transfer and protection of data, and comprises: a group of relationship core application software components 448 (which executes on a group of relationship core appliances 348); a group of security core application software components 450 (which executes on a group of security core appliances 350); a group of video content core application software components 452 (which executes on a group of video content core appliances 352); a group of audio content core application software components 454 (which executes on a group of audio content core appliances 354); a group of graphics content core application software components 456 (which executes on a group of graphics content core appliances 356); and a group of text content core application software components 458 (which executes on a group of text content core appliances 358).

Group of private hiring manager applications 460 comprises of a group of private hiring manager application software components 462.

Group of private candidate applications 464 comprises of a group of private candidate application software components 466.

FIG. 5A illustrates an example multimedia resume distribution storage architecture 500. Multimedia resume distribution storage architecture 500 is stored on multimedia resume distribution hardware architecture 300. Multimedia resume distribution storage architecture 500 includes: an application interaction layer 502; a group of users 504, 508, 512, and 516; and a group of interactions 506, 510, 514, and 518.

Multimedia resume distribution storage architecture 500 comprises: multimedia staffing articles 520 and Multimedia security articles 562.

Example multimedia based staffing articles 520 include multimedia resumes 522, multimedia job descriptions 532, multimedia contracts 542, and miscellaneous multimedia articles 552. Example multimedia resumes include video resume content 524 (which are stored on a group of video content core appliances 352); audio resume content 526 (which are stored on a group of audio content core appliances 354); graphical resume content 528 (which are stored on a group of graphics content core appliances 356); and textual resume content 530 (which are stored on a group of text content core appliances 358). Example multimedia job descriptions 532 include video job descriptions 534 (which are stored on a group of video content core appliances 352); audio job descriptions 536 (which are stored on a group of audio content core appliances 354); graphical job descriptions 538 (which are stored on a group of graphics content core appliances 356); and textual job descriptions 540 (which are stored on a group of text content core appliances 358). Example multimedia contracts 542 include video based contracts 544 (which are stored on a group of video content core appliances 352); audio based contracts 546 (which are stored on a group of audio content core appliances 354); graphics based contracts 548 (which are stored on a group of graphics content core appliances 356); and textual contracts 550 (which are stored on a group of text content core appliances 358). Example miscellaneous multimedia articles 552 include: miscellaneous video based articles 554 (e.g., video based comments on a job position) (which are stored on a group of video content core appliances 352); miscellaneous audio based articles 556 (e.g., audio based comment on contract) (which are stored on a group of audio content core appliances 354); miscellaneous graphics based articles 558 (e.g., example: education credential) (which are stored on a group of graphics content core appliances 356); and miscellaneous textual articles 560 (e.g., direction for interview location) (which are stored on a group of text content core appliances 358).

Example multimedia based security articles 562 include generic multimedia security articles 564 and user specific multimedia security articles 574. Example generic multimedia security articles 564 include generic video article 566 (which are stored on a group of video content core appliances 352); generic audio article 568 (which are stored on a group of audio content core appliances 354); generic graphical article 570 (which are stored on a group of graphics content core appliances 356); and generic textual article 572 (which are stored on a group of text content core appliances 358). Example user specific multimedia security articles 574 include user specific video article 575 (which are stored on a group of video content core appliances 352); user specific audio article 576 (which are stored on a group of audio content core appliances 354); user specific graphical article 577 (which are stored on a group of graphics content core appliances 356); and user specific textual article 578 (which are stored on a group of text content core appliances 358).

FIG. 5B illustrates a dash board map of an example multimedia resume distribution application architecture, which is collectively illustrated in the various example embodiments illustrated in FIGS. 1-40B. Multimedia resume distribution system 580 includes: comprehensive multimedia resume distribution system 582; an application framework 584 upon which system is built; a group of application building blocks 586. Example application framework 584 includes: multimedia resume distribution system architecture 100 (see FIG. 1 for details); multimedia resume distribution solution architecture 200 (see FIG. 2 for details); multimedia resume distribution hardware architecture 300 (see FIG. 3 for details); multimedia resume distribution software architecture 400 (see FIG. 4 for details); multimedia resume distribution storage architecture 500 (see FIG. 5A for details); multimedia resume distribution interaction architecture 590 (see FIG. 5C for details). Example application building blocks 586 includes methods: User-enter electronic fence 3100A; User-review agreement; User-consent to agreement; HM-open job position 600A; HM-assign screener 700A; HM-assign interviewer 800A; SA-review job position 900A; SA-comment on job position 1000A; SR-review job position 1100A; SR-comment on job position 1200A; C1-review job position 1300A; C1 comment job position 1400A; C1-post resume 1500A; SR-review candidate comment 1600A; SR-review candidate resume 1700A; SR-accept/reject resume 1800A; SA-review candidate comment 1900A; SA-review candidate resume 2000A; P2-review candidate resume 2100A; P2-provide feedback 2200A; SA-accept/reject resume 2300A; HM-review candidate resume 2400A; HM-accept/reject candidate 2500A; HS-review candidate resume 2600A; HS-provide feedback 2700A; HI-review candidate resume 2800A; HI-provide feedback 2900A; SM-publish contract 3000A; HM-review contract 3100A; C1-review contract 3200A; HM-offer job 3300A; C1-sign contract 3600A; SM-sign contract 3400A; HM-sign contract 3500A; HM-provide feedback 3700A.

FIG. 5C illustrates a multimedia resume distribution user interaction dashboard map 590 illustrating a sequence of activities that takes place within a multimedia resume distribution system, and who performs or controls those activities. At 591, user performs and controls method 3800A, 3900A, and 4000A. At 592, hiring manager HM performs and controls methods: 600A, 700A, 800A, 2400A, 2500A, 3100A, 3300A, 3500A, and 3700A. At 593, staffing account manager SA performs and controls methods: 900A, 1000A, 1900A, 2000A, and 2300A. At 594, staffing recruiter SR performs and controls methods: 1100A, 1200A, 1600A, 1700A, and 1800A. At 595, candidate C1 performs and controls methods: 1300A, 1400A, 1500A, 3200A, and 3600A. At 596, hiring screener HS performs and controls methods: 2600A and 2700A. At 597, hiring interviewer HI performs and controls methods: 2800A and 2900A. At 598, third party P2 performs and controls methods: 2100A and 2200A. At 599, staffing manager performs and controls methods: 3000A and 3400A.

FIG. 6A illustrates an example method 600A for a hiring manager to open job position.

FIG. 6B illustrates an example activities 600B performed for a hiring manager to open job position during method 600A. Activities 600B include handshakes among hiring manager, staffing client portal application software components, staffing server application software components and staffing core application software components. Element numbers for features in method 600A in FIG. 6A correspond with respective element numbers in FIG. 6B.

At 602, hiring manager HM attempts to log into hiring manager portal using hiring manager client HMC software. At 604, hiring manager client HMC software sends request to hiring manager server HMS. At 606, hiring manager server HMS validates authorization with security core application software S. At 608a, hiring manager server HMS allows hiring manager to enter hiring manager portal. At 608b, hiring manager server HMS rejects user from entering hiring manager portal. At 610, hiring manager HM opens job position and streams/uploads text based job description using hiring manager client HMC. At 612, hiring manager client HMC sends keyboarded job position information and text based job description to hiring manager server HMS. At 614, hiring manager server HMS records job position information and sends text based job description to text content core application software T. At 616, text content core application software T records text based job description and sends a message to graphics content core application software G to process text based job description and graphics content core application software G consumes text based job description and generates and records graphical dashboard images. At 618, hiring manager server HMS sends message back to hiring manager client HMC. At 620, hiring manager HM streams/uploads video based job description using hiring manager client HMC. At 622, hiring manager client HMC sends video based job description to hiring manager server HMS. At 624, hiring manager server HMS sends video based job description to video content core application software V. At 626, video content core application software V records video based job description and sends a message to audio content core application software A to process video based job description and audio content core application software consumes video based job description, generates and records audio based job description. At 628, hiring manager server HMS integrates and sends relationship information of text based job description, graphical dashboard representation of job description, video based job description, audio format of job description to relationship core application software R and relationship core application software records relationships. At 630, hiring manager server HMS sends results back to hiring manager client HMC.

FIG. 7A illustrates an example method 700A for a hiring manager to assign screener.

FIG. 7B illustrates an example activities 700B performed for a hiring manager to assign screener during method 700A. Activities 700B include handshakes among hiring manager, staffing client portal application software components, staffing server application software components and staffing core application software components. Element numbers for features in method 700A in FIG. 7A correspond with respective element numbers in FIG. 7B.

At 702, hiring manager HM attempts to log into hiring manager portal using hiring manager client HMC. At 704, hiring manager client HMC sends request to hiring manager server HMS. At 706, hiring manager server HMS validates authorization with security core application software S. At 708a, hiring manager server HMS allows hiring manager to enter hiring manager portal. At 708b, hiring manager server HMS rejects user from entering hiring manager portal. At 710, hiring manager HM assigns screener and provide instructions using hiring manager client HMC. At 712, hiring manager client HMC sends keyboarded screener information and instructions to hiring manager server HMS, and hiring manager server records screener information and instructions. At 714, hiring manager server HMS sends message back to hiring manager client HMC. At 716, hiring manager HM streams/uploads video based instructions for screener using hiring manager client HMC. At 718, hiring manager client HMC sends video based instruction to hiring manager server HMS. At 720, hiring manager server HMS sends video based instructions to video content core application software V. At 722, video content core application software V records video based instruction and sends a message to audio content core application software A to process video based instruction and audio content core application software consumes video based instruction, generates and records audio based instruction. At 724, hiring manager server HMS integrates and sends relationship information of video based instruction, audio based instruction to relationship core application software R and relationship core application software records relationships. At 726, hiring manager server HMS sends results back to hiring manager client HMC.

FIG. 8A illustrates an example method 800A for a hiring manager to assign interviewer.

FIG. 8B illustrates an example activities 800B performed for a hiring manager to assign interviewer during method 800A. Activities 800B include handshakes among hiring manager, staffing client portal application software components, staffing server application software components and staffing core application software components. Element numbers for features in method 800A in FIG. 8A correspond with respective element numbers in FIG. 8B.

At 802, hiring manager HM attempts to log into hiring manager portal using hiring manager client HMC. At 804, hiring manager client HMC sends request to hiring manager server HMS. At 806, hiring manager server HMS validates authorization with security core application software S. At 808a, hiring manager server HMS allows hiring manager to enter hiring manager portal. At 808b, hiring manager server HMS rejects user from entering hiring manager portal. At 810, hiring manager HM assigns interviewer and provide instructions using hiring manager client HMC. At 812, hiring manager client HMC sends keyboarded interviewer information and instructions to hiring manager server HMS, and hiring manager server records interviewer information and instructions. At 814, hiring manager server HMS sends message back to hiring manager client HMC. At 816, hiring manager HM streams/uploads video based instructions for interviewer using hiring manager client HMC. At 818, hiring manager client HMC sends video based instruction to hiring manager server HMS. At 820, hiring manager server HMS sends video based instructions to video content core application software V. At 822, video content core application software V records video based instruction and sends a message to audio content core application software A to process video based instruction and audio content core application software consumes video based instruction, generates and records audio based instruction. At 824, hiring manager server HMS integrates and sends relationship information of video based instruction, audio based instruction to relationship core application software R and relationship core application software records relationships. At 826, hiring manager server HMS sends results back to hiring manager client HMC.

FIG. 9A illustrates an example method 900A for a account manager to review job position.

FIG. 9B illustrates an example activities 900B performed for a account manager to review job position during method 900A. Activities 900B include handshakes among account manager, staffing client portal application software components, staffing server application software components and staffing core application software components. Element numbers for features in method 900A in FIG. 9A correspond with respective element numbers in FIG. 9B.

At 902, account manager SA attempts to log into account manager portal using account manager client SAC. At 904, account manager client SAC sends request to account manager server SAS. At 906, account manager server SAS validates authorization with security core application software S. At 908a, account manager server SAS allows account manager to enter account manager portal. At 908b, account manager server SAS rejects user from entering account manager portal. At 910, account manager SA attempts to retrieve job position using account manager client SAC. At 912, account manager client SAC sends request for job position to account manager server SAS. At 914, account manager server SAS sends request for relationship to relationship core application software R. At 916, Hiring Manager server HMS sends job position information that were provided by hiring manager. At 918, relationship core application software R integrates/bundles and sends relationship information, job position information back to account manager server SAS. At 920, text content core application software T sends text based job description to account manager server SAS. At 922, graphics content core application software G sends graphics based job position back to account manager server SAS. At 924, video content core application software V sends video based job position to account manager server SAS. At 926, audio content core application software A sends audio based job position to account manager server SAS. At 928, account manager server integrates/bundles relationship information, job position information, text based job position information, graphics based job position information, video based job position information, audio based job position information and sends them back to account manager client SAC.

FIG. 10A illustrates an example method 1000A for an account manager to provide comment on job position.

FIG. 10B illustrates an example activities 1000B performed for an account manager to provide comment on job position during method 1000A. Activities 1000B include handshakes among account manager, staffing client portal application software components, staffing server application software components and staffing core application software components. Element numbers for features in method 1000A in FIG. 10A correspond with respective element numbers in FIG. 10B.

At 1002, account manager SA attempts to log into account manager portal using account manager client SAC. At 1004, account manager client SAC sends request to account manager server SAS. At 1006, account manager server SAS validates authorization with security core application software S. At 1008*a*, account manager server SAS allows account manager to enter account manager portal. At 1008*b*, account manager server SAS rejects user from entering account manager portal. At 1010, account manager SA attempts to retrieve job position using account manager client SAC. At 1012, account manager client SAC sends request for job position to account manager server SAS. At 1014, account manager server SAS sends request for relationship to relationship core application software R. At 1016, hiring manager server HMS sends job position and comments that were provided by hiring manager HM. At 1018, relationship core application software R integrates/bundles and sends relationship information, job position information back to account manager server SAS. At 1020, account manager server sends job position information back to account manager client SAC. At 1022, account manager keyboards comment on job position into account manager client SAC. At 1024, account manager client SAC sends comment on job position to account manager server SAS. At 1026, account manager server SAS records comment on job position and sends results back to account manager client SAC. At 1028, account manager SA streams/uploads video based comment on job position using account manager client SAC. At 1030, account manager client SAC sends video based comment on job position to account manager server SAS. At 1032, account manager server SAS sends video based comment on job position to video content core application software V. At 1034, video content core application software V records video based comment on job position and sends a message to audio content core application software A to process video based comment on job position and audio content core application software consumes video based comment on job position, generates and records audio based comment on job position. At 1036, account manager server SAS integrates and sends relationship information of video based comment on job position, audio based comment on job position to relationship core application software R and relationship core application software records relationships. At 1038, account manager server SAS sends results back to account manager client SAC.

FIG. 11A illustrates an example method 1100A for a staffing recruiter to review job position.

FIG. 11B illustrates an example activities 1100B performed for a staffing recruiter to review job position during method 1100A. Activities 1100B include handshakes among staffing recruiter, staffing client portal application software components, staffing server application software components and staffing core application software components. Element numbers for features in method 1100A in FIG. 11A correspond with respective element numbers in FIG. 11B.

At 1102, staffing recruiter SR attempts to log into staffing recruiter portal using staffing recruiter client SRC. At 1104, staffing recruiter client SRC sends request to staffing recruiter server SRS. At 1106, staffing recruiter server SRS validates authorization with security core application software S. At 1108*a*, staffing recruiter server SRS allows staffing recruiter to enter staffing recruiter portal. At 1108*b*, staffing recruiter server SRS rejects user from entering staffing recruiter portal. At 1110, staffing recruiter SR attempts to retrieve job position using staffing recruiter client SRC. At 1112, staffing recruiter client SRC sends request for job position to staffing recruiter server SRS. At 1114, staffing recruiter server SRS sends request for relationship to relationship core application software R. At 1116, Hiring Manager server HMS sends job position information that were provided by hiring manager. At 1118, account manager server SAS sends job position information that were provided by account manager. At 1120, relationship core application software R integrates/bundles and sends relationship information, job position information and comments of account manager back to staffing recruiter server SRS. At 1122, text content core application software T sends text based job description to staffing recruiter server SRS. At 1124, graphics content core application software G sends graphics based job position back to staffing recruiter server SRS. At 1126, video content core application software V sends video based job position to staffing recruiter server SRS. At 1128, audio content core application software A sends audio based job position to staffing recruiter server SRS. At 1130, staffing recruiter server integrates/bundles relationship information, job position information, comments of account manager text based job position information, graphics based job position information, and video based job position information, audio based job position information and sends them back to staffing recruiter client SRC.

FIG. 12A illustrates an example method 1200A for a staffing recruiter to provide comment on job position.

FIG. 12B illustrates an example activities 1200B performed for a staffing recruiter to provide comment on job position during method 1200A. Activities 1200B include handshakes among staffing recruiter, staffing client portal application software components, staffing server application software components and staffing core application software components. Element numbers for features in method 1200A in FIG. 12A correspond with respective element numbers in FIG. 12B.

At 1202, staffing recruiter SR attempts to log into staffing recruiter portal using staffing recruiter client SRC. At 1204, staffing recruiter client SRC sends request to staffing recruiter server SRS. At 1206, staffing recruiter server SRS validates authorization with security core application software S. At 1208*a*, staffing recruiter server SRS allows staffing recruiter to enter staffing recruiter portal. At 1208*b*, staffing recruiter server SRS rejects user from entering staffing recruiter portal. At 1210, staffing recruiter SR attempts to retrieve job position using staffing recruiter client SRC. At 1212, staffing recruiter client SRC sends request for job position to staffing recruiter server SRS. At 1214, staffing recruiter server SRS sends request for relationship to relationship core application software R. At 1216, hiring manager server HMS sends job position and comments that were provided by hiring manager HM. At 1218, account manager server SAS sends comments that were provided by account manager SA. At 1220, relationship core application software R integrates/bundles and sends relationship information, job position, and comments of account manager information back to staffing recruiter server SRS. At 1222, staffing recruiter server sends job position information back to staffing recruiter client SRC. At 1224, staffing recruiter keyboards comment on job position into staffing recruiter client SRC. At 1226, staffing recruiter client SRC sends comment on job position to staffing recruiter server SRS. At 1228, staffing recruiter server SRS records comment on job position and sends results back to staffing recruiter client SRC. At 1230, staffing recruiter SR streams/uploads video based comment on job position using staffing recruiter client SRC. At 1232, staffing recruiter client SRC sends video based comment on job position to staffing recruiter server SRS. At 1234, staffing recruiter server SRS sends video based comment on job position to video content core application software V. At 1236, video content core application software V records video based comment on job position and sends a message to audio content core application software A to process video based comment on job position and audio content core application software consumes video based comment on job position, generates and records audio based comment on job position. At 1238, staffing recruiter server SRS integrates and sends relationship information of video based comment on job position, audio based comment on job position to relationship core application software R and relationship core application software records relationships. At 1240, staffing recruiter server SRS sends results back to staffing recruiter client SRC.

FIG. 13A illustrates an example method 1300A for a candidate to review job position.

FIG. 13B illustrates an example activities 1300B performed for a candidate to review job position during method 1300A. Activities 1300B include handshakes among candidate, staffing client portal application software components, staffing server application software components and staffing core application software components. Element numbers for features in method 1300A in FIG. 13A correspond with respective element numbers in FIG. 13B

At 1302, candidate C1 attempts to log into candidate portal using candidate client CC. At 1304, candidate client CC sends request to candidate server CS. At 1306, candidate server CS validates authorization with security core application software S. At 1308*a*, candidate server CS allows candidate to enter candidate portal. At 1308*b*, candidate server CS rejects user from entering candidate portal. At 1310, candidate C1 attempts to retrieve job position using candidate client CC. At 1312, candidate client CC sends request for job position to candidate server CS. At 1314, candidate server CS sends request for relationship to relationship core application software R. At 1316, Hiring Manager server HMS sends job position information that were provided by hiring manager. At 1318, staffing account manager server SAS sends comments that were provided by staffing account manager. At 1320, staffing recruiter server SRS sends comments that were provided by staffing recruiter. At 1322, relationship core application software R integrates/bundles and sends relationship information, job position information, comments of staffing account manager and comments of staffing recruiter back to candidate server CS. At 1324, text content core application software T sends text based job position to candidate server CS. At 1326, graphics content core application software G sends graphics based job position to candidate server CS. At 1328, video content core application software sends video based job position to candidate server CS. At 1330, audio content core application software sends audio based job position to candidate server CS. At 1332, candidate server integrates/bundles relationship information, job position information, staffing account manager comments, staffing recruiter comments, text based job position information, graphics based job position information, video based job position information, audio based job position information and sends them back to candidate client CC.

FIG. 14A illustrates an example method 1400A for a candidate to provide comment on job position.

FIG. 14B illustrates an example activities 1400B performed for a candidate to provide comment on job position during method 1400A. Activities 1400B include handshakes among candidate, staffing client portal application software components, staffing server application software components and staffing core application software components. Element numbers for features in method 1400A in FIG. 14A correspond with respective element numbers in FIG. 14B.

At 1402, candidate C1 attempts to log into candidate portal using candidate client CC. At 1404, candidate client CC sends request to candidate server CS. At 1406, candidate server CS validates authorization with security core application software S. At 1408*a*, candidate server CS allows candidate to enter candidate portal. At 1408*b*, candidate server CS rejects user from entering candidate portal. At 1410, candidate C1 attempts to retrieve job position using candidate client CC. At 1412, candidate client CC sends request for job position to candidate server CS. At 1414, candidate server CS sends request for relationship to relationship core application software R. At 1416, hiring manager server HMS sends job position and comments that were provided by hiring manager HM. At 1418, staffing account manager server SAS sends comments that were provided by staffing account manager. At 1420, staffing recruiter server SRS sends comments that were provided by staffing recruiter. At 1422, relationship core application software R integrates/bundles and sends relationship information, job position information, comments of staffing account manager and comments of staffing recruiter back to candidate server CS. At 1424, candidate server sends job position information back to candidate client CC. At 1426, candidate C1 keyboards comment on job position into candidate client CC. At 1428, candidate client CC sends comment on job position to candidate server CS. At 1430, candidate server CS records comment on job position and sends results back to candidate client CC. At 1432, candidate C1 streams/uploads video based comment on job position using candidate client CC. At 1434, candidate client CC sends video based comment on job position to candidate server CS. At 1436, candidate server CS sends video based comment on job position to video content core application software V. At 1438, video content core application software V records video based comment on job position and sends a message to audio content core application software A to process video based comment on job position and audio content core application software consumes video based comment on job position, generates and records audio based comment on job position. At 1440, candidate server CS integrates and sends relationship information of video based comment on job position, audio based comment on job position to relationship core application software R and relationship core application software records relationships. At 1442, candidate server CS sends results back to candidate client CC.

FIG. 15A illustrates an example method 1500A for a candidate to post resume for a job position.

FIG. 15B illustrates an example activities 1500B performed for a candidate to post resume for a job position during method 1500A. Activities 1500B include handshakes among candidate, staffing client portal application software components, staffing server application software components and staffing core application software components. Element numbers for features in method 1500A in FIG. 15A correspond with respective element numbers in FIG. 15B.

At 1502, candidate C1 attempts to log into candidate portal using candidate client CC. At 1504, candidate client CC sends request to candidate server CS. At 1506, candidate server CS validates authorization with security core application software S. At 1508*a*, candidate server CS allows candidate to enter candidate portal. At 1508*b*, candidate server CS rejects user from entering candidate portal. At 1510, candidate C1 attempts to retrieve job position using candidate client CC. At 1512, candidate client CC sends request for job position to candidate server CS. At 1514, candidate server CS sends request for relationship to relationship core application software R. At 1516, hiring manager server HMS sends job position and comments that were provided by hiring manager HM. At 1518, staffing account manager server SAS sends comments that were provided by staffing account manager. At 1520, staffing recruiter server SRS sends comments that were provided by staffing recruiter. At 1522, relationship core application software R integrates/bundles and sends relationship information, job position information, comments of staffing account manager and comments of staffing recruiter back to candidate server CS. At 1524, candidate server CS sends job position information back to candidate client CC. At 1526, candidate C1 posts resume for job position into candidate client CC. At 1528, candidate client CC sends resume for job position to candidate server CS. At 1530, candidate server CS passes resume for job position to text content core software T. At 1532, text content core software records resume and sends a message to graphics content core software G, and graphics content core software generates and stores graphical dashboard of resume. At 1534, candidate server CS sends results back to candidate client CC. At 1536, candidate C1 streams/uploads video based resume for job position using candidate client CC. At 1538, candidate client CC sends video based resume for job position to candidate server CS. At 1540, candidate server CS sends video based resume for job position to video content core application software V. At 1542, video content core application software V records video based resume for job position and sends a message to audio content core application software A to process video based resume fo job position and audio content core application software consumes video based resume for job position, generates and records audio based resume for job position. At 1544, candidate server CS sends relationship information of video based resume for job position, audio based resume for job position to relationship core application software R and relationship core application software records relationships. At 1546, candidate server CS integrates and sends results back to candidate client CC.

FIG. 16A illustrates an example method 1600A for a staffing recruiter to review candidate's comment.

FIG. 16B illustrates an example activities 1600B performed for a staffing recruiter to review candidate's comment during method 1600A. Activities 1600B include handshakes among staffing recruiter, staffing client portal application software components, staffing server application software components and staffing core application software components. Element numbers for features in method 1600A in FIG. 16A correspond with respective element numbers in FIG. 16B.

At 1602, staffing recruiter SR attempts to log into staffing recruiter portal using staffing recruiter client SRC. At 1604, staffing recruiter client SRC sends request to staffing recruiter server SRS. At 1606, staffing recruiter server SRS validates authorization with security core application software S. At 1608*a*, staffing recruiter server SRS allows staffing recruiter to enter staffing recruiter portal. At 1608*b*, staffing recruiter server SRS rejects user from entering staffing recruiter portal. At 1610, staffing recruiter SR attempts to retrieve candidate's comment using staffing recruiter client SRC. At 1612, staffing recruiter client SRC sends request for candidate's comment to staffing recruiter server SRS. At 1614, staffing recruiter server SRS sends request for relationship to relationship core application software R. At 1616, hiring manager server HMS sends comments that were provided by hiring manager. At 1618, account manager server SAS sends comments that were provided by account manager. At 1620, candidate server CS sends comments that were provided by candidate. At 1622, relationship core application software R integrates/bundles and sends relationship information, job position information, comments of account manager and comments of candidate back to staffing recruiter server SRS. At 1624, video content core application software sends video based candidate comments to staffing recruiter server SRS. At 1626, audio content core application software sends audio based candidate comments to staffing recruiter server SRS. At 1628, staffing recruiter server integrates/bundles relationship information, job position information, staffing account manager comments, candidate comments, video based candidate comments, audio based candidate comments and sends them back to staffing recruiter client SRC.

FIG. 17A illustrates an example method 1700A for a staffing recruiter to review candidate's resume.

FIG. 17B illustrates an example activities 1700B performed for a staffing recruiter to review candidate's resume during method 1700A. Activities 1700B include handshakes among staffing recruiter, staffing client portal application software components, staffing server application software components and staffing core application software components. Element numbers for features in method 1700A in FIG. 17A correspond with respective element numbers in FIG. 17B.

Element 1702, staffing recruiter SR attempts to log into staffing recruiter portal using staffing recruiter client SRC. Element 1704, staffing recruiter client SRC sends request to staffing recruiter server SRS. Element 1706, staffing recruiter server SRS validates authorization with security core application software S. Element 1708*a*, staffing recruiter server SRS allows staffing recruiter to enter staffing recruiter portal. Element 1708*b*, staffing recruiter server SRS rejects user from entering staffing recruiter portal. Element 1710, staffing recruiter SR attempts to retrieve candidate's resume using staffing recruiter client SRC. Element 1712, staffing recruiter client SRC sends request for candidate's resume to staffing recruiter server SRS. Element 1714, staffing recruiter server SRS sends request for relationship to relationship core application software R. Element 1716, hiring manager server HMS sends comments that were provided by hiring manager. Element 1718, staffing account manager server SAS sends comments that were provided by staffing account manager. Element 1720, candidate server CS sends comments that were provided by candidate. Element 1722, relationship core application software R integrates/bundles and sends relationship information, job position information, comments of account manager and comments of candidate back to staffing recruiter server SRS. Element 1724, text content core application software T sends text based resume to staffing recruiter server SRS. Element 1726, graphics content core application software G sends graphics based resume to staffing recruiter server SRS. Element 1728, video content core application software sends video based resume to staffing recruiter server SRS. Element 1730, audio content core application software sends audio based resume to staffing recruiter server SRS. Element 1732, staffing recruiter server integrates/bundles relationship information, job position information, staffing account manager comments, candidate comments, text based resume information, graphics based resume information, video based resume information, audio based resume information and sends them back to staffing recruiter client SRC.

FIG. 18A illustrates an example method 1800A for a staffing recruiter to accept/reject candidate's resume.

FIG. 18B illustrates an example activities 1800B performed for a staffing recruiter to accept/reject candidate's resume during method 1800A. Activities 1800B include handshakes among staffing recruiter, staffing client portal application software components, staffing server application software components and staffing core application software components. Element numbers for features in method 1800A in FIG. 18A correspond with respective element numbers in FIG. 18B.

At 1802, staffing recruiter SR attempts to log into staffing recruiter portal using staffing recruiter client SRC. At 1804, staffing recruiter client SRC sends request to staffing recruiter server SRS. At 1806, staffing recruiter server SRS validates authorization with security core application software S. At 1808a, staffing recruiter server SRS allows staffing recruiter to enter staffing recruiter portal. At 1808b, staffing recruiter server SRS rejects user from entering staffing recruiter portal. At 1810, staffing recruiter SR attempts to retrieve job position using staffing recruiter client SRC. At 1812, staffing recruiter client SRC sends request for job position to staffing recruiter server SRS. At 1814, staffing recruiter server SRS sends request for relationship to relationship core application software R. At 1816, hiring manager server HMS sends job position that were provided by hiring manager. At 1818, staffing account manager server SAS sends comments that were provided by staffing account manager. At 1820, candidate server CS sends candidate information that were provided by candidate. At 1822, relationship core application software R integrates/bundles and sends relationship information, job position information, comments of account manager and information of candidate back to staffing recruiter server SRS. At 1824, staffing recruiter server sends candidate information for job position back. At 1826, staffing recruiter keyboards accept/reject information for the candidate into staffing recruiter client SRC. At 1828, staffing recruiter client SRC sends accept/reject information to staffing recruiter server SRS. At 1830, staffing recruiter server SRS records accept/reject information and results back to staffing recruiter client SRC. At 1832, staffing recruiter SR streams/ uploads video based accept/reject information using staffing recruiter client SRC. At 1834, staffing recruiter client SRC sends video based accept/reject information to staffing recruiter server SRS. At 1836, staffing recruiter server SRS sends video based accept/reject information to video content core application software V. At 1838, video content core application software V records video based accept/reject information and sends a message to audio content core application software A to process video based accept/reject information and audio content core application software consumes video based accept/reject information, generates and records audio based accept/reject information. At 1840, staffing recruiter server SRS integrates and sends relationship information of video based accept/reject information, audio based accept/reject information to relationship core application software R and relationship core application software records relationships. At 1842, staffing recruiter server SRS sends results back to staffing recruiter client SRC.

FIG. 19A illustrates an example method 1900A for an account manager to review candidate's comment.

FIG. 19B illustrates an example activities 1900B performed for an account manager to review candidate's comment during method 1900A. Activities 1900B include handshakes among account manager, staffing client portal application software components, staffing server application software components and staffing core application software components. Element numbers for features in method 1900A in FIG. 19A correspond with respective element numbers in FIG. 19B.

At 1902, account manager SA attempts to log into account manager portal using account manager client SAC. At 1904, account manager client SAC sends request to account manager server SAS. At 1906, account manager server SAS validates authorization with security core application software S. At 1908a, account manager server SAS allows account manager to enter account manager portal. At 1908b, account manager server SAS rejects user from entering account manager portal. At 1910, account manager SA attempts to retrieve candidate's comment using account manager client SAC. At 1912, account manager client SAC sends request for candidate's comment to account manager server SAS. At 1914, account manager server SAS sends request for relationship to relationship core application software R. At 1916, hiring manager server HMS sends comments that were provided by hiring manager. At 1918, candidate server CS sends comments that were provided by candidate. At 1920, relationship core application software R integrates/bundles and sends relationship information, job position information, and comments of candidate back to account manager server SAS. At 1922, video content core application software sends video based candidate comments to account manager server SAS. At 1924, audio content core application software sends audio based candidate comments to account manager server SAS. At 1926, account manager server integrates/bundles relationship information, job position information, candidate comments, video based candidate comments, audio based candidate comments and sends them back to account manager client SAC.

FIG. 20A illustrates an example method 2000A for an account manager to review candidate's resume.

FIG. 20B illustrates an example activities 2000B performed for an account manager to review candidate's resume during method 2000A. Activities 2000B include handshakes among account manager, staffing client portal application software components, staffing server application software components and staffing core application software components. Element numbers for features in method 2000A in FIG. 20A correspond with respective element numbers in FIG. 20B.

At 2002, account manager SA attempts to log into account manager portal using account manager client SAC. At 2004, account manager client SAC sends request to account manager server SAS. At 2006, account manager server SAS validates authorization with security core application software S. At 2008a, account manager server SAS allows account manager to enter account manager portal. At 2008b, account manager server SAS rejects user from entering account manager portal. At 2010, account manager SA attempts to retrieve candidate's resume using account manager client SAC. At 2012, account manager client SAC sends request for candidate's resume to account manager server SAS. At 2014, account manager server SAS sends request for relationship to relationship core application software R. At 2016, hiring manager server HMS sends comments that were provided by hiring manager. At 2018, candidate server CS sends comments that were provided by candidate. At 2020, relationship core application software R integrates/bundles and sends relationship information, job position information, and comments of candidate back to account manager server SAS. At 2022, text content core application software T sends text based resume to account manager server SAS. At 2024, graphics content core application software G sends graphics based resume to account manager server SAS. At 2026, video content core application software sends video based resume to account manager server SAS. At 2028, audio content core application software sends audio based resume to account manager server SAS. At 2030, account manager server integrates/bundles relationship information, job position information, candidate comments, text based resume information, graphics based resume information, video based resume information, audio based resume information and sends them back to account manager client SAC.

FIG. 21A illustrates an example method 2100A for a third party to review candidate's resume.

FIG. 21B illustrates an example activities 2100B performed for a third party to review candidate's resume during method 2100A. Activities 2100B include handshakes among third party, staffing client portal application software components, staffing server application software components and staffing core application software components. Element numbers for features in method 2100A in FIG. 21A correspond with respective element numbers in FIG. 21B.

At 2102, third party P2 attempts to log into third party portal using third party client PC2. At 2104, third party client PC2 sends request to third party server PS2. At 2106, third party server PS2 validates authorization with security core application software S. At 2108a, third party server PS2 allows third party to enter third party portal. At 2108b, third party server PS2 rejects user from entering third party portal. At 2110, third party P2 attempts to retrieve candidate's resume using third party client PC2. At 2112, third party client PC2 sends request for candidate's resume to third party server PS2. At 2114, third party server PS2 sends request for relationship to relationship core application software R. At 2116, hiring manager server HMS sends comments that were provided by hiring manager. At 2118, staffing account manager server SAS sends comments that were provided by staffing account manager. At 2120, candidate server CS sends comments that were provided by candidate. At 2122, relationship core application software R integrates/bundles and sends relationship information, job position information, comments of account manager and comments of candidate back to third party server PS2. At 2124, text content core application software T sends text based resume to third party server PS2. At 2126, graphics content core application software G sends graphics based resume to third party server PS2. At 2128, video content core application software sends video based resume to third party server PS2. At 2130, audio content core application software sends audio based resume to third party server PS2. At 2132, third party server integrates/bundles relationship information, job position information, staffing account manager comments, candidate comments, text based resume information, graphics based resume information, video based resume information, audio based resume information and sends them back to third party client PC2.

FIG. 22A illustrates an example method 2200A for a third party to provide feedback on candidate.

FIG. 22B illustrates an example activities 2200B performed for a third party to provide feedback on candidate during method 2200A. Activities 2200B include handshakes among third party, staffing client portal application software components, staffing server application software components and staffing core application software components. Element numbers for features in method 2200A in FIG. 22A correspond with respective element numbers in FIG. 22B.

At 2202, third party P2 attempts to log into third party portal using third party client PC2. At 2204, third party client PC2 sends request to third party server PS2. At 2206, third party server PS2 validates authorization with security core application software S. At 2208a, third party server PS2 allows third party to enter third party portal. At 2208b, third party server PS2 rejects user from entering third party portal. At 2210, third party P2 attempts to retrieve candidate's resume using third party client PC2. At 2212, third party client PC2 sends request for candidate's resume to third party server PS2. At 2214, third party server PS2 sends request for relationship to relationship core application software R. At 2216, hiring manager server HMS sends comments that were provided by hiring manager. At 2218, staffing account manager server SAS sends comments that were provided by staffing account manager. At 2220, candidate server CS sends comments that were provided by candidate. At 2226, relationship core application software R integrates/bundles and sends relationship information, job position information, comments of account manager and comments of candidate back to third party server PS2. At 2224, third party server sends candidate information back. At 2228, third party keyboards feedback on the candidate into third party client PC2. At 2228, third party client PC2 sends candidate feedback information to third party server PS2. At 2230, third party server PS2 records candidate feedback information and results back to third party client PC2. At 2232, third party P2 streams/uploads video based candidate feedback information using third party client PC2. At 2234, third party client PC2 sends video based candidate feedback information to third party server PS2. At 2236, third party server PS2 sends video based candidate feedback information to video content core application software V. At 2238, video content core application software V records video based candidate feedback information and sends a message to audio content core application software A to process video based candidate feedback information and audio content core application software consumes video based candidate feedback information, generates and records audio based candidate feedback information. At 2240, third party server PS2 sends relationship information of video based candidate feedback, audio based candidate feedback to relationship core application software R and relationship core application software records relationships. At 2242, third party server PS2 integrates and sends results back to third party client PC2.

FIG. 23A illustrates an example method 2300A for an account manager to accept/reject candidate's resume.

FIG. 23B illustrates an example activities 2300B performed for an account manager to accept/reject candidate's resume during method 2300A. Activities 2300B include handshakes among account manager, staffing client portal application software components, staffing server application software components and staffing core application software components. Element numbers for features in method 2300A in FIG. 23A correspond with respective element numbers in FIG. 23B.

At 2302, account manager SA attempts to log into account manager portal using account manager client SAC. At 2304, account manager client SAC sends request to account manager server SAS. At 2306, account manager server SAS validates authorization with security core application software S. At 2308*a*, account manager server SAS allows account manager to enter account manager portal. At 2308*b*, account manager server SAS rejects user from entering account manager portal. At 2310, account manager SA attempts to retrieve job position using account manager client SAC. At 2312, account manager client SAC sends request for job position to account manager server SAS. At 2314, account manager server SAS sends request for relationship to relationship core application software R. At 2316, hiring manager server HMS sends job position that were provided by hiring manager. At 2318, candidate server CS sends candidate information that were provided by candidate. At 2320, relationship core application software R integrates/bundles and sends relationship information, job position information, and information of candidate back to account manager server SAS. At 2322, account manager server sends candidate information for job position back. At 2324, account manager keyboards accept/reject information for the candidate into account manager client SAC. At 2326, account manager client SAC sends accept/reject information to account manager server SAS. At 2328, account manager server SAS records accept/reject information and results back to account manager client SAC. At 2330, account manager SA streams/uploads video based accept/reject information using account manager client SAC. At 2332, account manager client SAC sends video based accept/reject information to account manager server SAS. At 2334, account manager server SAS sends video based accept/reject information to video content core application software V. At 2336, video content core application software V records video based accept/reject information and sends a message to audio content core application software A to process video based accept/reject information and audio content core application software consumes video based accept/reject information, generates and records audio based accept/reject information. At 2338, account manager server SAS integrates and sends relationship information of video based accept/reject information, audio based accept/reject information to relationship core application software R and relationship core application software records relationships. At 2340, account manager server SAS sends results back to account manager client SAC.

FIG. 24A illustrates an example method 2400A for a hiring manager to review candidate's resume.

FIG. 24B illustrates an example activities 2400B performed for a hiring manager to review candidate's resume during method 2400A. Activities 2400B include handshakes among hiring manager, staffing client portal application software components, staffing server application software components and staffing core application software components. Element numbers for features in method 2400A in FIG. 24A correspond with respective element numbers in FIG. 24B.

At 2402, hiring manager HM attempts to log into hiring manager portal using hiring manager client HMC. At 2404, hiring manager client HMC sends request to hiring manager server HMS. At 2406, hiring manager server HMS validates authorization with security core application software S. At 2408*a*, hiring manager server HMS allows hiring manager to enter hiring manager portal. At 2408*b*, hiring manager server HMS rejects user from entering hiring manager portal. At 2410, hiring manager HM attempts to retrieve candidate's resume using hiring manager client HMC. At 2412, hiring manager client HMC sends request for candidate's resume to hiring manager server HMS. At 2414, hiring manager server HMS sends request for relationship to relationship core application software R. At 2416, staffing account manager server SAS sends comments that were provided by staffing account manager. At 2418, candidate server CS sends comments that were provided by candidate. At 2420, relationship core application software R integrates/bundles and sends relationship information, comments of account manager and comments of candidate back to hiring manager server HMS. At 2422, text content core application software T sends text based resume to hiring manager server HMS. At 2424, graphics content core application software G sends graphics based resume to hiring manager server HMS. At 2426, video content core application software sends video based resume to hiring manager server HMS. At 2428, audio content core application software sends audio based resume to hiring manager server HMS. At 2430, hiring manager server integrates/bundles relationship information, staffing account manager comments, candidate comments, text based resume information, graphics based resume information, video based resume information, and audio based resume information and sends them back to hiring manager client HMC.

FIG. 25A illustrates an example method 2500A for a hiring manager to accept/reject candidate's resume.

FIG. 25B illustrates an example activities 2500B performed for a hiring manager to accept/reject candidate's resume during method 2500A. Activities 2500B include handshakes among hiring manager, staffing client portal application software components, staffing server application software components and staffing core application software components. Element numbers for features in method 2500A in FIG. 25A correspond with respective element numbers in FIG. 25B.

At 2502, hiring manager HM attempts to log into hiring manager portal using hiring manager client HMC. At 2504, hiring manager client HMC sends request to hiring manager server HMS. At 2506, hiring manager server HMS validates authorization with security core application software S. At 2508*a*, hiring manager server HMS and security core application software allow hiring manager to enter hiring manager portal. At 2508*b*, hiring manager server HMS and security core application software reject user from entering hiring manager portal. At 2510, hiring manager HM attempts to retrieve candidate's information using hiring manager client HMC. At 2512, hiring manager client HMC sends request for candidate's information to hiring manager server HMS. At 2514, hiring manager server HMS sends request for relationship to relationship core application software R. At 2516, staffing account manager server SAS sends staffing account manager information. At 2518, candidate server CS sends candidate information. At 2520, relationship core application software R integrates/bundles and sends relationship information, account manager and candidate information back to hiring manager server HMS. At 2522, hiring manager server integrates/bundles relationship information, staffing account manager information, candidate information and sends them back to hiring manager client HMC. At 2524, hiring manager client HMC sends keyboarded accept/reject candidate's resume information to hiring manager server HMS, and hiring manager server records accept/reject candidate's resume information. At 2526, hiring manager client HMC sends keyboarded information to hiring manager server HMS. At 2528, hiring manager server HMS records keyboarded accept/reject candidate's resume information and sends back to hiring manager client HMC. At 2530, hiring manager HM streams/uploads video based accept/reject candidate's resume information using hiring manager client HMC. At 2532, hiring manager client HMC sends video based accept/reject candidate's resume information to hiring manager server HMS. At 2534, hiring manager server HMS sends video based accept/reject candidate's resume information to video content core application software V. At 2536, video content core application software V records video based accept/reject candidate's resume information and sends a message to audio content core application software A to process video based accept/reject candidate's resume information and audio content core application software consumes video based accept/reject candidate's resume information, generates and records audio based accept/reject candidate's resume information. At 2538, hiring manager server HMS integrates and sends relationship information of video based accept/reject candidate's resume instruction, audio based accept/reject candidate's resume to relationship core application software R and relationship core application software records relationships. At 2540, hiring manager server HMS sends results back to hiring manager client HMC.

FIG. 26A illustrates an example method 2600A for a hiring screener to review candidate's resume.

FIG. 26B illustrates an example activities 2600B performed for a hiring screener to review candidate's resume during method 2600A. Activities 2600B include handshakes among hiring screener, staffing client portal application software components, staffing server application software components and staffing core application software components. Element numbers for features in method 2600A in FIG. 26A correspond with respective element numbers in FIG. 26B.

At 2602, hiring screener HS attempts to log into hiring screener portal using hiring screener client HSC. At 2604, hiring screener client HSC sends request to hiring screener server HSS. At 2606, hiring screener server HSS validates authorization with security core application software S. At 2608a, hiring screener server HSS allows hiring screener to enter hiring screener portal. At 2608b, hiring screener server HSS rejects user from entering hiring screener portal. At 2610, hiring screener HS attempts to retrieve candidate's resume using hiring screener client HSC. At 2612, hiring screener client HSC sends request for candidate's resume to hiring screener server HSS. At 2614, hiring screener server HSS sends request for relationship to relationship core application software R. At 2616, hiring manager server HMS sends comments that were provided by hiring manager. At 2618, staffing account manager server SAS sends comments that were provided by staffing account manager. At 2620, candidate server CS sends comments that were provided by candidate. At 2622, relationship core application software R integrates/bundles and sends relationship information, job position information, comments of account manager and comments of candidate back to hiring screener server HSS. At 2624, text content core application software T sends text based resume to hiring screener server HSS. At 2626, graphics content core application software G sends graphics based resume to hiring screener server HMS. At 2628, video content core application software sends video based resume to hiring screener server HSS. At 2630, audio content core application software sends audio based resume to hiring screener server HSS. At 2632, hiring screener server integrates/bundles relationship information, job position information, staffing account manager comments, candidate comments, text based resume information, graphics based resume information, video based resume information, and audio based resume information and sends them back to hiring screener client HSC.

FIG. 27A illustrates an example method 2700A for a hiring screener to provide feedback on candidate.

FIG. 27B illustrates an example activities 2700B performed for a hiring screener to provide feedback on candidate during method 2700A. Activities 2700B include handshakes among hiring screener, staffing client portal application software components, staffing server application software components and staffing core application software components. Element numbers for features in method 2700A in FIG. 27A correspond with respective element numbers in FIG. 27B.

At 2702, hiring screener HS attempts to log into hiring screener portal using hiring screener client HSC. At 2704, hiring screener client HSC sends request to hiring screener server HSS. At 2706, hiring screener server HSS validates authorization with security core application software S. At 2708a, hiring screener server HSS allows hiring screener to enter hiring screener portal. At 2708b, hiring screener server HSS rejects user from entering hiring screener portal. At 2710, hiring screener HS attempts to retrieve candidate's resume using hiring screener client HSC. At 2712, hiring screener client HSC sends request for candidate's resume to hiring screener server HSS. At 2714, hiring screener server HSS sends request for relationship to relationship core application software R. At 2716, hiring manager server HMS sends comments that were provided by hiring manager. At 2718, staffing account manager server SAS sends comments that were provided by staffing account manager. At 2720, candidate server CS sends comments that were provided by candidate. At 2722, relationship core application software R integrates/bundles and sends relationship information, job position information, comments of account manager and comments of candidate back to hiring screener server HSS. At 2724, hiring screener server sends candidate information back. At 2726, hiring screener keyboards feedback on the candidate into hiring screener client HSC. At 2728, hiring screener client HSC sends candidate feedback information to hiring screener server HSS. At 2730, hiring screener server HSS records candidate feedback information and results back to hiring screener client HSC. At 2732, hiring screener HS streams/uploads video based candidate feedback information using hiring screener client HSC. At 2734, hiring screener client HSC sends video based candidate feedback information to hiring screener server HSS. At 2736, hiring screener server HSS sends video based candidate feedback information to video content core application software V. At 2738, video content core application software V records video based candidate feedback information and sends a message to audio content core application software A to process video based candidate feedback information and audio content core application software consumes video based candidate feedback information, generates and records audio based candidate feedback information. At 2740, hiring screener server HSS integrates and sends relationship information of video based candidate feedback, audio based candidate feedback to relationship core application software R and relationship core application software records relationships. At 2742, hiring screener server HSS sends results back to hiring screener client HSC.

FIG. 28A illustrates an example method 2800A for a hiring interviewer to review candidate's resume.

FIG. 28B illustrates an example activities 2800B performed for a hiring interviewer to review candidate's resume during method 2800A. Activities 2800B include handshakes among hiring interviewer, staffing client portal application software components, staffing server application software components and staffing core application software components. Element numbers for features in method 2800A in FIG. 28A correspond with respective element numbers in FIG. 28B.

At 2802, hiring interviewer HI attempts to log into hiring interviewer portal using hiring interviewer client HIC. At 2804, hiring interviewer client HIC sends request to hiring interviewer server HIS. At 2806, hiring interviewer server HIS validates authorization with security core application software S. At 2808*a*, hiring interviewer server HIS allows hiring interviewer to enter hiring interviewer portal. At 2808*b*, hiring interviewer server HIS rejects user from entering hiring interviewer portal. At 2810, hiring interviewer HI attempts to retrieve candidate's resume using hiring interviewer client HIC. At 2812, hiring interviewer client HIC sends request for candidate's resume to hiring interviewer server HIS. At 2814, hiring interviewer server HIS sends request for relationship to relationship core application software R. At 2816, hiring manager server HMS sends comments that were provided by hiring manager. At 2818, staffing account manager server SAS sends comments that were provided by staffing account manager. At 2820, candidate server CS sends comments that were provided by candidate. At 2822, relationship core application software R integrates/bundles and sends relationship information, job position information, comments of account manager and comments of candidate back to hiring interviewer server HIS. At 2824, text content core application software T sends text based resume to hiring interviewer server HIS. At 2826, graphics content core application software G sends graphics based resume to hiring interviewer server HMS. At 2828, video content core application software sends video based resume to hiring interviewer server HIS. At 2830, audio content core application software sends audio based resume to hiring interviewer server HIS. At 2832, hiring interviewer server integrates/bundles relationship information, job position information, staffing account manager comments, candidate comments, text based resume information, graphics based resume information, video based resume information, and audio based resume information and sends them back to hiring interviewer client HIC.

FIG. 29A illustrates an example method 2900A for a hiring interviewer to provide feedback on candidate.

FIG. 29B illustrates an example activities 2900B performed for a hiring interviewer to provide feedback on candidate during method 2900A. Activities 2900B include handshakes among hiring interviewer, staffing client portal application software components, staffing server application software components and staffing core application software components. Element numbers for features in method 2900A in FIG. 29A correspond with respective element numbers in FIG. 29B.

At 2902 illustrates that hiring interviewer HI attempts to log into hiring interviewer portal using hiring interviewer client HIC. At 2904, hiring interviewer client HIC sends request to hiring interviewer server HIS. At 2906, hiring interviewer server HIS validates authorization with security core application software S. At 2908*a*, hiring interviewer server HIS allows hiring interviewer to enter hiring interviewer portal. At 2908*b*, hiring interviewer server HIS rejects user from entering hiring interviewer portal.

At 2910, hiring interviewer HI attempts to retrieve candidate's resume using hiring interviewer client HIC. At 2912, hiring interviewer client HIC sends request for candidate's resume to hiring interviewer server HIS. At 2914, hiring interviewer server HIS sends request for relationship to relationship core application software R. At 2916, hiring manager server HMS sends comments that were provided by hiring manager. At 2918, staffing account manager server SAS sends comments that were provided by staffing account manager. At 2920, candidate server CS sends comments that were provided by candidate. At 2922, relationship core application software R integrates/bundles and sends relationship information, job position information, comments of account manager and comments of candidate back to hiring interviewer server HIS. At 2924, hiring interviewer server sends candidate information back.

At 2926, hiring interviewer keyboards feedback on the candidate into hiring interviewer client HIC. At 2928, hiring interviewer client HIC sends candidate feedback information to hiring interviewer server HIS. At 2930, hiring interviewer server HIS records candidate feedback information and results back to hiring interviewer client HIC.

At 2932, hiring interviewer HI streams/uploads video based candidate feedback information using hiring interviewer client HIC. At 2934, hiring interviewer client HIC sends video based candidate feedback information to hiring interviewer server HIS. At 2936, hiring interviewer server HIS sends video based candidate feedback information to video content core application software V. At 2938, video content core application software V records video based candidate feedback information and sends a message to audio content core application software A to process video based candidate feedback information and audio content core application software consumes video based candidate feedback information, generates and records audio based candidate feedback information. At 2940, hiring interviewer server HIS sends relationship information of video based candidate feedback, audio based candidate feedback to relationship core application software R and relationship core application software records relationships. At 2942, hiring interviewer server HIS integrates and sends results back to hiring interviewer client HIC.

FIG. 30A illustrates an example method 3000A for a staffing manager to publish contract.

FIG. 30B illustrates an example activities 3000B performed for a staffing manager to publish contract during method 3000A. Activities 3000B include handshakes among staffing manager, staffing client portal application software components, staffing server application software components and staffing core application software components. Element numbers for features in method 3000A in FIG. 30A correspond with respective element numbers in FIG. 30B.

At 3002, staffing manager SM attempts to log into staffing manager portal using staffing manager client SMC. At 3004, staffing manager client SMC sends request to staffing manager server SMS. At 3006, staffing manager server SMS validates authorization with security core application software S. At 3008*a*, staffing manager server SMS and security core application software allow staffing manager to enter staffing manager portal. At 3008*b*, staffing manager server SMS and security core application software reject user from entering staffing manager portal.

At 3010, staffing manager SM attempts to retrieve job position information using staffing manager client SMC. At 3012, staffing manager client SMC sends request for job position information to staffing manager server SMS. At 3014, staffing manager server SMS sends request for relationship to relationship core application software R. At 3016, hiring manager server HMS sends job position information. At 3018, relationship core application software R integrates/bundles and sends relationship information and job position information back to staffing manager server SMS. At 3020, staffing manager server integrates/bundles relationship information, and job position information and sends them back to staffing manager client SMC.

At 3022, staffing manager SM uploads textual contract staffing manager client SMC. At 3024, staffing manager client SMC sends textual contract information to staffing manager server SMS. At 3026, staffing manager server SMS records textual contract information and sends back to staffing manager client SMC.

At 3028, staffing manager SM streams/uploads video based contract staffing manager client SMC. At 3030, staffing manager client SMC sends video based contract to staffing manager server SMS. At 3032, staffing manager server SMS sends video based contract to video content core application software V. At 3034, video content core application software V records video based contract and sends a message to audio content core application software A to process video based contract and audio content core application software consumes video based contract, generates and records audio based contract. At 3036, staffing manager server SMS sends relationship information of video based contract, audio based contract to relationship core application software R and relationship core application software records relationships. At 3038, staffing manager server SMS sends results back to staffing manager client SMC.

FIG. 31A illustrates an example method 3100A for a hiring manager to review contract.

FIG. 31B illustrates an example activities 3100B performed for a hiring manager to review contract during method 3100A. Activities 3100B include handshakes among hiring manager, staffing client portal application software components, staffing server application software components and staffing core application software components. Element numbers for features in method 3100A in FIG. 31A correspond with respective element numbers in FIG. 31B.

At 3102, hiring manager HM attempts to log into hiring manager portal using hiring manager client HMC. At 3104, hiring manager client HMC sends request to hiring manager server HMS. At 3106, hiring manager server HMS validates authorization with security core application software S. At 3108*a*, hiring manager server HMS allows hiring manager to enter hiring manager portal. At 3108*b*, hiring manager server HMS rejects user from entering hiring manager portal. At 3110, hiring manager HM attempts to retrieve contract using hiring manager client HMC. At 3112, hiring manager client HMC sends request for contract to hiring manager server HMS. At 3114, hiring manager server HMS sends request for relationship to relationship core application software R. At 3116, staffing manager server SMS sends contract comments that were provided by staffing manager.

At 3118, relationship core application software R integrates/bundles and sends relationship information and contract information back to hiring manager server HMS. At 3120, text content core application software T sends text based contract to hiring manager server HMS. At 3122, graphics content core application software G sends graphics based contract to hiring manager server HMS. At 3124, video content core application software sends video based contract to hiring manager server HMS. At 3126, audio content core application software sends audio based contract to hiring manager server HMS. At 3128, hiring manager server integrates/bundles relationship information, text based contract information, graphics based contract information, and video based contract information, audio based contract information and sends them back to hiring manager client HMC.

FIG. 32A illustrates an example method 3200A for a candidate to review contract.

FIG. 32B illustrates an example activities 3200B performed for a candidate to review contract during method 3200A. Activities 3200B include handshakes among candidate, staffing client portal application software components, staffing server application software components and staffing core application software components. Element numbers for features in method 3200A in FIG. 32A correspond with respective element numbers in FIG. 32B.

At 3202, candidate C1 attempts to log into candidate portal using candidate client CC. At 3204, candidate client CC sends request to candidate server CS. At 3206, candidate server CS validates authorization with security core application software S. At 3208*a*, candidate server CS allows candidate to enter candidate portal. At 3208*b*, candidate server CS rejects user from entering candidate portal. At 3210, candidate C1 attempts to retrieve contract using candidate client CC. At 3212, candidate client CC sends request for contract to candidate server CS. At 3214, candidate server CS sends request for relationship to relationship core application software R. At 3216, Hiring Manager server HMS sends job position information that were provided by hiring manager. At 3218, staffing manager server SMS sends contract information that were provided by staffing manager. At 3220, relationship core application software R integrates/bundles and sends relationship information, job position information and contract information back to candidate server CS. At 3222, text content core application software T sends text based contract to candidate server CS. At 3224, graphics content core application software G sends graphics based contract to candidate server CS. At 3226, video content core application software sends video based contract to candidate server CS. At 3228, audio content core application software sends audio based contract to candidate server CS. At 3230, candidate server integrates/bundles relationship information, job position information, contract information, text based contract information, graphics based contract information, video based contract information, audio based contract information and sends them back to candidate client CC.

FIG. 33A illustrates an example method 3300A for a hiring manager to offer job position.

FIG. 33B illustrates an example activities 3300B performed for a hiring manager to offer job position during method 3300A. Activities 3300B include handshakes among hiring manager, staffing client portal application software components, staffing server application software components and staffing core application software components. Element numbers for features in method 3300A in FIG. 33A correspond with respective element numbers in FIG. 33B.

At 3302, hiring manager HM attempts to log into hiring manager portal using hiring manager client HMC. At 3304, hiring manager client HMC sends request to hiring manager server HMS. At 3306, hiring manager server HMS validates authorization with security core application software S. At 3308a, hiring manager server HMS and security core application software allow hiring manager to enter hiring manager portal. At 3308b, hiring manager server HMS and security core application software reject user from entering hiring manager portal.

At 3310, hiring manager HM attempts to retrieve candidate's information using hiring manager client HMC. At 3312, hiring manager client HMC sends request for candidate's information to hiring manager server HMS. At 3314, hiring manager server HMS sends request for relationship to relationship core application software R. At 3316, staffing account manager server SAS sends staffing account manager information. At 3318, candidate server CS sends candidate information. At 3320, relationship core application software R integrates/bundles and sends relationship information, account manager and candidate information back to hiring manager server HMS. At 3322, hiring manager server integrates/bundles relationship information, staffing account manager information, candidate information and sends them back to hiring manager client HMC.

At 3324, Hiring Manager HM keyboards job offer using hiring manager client HMC. At 3326, hiring manager client HMC sends keyboarded information to hiring manager server HMS. At 3328, hiring manager server HMS records keyboarded job offer and sends back to hiring manager client HMC.

At 3330, hiring manager HM streams/uploads video based job offer using hiring manager client HMC. At 3332, hiring manager client HMC sends video based job offer to hiring manager server HMS. At 3334, hiring manager server HMS sends video based job offer to video content core application software V. At 3336, video content core application software V records video based job offer and sends a message to audio content core application software A to process video based job offer and audio content core application software consumes video based job offer, generates and records audio based job offer. At 3338, hiring manager server HMS sends relationship information of video based candidate feedback, audio based candidate feedback to relationship core application software R and relationship core application software records relationships. At 3340, hiring manager server HMS integrates and sends results back to hiring manager client HMC.

FIG. 34A illustrates an example method 3400A for a staffing manager to sign contract.

FIG. 34B illustrates an example activities 3400B performed for a staffing manager to sign contract during method 3400A. Activities 3400B include handshakes among staffing manager, staffing client portal application software components, staffing server application software components and staffing core application software components. Element numbers for features in method 3400A in FIG. 34A correspond with respective element numbers in FIG. 34B.

At 3402, staffing manager SM attempts to log into staffing manager portal using staffing manager client SMC. At 3404, staffing manager client SMC sends request to staffing manager server SMS. At 3406, staffing manager server SMS validates authorization with security core application software S. At 3408a, staffing manager server SMS and security core application software allow staffing manager to enter staffing manager portal. At 3408b, staffing manager server SMS and security core application software reject user from entering staffing manager portal.

At 3410, staffing manager SM attempts to retrieve job position using staffing manager client SMC. At 3412, staffing manager client SMC sends request for job position to staffing manager server SMS. At 3414, staffing manager server SMS sends request for relationship to relationship core application software R. At 3416, hiring manager server HMS sends job position information. At 3418, relationship core application software R integrates/bundles and sends relationship information, job position information back to staffing manager server SMS. At 3420, staffing manager server integrates/bundles relationship information, job position information and sends them back to staffing manager client SMC.

At 3422, staffing manager SM keyboards sign contract staffing manager client SMC. At 3424, staffing manager client SMC sends keyboarded information to staffing manager server SMS. At 3426, staffing manager server SMS records keyboarded job offer and sends back to staffing manager client SMC.

At 3428, staffing manager SM streams/uploads video based contract signature using staffing manager client SMC. At 3430, staffing manager client SMC sends video based contract signature to staffing manager server SMS. At 3432, staffing manager server SMS sends video based contract signature to video content core application software V. At 3434, video content core application software V records video based contract signature and sends a message to audio content core application software A to process video based contract signature and audio content core application software consumes video based contract signature, generates and records audio based contract signature. At 3436, staffing manager server SMS integrates and sends relationship information of video based contract signature, audio based contract signature to relationship core application software R and relationship core application software records relationships. At 3438, staffing manager server SMS sends results back to staffing manager client SMC.

FIG. 35A illustrates an example method 3500A for a hiring manager to sign contract.

FIG. 35B illustrates an example activities 3500B performed for a hiring manager to sign contract during method 3500A. Activities 3500B include handshakes among hiring manager, staffing client portal application software components, staffing server application software components and staffing core application software components. Element numbers for features in method 3500A in FIG. 35A correspond with respective element numbers in FIG. 35B.

At 3502, hiring manager HM attempts to log into hiring manager portal using hiring manager client HMC. At 3504, hiring manager client HMC sends request to hiring manager server HMS. At 3506, hiring manager server HMS validates authorization with security core application software S. At 3508a, hiring manager server HMS and security core application software allow hiring manager to enter hiring manager portal. At 3508b, hiring manager server HMS and security core application software reject user from entering hiring manager portal.

At 3510, hiring manager HM attempts to retrieve contract information using hiring manager client HMC. At 3512, hiring manager client HMC sends request for contract information to hiring manager server HMS. At 3514, hiring manager server HMS sends request for relationship to relationship core application software R. At 3516, staffing manager server SMS sends contract information. At 3518, candidate server CS sends candidate information. At 3520, relationship core application software R integrates/bundles and sends relationship information, contract information and candidate information back to hiring manager server HMS. At 3522, hiring manager server integrates/bundles relationship information, contract information, and candidate information and sends them back to hiring manager client HMC.

At 3524, Hiring Manager HM keyboards contract signature using hiring manager client HMC. At 3526, hiring manager client HMC sends keyboarded information to hiring manager server HMS. At 3528, hiring manager server HMS records keyboarded contract signature and sends back to hiring manager client HMC.

At 3530, hiring manager HM streams/uploads video based contract signature using hiring manager client HMC. At 3532, hiring manager client HMC sends video based contract signature to hiring manager server HMS. At 3534, hiring manager server HMS sends video based contract signature to video content core application software V. At 3536, video content core application software V records video based contract signature and sends a message to audio content core application software A to process video based contract signature and audio content core application software consumes video based contract signature, generates and records audio based contract signature. At 3538, hiring manager server HMS integrates and sends relationship information of video based contract signature, audio based contract signature to relationship core application software R and relationship core application software records relationships. At 3540, hiring manager server HMS sends results back to hiring manager client HMC.

FIG. 36A illustrates an example method 3600A for a candidate to sign contract.

FIG. 36B illustrates an example activities 3600B performed for a candidate to sign contract during method 3600A. Activities 3600B include handshakes among candidate, staffing client portal application software components, staffing server application software components and staffing core application software components. Element numbers for features in method 3600A in FIG. 36A correspond with respective element numbers in FIG. 36B.

At 3602, candidate C1 attempts to log into candidate portal using candidate client CC. At 3604, candidate client CC sends request to candidate server CS. At 3606, candidate server CS validates authorization with security core application software S. At 3608a, candidate server CS and security core application software allow candidate to enter candidate portal. At 3608b, candidate server CS and security core application software reject user from entering candidate portal.

At 3610, candidate C1 attempts to retrieve contract using candidate client CC. At 3612, candidate client CC sends request for contract to candidate server CS. At 3614, candidate server CS sends request for relationship to relationship core application software R. At 3616, hiring manager server HMS sends job position information. At 3618, staffing manager server SMS sends contract information. At 3620, relationship core application software R integrates/bundles and sends relationship information, account manager and candidate information back to candidate server CS. At 3622, candidate server integrates/bundles relationship information, staffing account manager information, candidate information and sends them back to candidate client CC.

At 3624, candidate C1 keyboards sign contract using candidate client CC. At 3626, candidate client CC sends keyboarded information to candidate server CS. At 3628, candidate server CS records keyboarded sign contract and sends back to candidate client CC.

At 3630, candidate C1 streams/uploads video based sign contract using candidate client CC. At 3632, candidate client CC sends video based sign contract to candidate server CS. At 3634, candidate server CS sends video based sign contract to video content core application software V. At 3636, video content core application software V records video based sign contract and sends a message to audio content core application software A to process video based sign contract and audio content core application software consumes video based sign contract, generates and records audio based sign contract. At 3638, candidate server CS sends relationship information of video based candidate feedback, audio based candidate feedback to relationship core application software R and relationship core application software records relationships. At 3640, candidate server CS sends results back to candidate client CC.

FIG. 37A illustrates an example method 3700A for a hiring manager to provide feedback on candidate.

FIG. 37B illustrates an example activities 3700B performed for a hiring manager to provide feedback on candidate during method 3700A. Activities 3700B include handshakes among hiring manager, staffing client portal application software components, staffing server application software components and staffing core application software components. Element numbers for features in method 3700A in FIG. 37A correspond with respective element numbers in FIG. 37B.

At 3702, hiring manager HM attempts to log into hiring manager portal using hiring manager client HMC. At 3704, hiring manager client HMC sends request to hiring manager server HMS. At 3706, hiring manager server HMS validates authorization with security core application software S. At 3708a, hiring manager server HMS and security core application software allow hiring manager to enter hiring manager portal. At 3708b, hiring manager server HMS and security core application software reject user from entering hiring manager portal.

At 3710, hiring manager HM attempts to retrieve candidate's information using hiring manager client HMC. At 3712, hiring manager client HMC sends request for candidate's information to hiring manager server HMS. At 3714, hiring manager server HMS sends request for relationship to relationship core application software R. At 3716, staffing account manager server SAS sends staffing account manager information. At 3718, candidate server CS sends candidate information. At 3720, relationship core application software R integrates/bundles and sends relationship information, account manager and candidate information back to hiring manager server HMS. At 3722, hiring manager server integrates/bundles relationship information, staffing account manager information, candidate information and sends them back to hiring manager client HMC.

At 3724, Hiring Manager HM keyboards candidate feedback information using hiring manager client HMC. At 3726, hiring manager client HMC sends keyboarded information to hiring manager server HMS. At 3728, hiring manager server HMS records keyboarded candidate feedback information and sends back to hiring manager client HMC.

At 3730, hiring manager HM streams/uploads video based candidate feedback information using hiring manager client HMC. At 3732, hiring manager client HMC sends video based candidate feedback information to hiring manager server HMS. At 3734, hiring manager server HMS sends video based candidate feedback information to video content core application software V. At 3736, video content core application software V records video based candidate feedback information and sends a message to audio content core application software A to process video based candidate feedback information and audio content core application software consumes video based candidate feedback information, generates and records audio based candidate feedback information. At 3738, hiring manager server HMS integrates and sends relationship information of video based candidate feedback, audio based candidate feedback to relationship core application software R and relationship core application software records relationships. At 3740, hiring manager server HMS sends results back to hiring manager client HMC.

FIG. 38A illustrates an example method 3800A for any user to enter electronic fence.

FIG. 38B illustrates an example activities 3800B performed for any user to enter electronic fence during method 3800A. Activities 3800B include handshakes among any user, staffing client portal application software components, staffing server application software components and staffing core application software components. Element numbers for features in method 3800A in FIG. 38A correspond with respective element numbers in FIG. 38B.

At 3802, user requests for security portal. At 3804, client sends request to server for robot validation. At 3806, server HMS validates with relationship core application software R for robot behavior. At 3808, security core application software sends generic security questions to server. At 3810, video content core application software sends generic video content to server. At 3812, audio content core application software sends generic audio content to server. At 3814, graphics content core application software sends generic graphics content to server. At 3816, server integrates/bundles robot behavior validation content to client.

At 3818, user responds to robot validation using client. At 3820, client sends robot response to server. At 3822a, server confirms that user is not a robot. At 3822b, server confirms that user is a robot. At 3824, bottom of left side flow is connected to the top of right side flow by referencing same number 3824.

At 3826, user keyboards or video/audio streams identifier using client. At 3828, client sends identifier to server. At 3830a, server confirms that user is a known person. At 3830b, server confirms that user is an unknown person. At 3832, security core application software R sends user specific security questions to server. At 3834, video content core application software V sends user specific video content to server. At 3836, audio content core application software sends user specific audio content to server. At 3838, graphics content core application software sends user specific graphics content to server. At 3840, server integrates/bundles user specific authentication content to client.

At 3842, user responds to user specific authentication challenge using client. At 3844, client sends authentication response to server. At 3846a, server confirms that user is authenticated. At 3846b, server confirms that user is not authenticated.

FIG. 39A illustrates an example method 3900A for a user to review usage agreement.

FIG. 39B illustrates an example activities 3900B performed for a user to review usage agreement during method 3900A. Activities 3900B include handshakes among a user, staffing client portal application software components, staffing server application software components and staffing core application software components. Element numbers for features in method 3900A in FIG. 39A correspond with respective element numbers in FIG. 39B.

At 3902, user attempts to log into application portal using application client. At 3904, application client sends request to application server. At 3906, application server validates authorization with security core application software S. At 3908a, application server allows user to enter application portal. At 3908b, application server rejects user from entering application portal. At 3910, application server sends request for relationship to relationship core application software R. At 3912, relationship core application software R integrates/bundles and sends relationship information back to application server. At 3914, text content core application software T sends text based usage agreement to application server. At 3916, graphics content core application software G sends graphics based usage agreement back to application server. At 3918, video content core application software V sends video based usage agreement to application server. At 3920, audio content core application software A sends audio based usage agreement to application server. At 3922, application server bundles relationship information, text based usage agreement information, graphics based usage agreement information, video based usage agreement information, audio based usage agreement information and sends them back to application client.

FIG. 40A illustrates an example method 4000A for a user to consent to usage agreement.

FIG. 40B illustrates an example activities 4000B performed for a user to consent to usage agreement during method 4000A. Activities 4000B include handshakes among user, staffing client portal application software components, staffing server application software components and staffing core application software components. Element numbers for features in method 4000A in FIG. 40A correspond with respective element numbers in FIG. 40B.

At 4002, user attempts to log into application portal using application client. At 4004, application client sends request to application server. At 4006, application server validates authorization with security core application software S. At 4008a, application server and security core application software allow user to enter application portal. At 4008b, application server and security core application software reject user from entering application portal.

At 4010, user attempts to retrieve usage agreement information using application client. At 4012, application client sends request for usage agreement to application server. At 4014, application server sends request for relationship to relationship core application software R. At 4016, relationship core application software R integrates/bundles and sends relationship information, usage agreement information back to application server. At 4018, application server integrates/bundles relationship information, usage agreement information and sends them back to application client.

At 4020, user keyboards consent information using application client. At 4022, application client sends keyboarded consent information to application server. At 4024, application server records keyboarded consent information and sends back to application client.

At 4026, user streams/uploads video based consent information using application client. At 4028, application client sends video based consent information to application server. At 4030, application server sends video based consent information to video content core application software V. At 4032, video content core application software V records video based consent information and sends a message to audio content core application software A to process video based consent information and audio content core application software consumes video based consent information, generates and records audio based consent information. At 4034, application server integrates and sends relationship information of video based consent information, relationship information of audio based consent information to relationship core application software R and relationship core application software records relationships. At 4036, application server sends results back to application client.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A staffing core system comprising:
   a group of staffing core appliances including processors and memory configured to store and execute a group of staffing core applications to:
   receive video resume content off multiple candidates directly from multiple candidate server systems, which receive video resume content directly from multiple candidate client systems;
   receive audio resume content off multiple candidates directly from multiple candidate server systems, which receive audio resume content directly from multiple candidate client systems;
   receive graphics resume content off multiple candidates directly from multiple candidate server systems, which receive graphics resume content directly from multiple candidate client systems;
   receive text resume content off multiple candidates directly from multiple candidate server systems, which receive text resume content directly from multiple candidate client systems;
   receive video resume content directly from multiple staffing server systems, which receive video resume content directly from multiple staffing client systems;
   receive audio resume content directly from multiple staffing server systems, which receive audio resume content directly from multiple staffing client systems;
   receive graphics resume content directly from multiple staffing server systems, which receive graphics resume content directly from multiple staffing client systems;
   receive text resume content directly from multiple staffing server systems, which receive text resume content directly from multiple staffing client systems;
   wherein the group of staffing core appliances comprises a group of relationship core appliances including processors and memory configured to store and execute a group of relationship core application software components to integrate the video resume content, the audio resume content, the graphics resume content, and the text resume content from at least one of the multiple staffing server systems and a first of the multiple candidates into a multimedia resume of the first candidate;
   wherein the group of staffing core appliances comprises:
   a group of distributed video content core appliances including processors and memory configured to store and execute a group of video content core application software components including instructions to record in distributed locations, retrieve in distributed locations and package in distributed locations video information of the multimedia resume of the first candidate;
   a group of distributed audio content core appliances including processors and memory configured to store and execute a group of audio content core application software components including instructions to record in distributed locations, retrieve in distributed locations and package in distributed locations audio information of the multimedia resume of the first candidate;
   a group of distributed graphics content core appliances including processors and memory configured to store and execute a group of graphics content core application software components including instructions to record in distributed locations, retrieve in distributed locations and package in distributed locations graphics information of the multimedia resume of the first candidate; and
   a group of distributed text content core appliances including processors and memory configured to store and execute a group of text content core application software components including instructions to record in distributed locations, retrieve in distributed locations and package in distributed locations text information of the multimedia resume of the first candidate; and
   distribute the recorded, retrieved and packaged multimedia resume of the first candidate.

2. The multimedia resume distribution system of claim 1 wherein the group of processing core appliances comprises:
   a group of security core appliances including processors and memory configured to store and execute a group of security core application software components including instructions to secure the multimedia resume.

3. The multimedia resume distribution system of claim 1 comprising:
   a group of staffing server appliances including processors and memory configured to store and execute a group of staffing server applications including instructions to record, retrieve and render information.

4. The multimedia resume distribution system of claim 1 comprising:
   a group of staffing client devices including processors and memory configured to store and execute a group of staffing client portals including instructions to request, receive and render information.

5. A computer readable storage medium storing computer executable instructions for controlling a computing device to perform a method comprising:
   receiving video resume content off multiple candidates directly from multiple candidate server systems, which receive video resume content directly from multiple candidate client systems;
   receiving audio resume content of multiple candidates directly from multiple candidate server systems, which receive audio resume content directly from multiple candidate client systems;
   receiving graphics resume content of multiple candidates directly from multiple candidate server systems, which receive graphics resume content directly from multiple candidate client systems;
   receiving text resume content of multiple candidates directly from multiple candidate server systems, which receive text resume content directly from multiple candidate client systems;

receive video resume content directly from multiple staffing server systems, which receive video resume content directly from multiple staffing client systems;
receive audio resume content directly from multiple staffing server systems, which receive audio resume content directly from multiple staffing client systems;
receive graphics resume content directly from multiple staffing server systems, which receive graphics resume content directly from multiple staffing client systems;
receive text resume content directly from multiple staffing server systems, which receive text resume content directly from multiple staffing client systems;
integrating the video resume content, the audio resume content, the graphics resume content, and the text resume content from at least one of the multiple staffing server systems and a first of the multiple candidates into a multimedia resume of the first candidate and integrating the video resume content, the audio resume content, the graphics resume content, and the text resume content from at least one of the multiple staffing server systems and a second of the multiple candidates into a multimedia resume of the second candidate;
recording in distributed locations the multimedia resumes of the first and second candidates;
retrieving in distributed locations the multimedia resumes of the first and second candidates;
packaging in distributed locations the multimedia resumes of the first and second candidates; and
distributing the recorded, retrieved and packaged multimedia resumes of the first and second candidates.

6. The computer readable storage medium of claim 5, the method comprising:
securing the multimedia resume.

7. The computer readable storage medium of claim 5, the method comprising:
receiving multimedia relationship information;
securing the received multimedia relationship information;
recording the secured multimedia relationship information;
retrieving the recorded multimedia relationship information; and
rendering the retrieved multimedia relationship information.

8. A computing device implemented method comprising:
receiving video resume content of multiple candidates directly from multiple candidate server systems, which receive video resume content directly from multiple candidate client systems;
receiving audio resume content of multiple candidates directly from multiple candidate server systems, which receive audio resume content directly from multiple candidate client systems;
receiving graphics resume content of multiple candidates directly from multiple candidate server systems, which receive graphics resume content directly from multiple candidate client systems;
receiving text resume content of multiple candidates directly from multiple candidate server systems, which receive text resume content directly from multiple candidate client systems;
receive video resume content directly from multiple staffing server systems, which receive video resume content directly from multiple staffing client systems;
receive audio resume content directly from multiple staffing server systems, which receive audio resume content directly from multiple staffing client systems;
receive graphics resume content directly from multiple staffing server systems, which receive graphics resume content directly from multiple staffing client systems;
receive text resume content directly from multiple staffing server systems, which receive text resume content directly from multiple staffing client systems;
integrating the video resume content, the audio resume content, the graphics resume content, and the text resume content from at least one of the multiple staffing server systems and a first of the multiple candidates into a multimedia resume of the first candidate and integrating the video resume content, the audio resume content, the graphics resume content, and the text resume content from at least one of the multiple staffing server systems and a second of the multiple candidates into a multimedia resume of the second candidate;
recording in distributed locations the multimedia resumes of the first and second candidates;
retrieving in distributed locations the multimedia resumes of the first and second candidates;
packaging in distributed locations the multimedia resumes of the first and second candidates; and
distributing the recorded, retrieved and packaged multimedia resumes of the first and second candidates.

9. The computing device implemented method of claim 8 comprising:
securing the multimedia resume.

10. The computing device implemented method of claim 8 comprising:
receiving at least two of video staffing comments, audio staffing comments, graphics staffing comments, and text staffing comments;
integrating the at least two of the video staffing comments, the audio staffing comments, the graphics staffing comments, and the text staffing comments into multimedia staffing comments;
securing the multimedia staffing comments;
recording the secured multimedia staffing comments; and
distributing the recorded multimedia staffing comments.

11. The computing device implemented method of claim 8 comprising:
receiving at least two of video staffing instructions, audio staffing instructions, graphics staffing instructions, and text staffing instructions;
integrating at least two of the video staffing instructions, the audio staffing instructions, the graphics staffing instructions, and the text staffing instructions into multimedia staffing instructions;
securing the multimedia staffing instructions;
recording the secured multimedia staffing instructions; and
distributing the recorded multimedia staffing instructions.

12. The computing device implemented method of claim 8 comprising:
receiving at least two of video staffing decisions, audio staffing decisions, graphics staffing decisions, and text staffing decisions;
integrating at least two of the video staffing decisions, the audio staffing decisions, the graphics staffing decisions, and the text staffing decisions into multimedia staffing decisions;
securing the multimedia staffing decisions;
recording the secured multimedia staffing decisions; and
distributing the recorded multimedia staffing decisions.

13. The computing device implemented method of claim 8 comprising:
- receiving at least two of video staffing job offers, audio staffing job offers, graphics staffing job offers, and text staffing job offers;
- integrating at least two of the video staffing job offers, the audio staffing job offers, the graphics staffing job offers, and the text staffing job offers into multimedia staffing job offers;
- securing the multimedia staffing job offers;
- recording the secured multimedia staffing job offers; and
- distributing the recorded multimedia staffing job offers.

14. The computing device implemented method of claim 8 comprising:
- receiving at least two of video staffing job positions, audio staffing job positions, graphics staffing job positions, and text staffing job positions;
- integrating the at least two of the video staffing job positions, the audio staffing job positions, the graphics staffing job positions, and the text staffing job positions into multimedia staffing job positions;
- securing the multimedia staffing job positions;
- recording the secured multimedia staffing job positions; and
- distributing the recorded multimedia staffing job positions.

15. The computing device implemented method of claim 8 comprising:
- receiving at least one of video staffing signatures, and audio staffing signatures;
- receiving graphics staffing signatures;
- receiving text staffing signatures;
- integrating the graphics staffing signatures, the text staffing signatures, and at least one of the video staffing signatures, and the audio staffing signatures into multimedia staffing signatures;
- securing the multimedia staffing signatures;
- recording the secured multimedia staffing signatures; and
- distributing the recorded multimedia staffing signatures.

16. The computing device implemented method of claim 8 comprising:
- receiving video staffing fence;
- receiving at least one of audio staffing fence, graphics staffing fence, and text staffing fence;
- integrating the video staffing fence and the at least one of the audio staffing fence, the graphics staffing fence, and the text staffing fence into a multimedia staffing fence;
- securing the multimedia staffing fence;
- recording the secured multimedia staffing fence; and
- distributing the recorded multimedia staffing fence.

17. The computing device implemented method of claim 8 comprising:
- receiving at least one of video staffing usage agreements, audio staffing usage agreements, and graphics staffing usage agreements;
- receiving text staffing usage agreements;
- integrating the text staffing usage agreements, and at least one of the video staffing usage agreements, the audio staffing usage agreements, and the graphics staffing usage agreements into multimedia staffing usage agreements;
- securing the multimedia staffing usage agreements;
- recording the secured multimedia staffing usage agreements; and
- distributing the recorded multimedia staffing usage agreements.

18. The computing device implemented method of claim 8 comprising:
- receiving at least one of video staffing contracts, audio staffing contracts, and graphic staffing contracts;
- receiving text staffing contracts;
- integrating the text staffing contracts, and at least one of the video staffing contracts, the audio staffing contracts, and the graphics staffing contracts into multimedia staffing contracts;
- securing the multimedia staffing contracts;
- recording the secured multimedia staffing contracts; and
- distributing the recorded multimedia staffing contracts.

* * * * *